United States Patent
Shuman et al.

(10) Patent No.: US 10,528,999 B2
(45) Date of Patent: Jan. 7, 2020

(54) SYSTEMS AND METHODS FOR FACILITATING DISCOVERY AND MANAGEMENT OF BUSINESS INFORMATION

(71) Applicant: YP LLC, Tucker, GA (US)

(72) Inventors: Mark Shuman, La Canada, CA (US); Grace Mase, Glendale, CA (US); Sudheer Sahu, Encinitas, CA (US); David Mayer, Los Angeles, CA (US); Gunjan Sharman, Los Angeles, CA (US); Randell Beltran, Arcadia, CA (US)

(73) Assignee: YP LLC, Tucker, GA (US)

( * ) Notice: Subject to any disclaimer, the term of this patent is extended or adjusted under 35 U.S.C. 154(b) by 1209 days.

(21) Appl. No.: 14/462,101

(22) Filed: Aug. 18, 2014

(65) Prior Publication Data
US 2016/0048900 A1 Feb. 18, 2016

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0204* (2013.01)

(58) Field of Classification Search
CPC ................. G06Q 30/0204; G06Q 30/0631
USPC ...................................................... 705/7.33
See application file for complete search history.

(56) References Cited

U.S. PATENT DOCUMENTS

| 7,478,054 | B1 | 1/2009 | Adams et al. |
| 8,131,586 | B2 * | 3/2012 | Cordeiro ............ G06Q 30/0225 705/347 |
| 8,254,961 | B2 * | 8/2012 | Moon ..................... G06Q 30/02 455/456.3 |
| 8,676,663 | B1 * | 3/2014 | Robinson ........... G06Q 30/0259 705/14.1 |
| 9,057,617 | B1 * | 6/2015 | Lopatenko ........... G08G 1/0962 |
| 9,256,761 | B1 * | 2/2016 | Sahu .................... G06F 21/6218 |
| 9,282,161 | B1 * | 3/2016 | Hill ........................ H04L 67/306 |
| 10,223,648 | B2 * | 3/2019 | Tseng ................. G06Q 30/0261 |
| 2002/0046099 | A1 | 4/2002 | Frengut et al. |
| 2002/0065691 | A1 | 5/2002 | Twig |
| 2009/0216547 | A1 * | 8/2009 | Canora .................. G06Q 30/02 705/346 |

(Continued)

OTHER PUBLICATIONS

USPTO Notice of Allowance for U.S. Appl. No. 14/681,999, dated Sep. 14, 2015, 18 pages, USA.

*Primary Examiner* — Folashade Anderson
(74) *Attorney, Agent, or Firm* — Greensfelder, Hemker & Gale, P.C.

(57) ABSTRACT

Systems, methods, and computer-readable media are provided to assist a user to identify one or more businesses of interest. Individual selections of businesses by end users to retain information corresponding to the businesses may be facilitated. Collections of business information may be retained in a repository. Each end user may be classified into a set of categories based on attributes. A first end user may be matched to a first category. A first set of collection information associated with a first set of end users that correspond to the first category and the first location may be identified. A recommendation for the first end user may be determined based on the first set of collection information, the first category, and the first location.

20 Claims, 32 Drawing Sheets

(56) References Cited

U.S. PATENT DOCUMENTS

| | | | |
|---|---|---|---|
| 2009/0235176 A1* | 9/2009 | Jayanthi | H04L 12/189 715/738 |
| 2009/0288084 A1 | 11/2009 | Astete | |
| 2011/0137818 A1* | 6/2011 | Goad | G06Q 30/02 705/347 |
| 2013/0151462 A1* | 6/2013 | Ledlie | G06Q 10/10 706/54 |
| 2013/0325641 A1* | 12/2013 | Brown | G06Q 30/0631 705/15 |

* cited by examiner

Ricardo Monroy

Hi Family & Friends – this is for those who have asked about who did my kitchen remodel

Kitchen Remodel Collection
www.yp.com/mymonroy/KitchenRemodelCollection

- Kyle the Tile Guy
- Danish Cabinets & More
- Ivan Brothers Plumbing

See the whole list...

My Book
– interact with your favorite local businesses in a whole new way.

yp 28 like this

Leslie Schoeffer-Siemen Ricardo, thank you so much for sharing this. Do you mind resending me the before and after photos you have...or can you be a doll and just post them here. I want to show it to my CC...

SYSTEMS AND METHODS FOR FACILITATING DISCOVERY AND MANAGEMENT OF BUSINESS INFORMATION

BACKGROUND

Certain embodiments of the present disclosure relate generally to managing business information, and in particular to systems and methods for facilitating business discovery and business recommendations.

As value, use, access, and demand corresponding to information continue to increase, consumers demand more of the products and services they use than ever before. Businesses are expected to compete to provide greater and greater levels of service and more tailored service offerings. However, searching for, obtaining, managing, and sharing information about businesses can be inconvenient and disorderly. Chief among the difficulties that a consumer often encounters is the amount of time and effort necessary to search for particular businesses of interest that are trusted and recommended.

There is a need for systems and methods to streamline business information searching, obtaining, managing, and sharing, and to provide greater availability and quality of tailored service offerings to consumers. This and other needs are addressed by the present disclosure.

BRIEF SUMMARY

Certain embodiments of the present disclosure relate generally to managing business information, and in particular to systems and methods for facilitating business discovery and business recommendations.

In one aspect, a method to assist a user to identify one or more businesses of interest is provided. The method may include one or a combination of the following, which may be performed by a computer system. Individual selections, by a plurality of end users, of one or more businesses to retain information corresponding to the one or more businesses may be facilitated. Indicia of selections made by each end user of the plurality of end users may be processed, the indicia being received by the computer system via a network. Collections of business information in one or more repositories may be retained. Each collection of the collections of business information: may be uniquely associated with a respective end user of the plurality of end users; may include information corresponding to one or more selected businesses of the one or more businesses that were individually selected by the respective end user for retention in association with the respective end user; and may be associated with a respective theme pertaining to the one or more selected businesses. Each end user of the plurality of end users may be classified into at least one category of a set of categories, the set of categories representing classifications of end users based at least in part on one or more sets of attributes defined for classifying various end users. First information enabling unique identification of a first end user may be processed. Second information about a first location corresponding to the first end user may be processed. The first end user may be matched to a first category from the set of categories, where the first end user matches one or more categories from the set of categories. A first set of collection information associated with a first set of end users that correspond to the first category and the first location may be identified. A recommendation for the first end user may be determined based at least in part on the first set of collection information, the first category, and the first location, where the recommendation corresponds to a first business that was individually selected for retention in association with at least some of the first set of end users. Indication of the recommendation to a first end-user computing device associated with the first end user may be caused, and selection of the first business to retain information corresponding to the first business in association with the first end user may be facilitated.

In another aspect, a system is provided to assist a user to identify one or more businesses of interest. The system may include one or more network interfaces accessible from a network and one or more processors coupled to at least one of the one or more network interfaces and to one or more repositories. The one or more processors may execute instructions to perform one or a combination of the following. Individual selections, by a plurality of end users, of one or more businesses to retain information corresponding to the one or more businesses may be facilitated. Indicia of selections made by each end user of the plurality of end users may be processed, the indicia being received by the computer system via a network. Collections of business information in one or more repositories may be retained. Each collection of the collections of business information: may be uniquely associated with a respective end user of the plurality of end users; may include information corresponding to one or more selected businesses of the one or more businesses that were individually selected by the respective end user for retention in association with the respective end user; and may be associated with a respective theme pertaining to the one or more selected businesses. Each end user of the plurality of end users may be classified into at least one category of a set of categories, the set of categories representing classifications of end users based at least in part on one or more sets of attributes defined for classifying various end users. First information enabling unique identification of a first end user may be processed. Second information about a first location corresponding to the first end user may be processed. The first end user may be matched to a first category from the set of categories, where the first end user matches one or more categories from the set of categories. A first set of collection information associated with a first set of end users that correspond to the first category and the first location may be identified. A recommendation for the first end user may be determined based at least in part on the first set of collection information, the first category, and the first location, where the recommendation corresponds to a first business that was individually selected for retention in association with at least some of the first set of end users. Indication of the recommendation to a first end-user computing device associated with the first end user may be caused, and selection of the first business to retain information corresponding to the first business in association with the first end user may be facilitated.

In yet another aspect, one or more non-transitory, machine-readable media having machine-readable instructions thereon are provided to assist a user to identify one or more businesses of interest, which instructions, when executed by one or more computers or other processing devices, cause the one or more computers or other processing devices to perform one or a combination of the following. Individual selections, by a plurality of end users, of one or more businesses to retain information corresponding to the one or more businesses may be facilitated. Indicia of selections made by each end user of the plurality of end users may be processed, the indicia being received by the computer system via a network. Collections of business information in one or more repositories may be retained. Each collection of the collections of business information: may be uniquely associated with a respective end user of the plurality of end users; may include information corresponding to one or more selected businesses of the one or more businesses that were individually selected by the respective end user for retention in association with the respective end user; and may be associated with a respective theme pertaining to the one or more selected businesses. Each end user of the plurality of end users may be classified into at least one category of a set of categories, the set of categories representing classifications of end users based at least in part on one or more sets of attributes defined for classifying various end users. First information enabling unique identification of a first end user may be processed. Second information about a first location corresponding to the first end user may be processed. The first end user may be matched to a first category from the set of categories, where the first end user matches one or more categories from the set of categories. A first set of collection information associated with a first set of end users that correspond to the first category and the first location may be identified. A recommendation for the first end user may be determined based at least in part on the first set of collection information, the first category, and the first location, where the recommendation corresponds to a first business that was individually selected for retention in association with at least some of the first set of end users. Indication of the recommendation to a first end-user computing device associated with the first end user may be caused, and selection of the first business to retain information corresponding to the first business in association with the first end user may be facilitated.

In various embodiments, data about the first end user may be gathered from one or more data sources, and the data about the first end user may be analyzed to determine a first set of one or more attributes of the first end user. The matching the first end user to the first category may be based at least in part on determining that the first set of one or more attributes of the first end user correspond to the first category. The first set of end users that correspond to the first category may share the first set of one or more attributes in common with the first end user. In various embodiments, the one or more data sources may include one or both of the first end user or a third party data source, and the data about the first end user may include demographic data. In various embodiments, the first set of one or more attributes of the first end user may include one or more of a demographic characterization of the first end user, a consumer characterization of the first end user, and/or a proximity to a life event.

In various embodiments, a set of businesses associated with the first set of collection information may be ranked based at least in part on a first metric. The determining the recommendation for the first end user may include selecting the first business based at least in part on the ranking. In various embodiments, the recommendation for the first end user comprises an offer from the first business.

In various embodiments, the determining the recommendation for the first end user may include retrieving a second set of collection information that is associated with the first end user and that include information corresponding to one or more selected businesses of the one or more businesses that were individually selected by the first end user for retention. The second set of collection information may be compared with the first set of collection information associated with the first set of end users, and one or more similarities may be identified.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the following appended figures.

FIG. 11 is an example of sharing collection information via social/business networking services account postings, in accordance with certain embodiments.

FIG. 12 is a screenshot, which may be a partial screenshot, of a public profile that may be displayed after selection of a link made available with posting, in accordance with certain embodiments.

Figure 1:
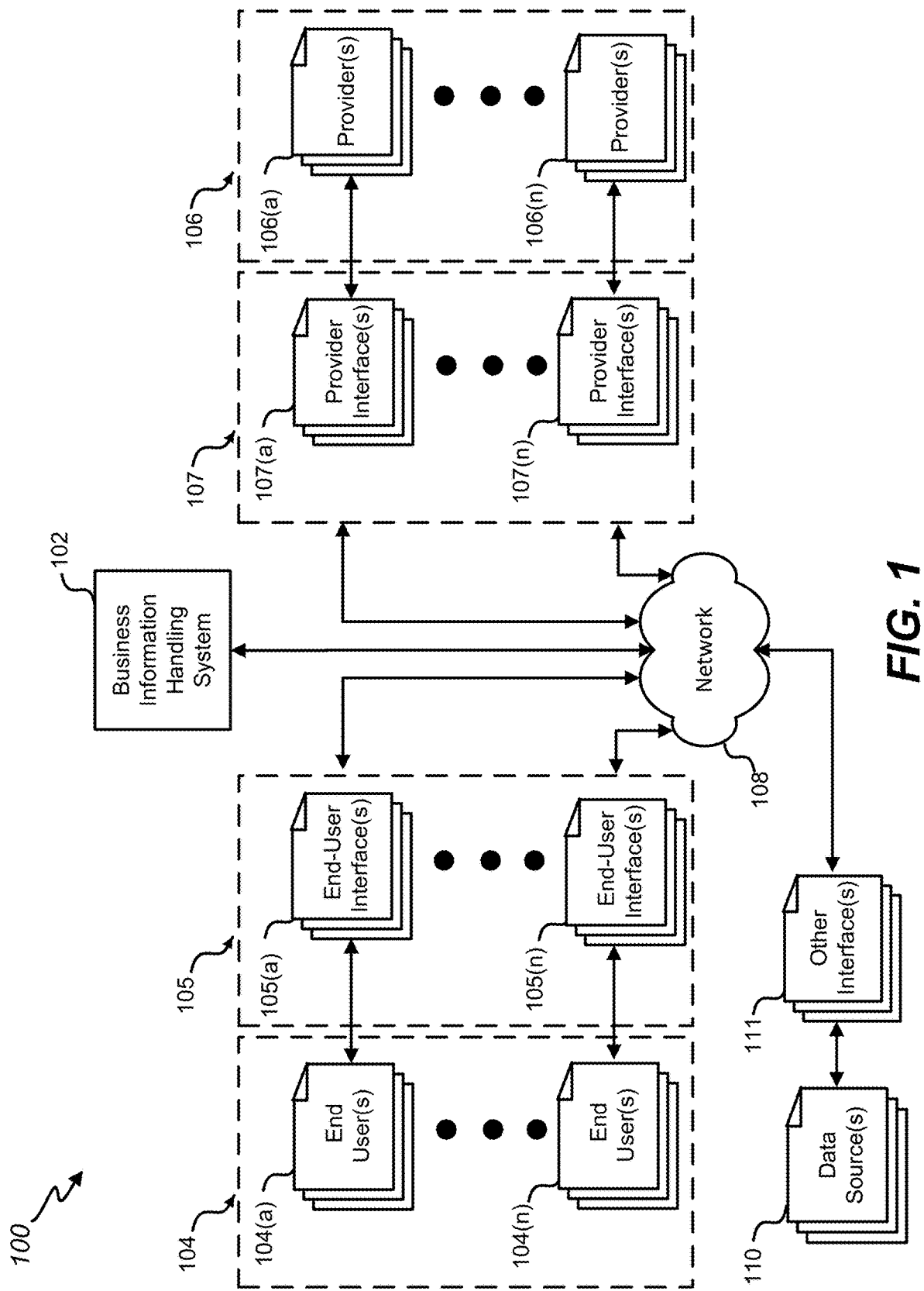
FIG. 1 is a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various embodiments according to the present disclosure may provide for windowing of business information on one or more of geographical, temporal, demographical, and/or social/business networking bases. Certain embodiments may provide an easy way for consumers to find and discover the best local merchants. Certain embodiments may allow consumers to see which local merchants are popular and trusted around them. Searching by a consumer may become more relevant and personalized to the consumer's history and business interests. Certain embodiments may provide one or more ways in which a user may organize the user's business relationship information and may automatically manage, update, and maintain relationship information in order to make the user's life a lot easier. Various embodiments may allow consumers to create and curate business information collections, add custom content to collections, get updates from the businesses of interest, see friends' recommendations, and see what businesses are trending in the consumer's local area(s) of interest.

A user's personalized business information may be retained in/with a local graph of merchants of interest to the user. Certain embodiments may allow for generating a local graph of merchants, organizing the local graph, augmenting the local graph, updating the local graph, exposing the local graph to the user, and/or sharing of the local graph with one or more third parties, which may include one or more other users. Certain embodiments may allow saving of listings information into one or more collections, and certain embodiments may automatically organize a user's listings into collections. By saving of listing information for later use, a user may readily retrieve listing information for businesses of interest. Certain embodiments may allow a user to retrieve the user's personalized business information from any suitable network-connected computing device so that the information is accessible to the user wherever the user may be.

In some embodiments, organization of business information into collections may be based on default criteria and/or user-specified criteria. As some potential non-limiting examples of collections, there may be a home collection, a garden collection, a pet collection, a family collection, a health collection, a kid's collection, a collection customized to a specific project, etc. A collection may allow for retrieval of listings at any time.

Business listing information associated with a collection may be automatically updated by the information handling system such that, when listing information is retrieved from a collection, the listing information may be updated information. Thus, a collection allows for the maintenance of listing information of interest to provide a user with the most up-to-date listing information for the businesses that matter to the user. And, thus, if a provider associated with a collection has moved or changed phone numbers, the user will not be left with obsolete information (as the user would otherwise be if such information was recorded into an address book) because the change may be captured so that the collection would be automatically updated with the new information.

Certain embodiments may provide an automated workflow to gauge a user's interests. The automated workflow may include a series of questions presented to the user, the answers to which, as provided by user selections, may indicate user interests. A user's interests may be used as one or more bases for prompting the user according to various embodiments disclosed herein.

Certain embodiments may provide the option for a user to create a custom collection. For example, a user could create a custom collection for a kitchen remodeling project. Providers that are helping, and/or could potentially help, the user with the project could be associated with the collection, with notes on them, indicia of whether the user likes particular providers or not, which providers have been contacted, information obtained from providers, which providers have been selected, etc.

A collection may allow for addition of notes by a user to a listing or a group of listings in the collection. Some embodiments could provide a preference indication feature and/or a rating feature for a user to rate a provider. The preference indication feature could include a user-selectable option allowing a user to indicate a preference for a provider in any suitable manner. The rating feature could include a user-selectable option presenting ratings for selection in any suitable manner.

Thus, a user can record notes about what might be interesting to the user. For example, the user may note having talked to so-and-so, and may generally keep track of various things related to one or more businesses of interest. For example, a user may be planning a project, say a kitchen remodeling project, and may wish to keep track of various aspects related to the project, such as impressions, progress, schedules, ideas, interactions, quotes, deals, and so forth, so that it is all in one place.

Certain embodiments may provide a user with reminders about various aspects of a collection, such as deals and offers, schedule reminders, how long it is been since the user interacted with a given business, whether the user needs to check in with a given business, and/or the like. Certain embodiments may help a user track interactions with businesses. Where the user has been and/or has not been recently may be tracked, for example. For example, the user's last interaction, whether it be a visit or otherwise, with a given restaurant could be tracked and logged with the business information for the restaurant in a particular collection. Such aspects could be managed for the user. As another example, a user's interaction with one or more dentists could be managed, such as the user's last cleaning, when the user was last searching for dentists, etc., and, based on such information, reminders and/or suggestions (such as other possible dentists of interest, for example, highly rated dentists in an area of interest to the user that the user may not have considered and which may have special offers) could be presented.

Certain embodiments may provide the option for a user to allow one or more collaborators to have access to a collection. A collaborator could be another user in some embodiments. An enlist option could be presented to the user to allow the user to enlist another user as a collaborator. A collaborator could have a viewing access and, in some embodiments, editing access and/or access to add content such that the collaborator may add notes, photos, preference indicia, ratings indicia, etc. Some embodiments may allow the user to determine a level of access granted to a collaborator. Certain embodiments may provide the option for a user to share a collection with a third party. Accordingly, the various embodiments directed to information sharing may facilitate organization and engagement with a local business community.

Certain embodiments may provide significant value to businesses through enabling a direct, but low-maintenance, relationships with consumers. Significant value to businesses may also be provided via a business platform that exposes market and consumer insights. Certain embodiments may provide businesses with visibility into their consumers and may provide an easy way to communicate and market to their customers, for example, by marketing events, pushing offers to customers, driving awareness of new products and services, responding to inquiries, etc. Embodiments may provide multiple customer touch points, which, in turn, may allow for better metrics and targeting.

Certain embodiments may provide business-specific recommendations to users. Certain embodiments may provide for harvesting of consumer data. The consumer data may be analyzed with respect to individual users. One or more categories for the individual users may be determined based on the analysis, and certain embodiments may facilitate the provisioning of business recommendations pertinent to the one or more categories to the individual users. The recommendations could be based at least in part on aggregated recommendations of other users. Information about recommendations of other users could be gathered, analyzed, and classified according to any suitable bases. For example, aggregated recommendations could be classified according to user types. Analysis of information about an identified user could entail comparing the user information to information about other users (e.g., to determine user similarities) in order to recommend businesses (e.g., others' favorite or otherwise preferred businesses) for the identified user to review. The system may then send indications to the identified user of subscribers regarding options corresponding to the rated content.

In a set of embodiments, recommendations could be based at least in part on demographic information. The demographic information could include information about income level, education level, lifestyle, age, family/household, home ownership, etc. Recommendations could be based at least in part on any suitable consumer-specific information. For example, such consumer-specific information could include information on whether the consumer is proximate to life milestones such as a graduation, a new job, a wedding, childbirth, purchasing a home, etc. Accordingly, certain embodiments may use cluster-based consumer data and/or user-targeted consumer data.

In a set of embodiments, one or more collaborative filtering algorithms may be employed to define similarities between businesses based at least in part on consumer data. One or more indexes may be created based on similarities between businesses. With respect to a particular user, the user may be identified based on user identification information and/or device identification information for a device that may be associated with a user. Information related to the user and/or specific to the user may be gathered and analyzed in view of the one or more indexes to match the user with a set of one or more recommendations.

The aggregated recommendation information could be anonymized in some embodiments so that one or more specific recommendations are offered to an individual user without revealing identities of other users from whom the one or more specific recommendations are derived. Though anonymized, a specific recommendation could be offered with a general characterization of the other users. As one example out of many possibilities, a recommendation for a dog owner in Glendale, Calif., could indicate that other dog owners in Glendale have a preference for a particular veterinarian.

In some embodiments, aggregated recommendation information may not be anonymized. Certain users of the platform may have public recommendation information. Real estate agents, for example, may curate a collection of local service providers relevant to those who have bought or in the process of buying a house in a particular area (such as recommended inspectors, handymen, and the like) and may wish to have such recommendations public. Accordingly, recommendations may not necessarily be anonymized.

In some embodiments, the recommendations may include a customized collection of advertising information for businesses. The customized collection may be automatically generated by the system for an individual user based on the analysis. The customized collection may be presented to the user as a curated collection with user-selectable options that allow the user to select and/or de-select recommended businesses for retention in association with the user. For example, the user may select one or more recommended businesses for additions to a new or existing collection of the user. As another example, the user may select a recommended collection for addition as a new collection or for addition to an existing collection.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 may allow for transfer of information from and/or to a business information handling system 102 and an end user 104. An end-user 104, in some embodiments, may correspond to a consumer of products, services, and/or information. In some embodiments, system 100 may also allow for transfer of information from and/or to one or more providers 106 and/or one or more data sources 110. A provider 106, in various embodiments, may correspond to (and may be variously referenced herein by) any one or combination of a service provider, a product provider, a merchant, a business, an advisor, a representative, an advertiser, and/or the like. As depicted, the providers 106 may be communicatively coupled or couplable to a network 108 through one or more service provider interfaces 105.

The network 108 may be any suitable means to facilitate data transfer in the system 100. In various embodiments, the network 108 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, and/or any other appropriate architecture or system that facilitates the communication of signals, data, and/or message. The network 108 may transmit data using any suitable communication protocol. The network 108 and its various components may be implemented using hardware, software, and communications media such wires, optical fibers, microwaves, radio waves, and other electromagnetic and/or optical carriers, and/or any combination of the foregoing. In some embodiments, the network 108 may include a telephone network that may be circuit switched, package switched, or partially circuit switched and partially package switched. For example, the telephone network may partially use the Internet to carry phone calls (e.g., through VoIP).

The business information handling system 102 may be communicatively coupled or couplable to the network 108. In various embodiments, the business information handling system 102 may include any device or set of devices configured to compute, process, organize, categorize, qualify, send, receive, retrieve, generate, convey, store, display, present, detect, handle, and/or use any form of information and/or data suitable for embodiments described herein. The business information handling system 102 could include a single computing device, a server, for example, or multiple computing devices, which may be implemented in or with a distributed computing and/or cloud computing environment with a plurality of servers and cloud-implemented resources. Thus, the business information handling system 102 may include one or more servers. The business information handling system 102 may include one or more processing resources communicatively coupled to one or more storage media, random access memory (RAM), read-only memory (ROM), and/or other types of memory. The business information handling system 102 may include any one or combination of various input and output (I/O) devices, network ports, and display devices.

According to certain embodiments, the business information handling system 102 may be or include a provider management platform. A provider 106 may access the business information handling system 102 via a provider interface 107. An end user 104 may access the business information handling system 102 via an end-user interface 105. The business information handling system 102 may facilitate searching of one or more information repositories in response to information received over the network 108 from the end-user interfaces 105 and/or provider interfaces 107.

The end-user interfaces 105 and/or provider interfaces 107 may allow for transfer of and access to information in accordance with certain embodiments disclosed herein. In various embodiments, the end-user interface(s) 105 and/or service provider interface(s) 107 may include any suitable input/output module or other system/device operable to serve as an interface between a service provider(s) 106 and the provider management platform. The end-user interfaces 105 and/or provider interfaces 107 may facilitate communication over the network 108 using any suitable transmission protocol and/or standard. In various embodiments, the business information handling system 102 may include, provide, and/or be configured for operation with the end-user interfaces 105 and/or provider interfaces 107, for example, by making available and/or communicating with one or more of a website, a web page, a web portal, a web application, a mobile application, enterprise software, and/or any suitable application software. In some embodiments, an end-user interface 105 and/or provider interface 107 may include an application programming interface (API).

In some embodiments, an end-user interface 105 and/or a provider interface 107 may include a web interface. In some embodiments, the end-user interface 105 and/or provider interface 107 may include or work with an application made available to one or more interfaces, such as a mobile application as discussed herein. In some embodiments, the end-user interface 105 and/or provider interface 107 may cause a web page to be displayed on a browser of a service provider 105. The web page(s) may display output and receive input from a user (e.g., by using Web-based forms, via hyperlinks, electronic buttons, etc.). A variety of techniques can be used to create the web pages and/or display/receive information, such as JavaScript, Java applications or applets, dynamic HTML and/or AJAX technologies. Accordingly, the business information handling system 102 may have web site(s)/portal(s) giving access to such information, such as a provider portal.

In various embodiments, an end-user interface 105 and/or a provider interface 107 may include providing one or more display screen images that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like.

In certain embodiments, an end-user interface 105 and/or a provider interface 107 may include a computing device of an end user 104 and/or a service provider 105. In certain embodiments, a provider interface 107 may include a mobile computing device that may be any portable device suitable for sending and receiving information over a network in accordance with embodiments described herein. For example without limitation, in various embodiments, the computing device may include one or more devices variously referenced as a desktop computer, mobile phone, a cellular telephone, a smartphone, a handheld mobile device, a tablet computer, a web pad, a personal digital assistant (PDA), a notebook computer, a handheld computer, a laptop computer, and/or the like.

According to certain embodiments, the business information handling system 102 may be or include an advertising platform. As previously noted, one or more providers 106 may correspond to one or more advertisers. In some embodiments, the business information handling system 102 may provide for the selection and provision of advertisements to one or more end-user interfaces 105. In certain embodiments, providers 106 may have advertisements that may be placed in a web page made available to one or more end-user interfaces 105. In certain embodiments, providers 106 may have advertisements that may be displayed with an application made available to one or more end-user interfaces 105, such as a mobile application according to various embodiments. In some embodiments, placement of the advertisements could be in accordance with one or more paid placement arrangements and one or more advertising models.

Advertisements may be included in a results page responsive to a keyword search initiated by an end user 104 via, for example, a webpage and/or a mobile application. The search may be performed by an online search engine facilitated by the business information handling system 102. An advertisement of provider 106 may be included within a results page with results identified and/or compiled by the search engine and sent via the network 108 to the end-user interface 105 of the end user 104 that initiated the search.

In certain embodiments, the business information handling system 102 may be communicatively coupled or couplable to one or more data sources 110. The one or more data sources 110 may include any suitable source of data. In various embodiments, a data source 110 may include any one or more or combination of a database, a website, any repository of data in any suitable form, and/or a third party. In various embodiments, the one or more data sources 110 may correspond to one or more social media websites and/or photo-sharing websites.

According to certain embodiments, data may be actively gathered and/or pulled from data sources 110, for example, by accessing/crawling a data source repository. In various embodiments, the data from the one or more data sources 110 may be retrieved and/or received by the business information handling system 102 via the network 108 and/or through any other suitable means of transferring data. For example, in some embodiments, the business information handling system 102 and the data sources 110 could use any suitable means for direct communication. Other interface(s) 111 may facilitate communication with data source(s) 110, and, in various embodiments, may be implemented in similar manner to interfaces 105 and/or 107 or any other suitable interface.

Figure 2A:
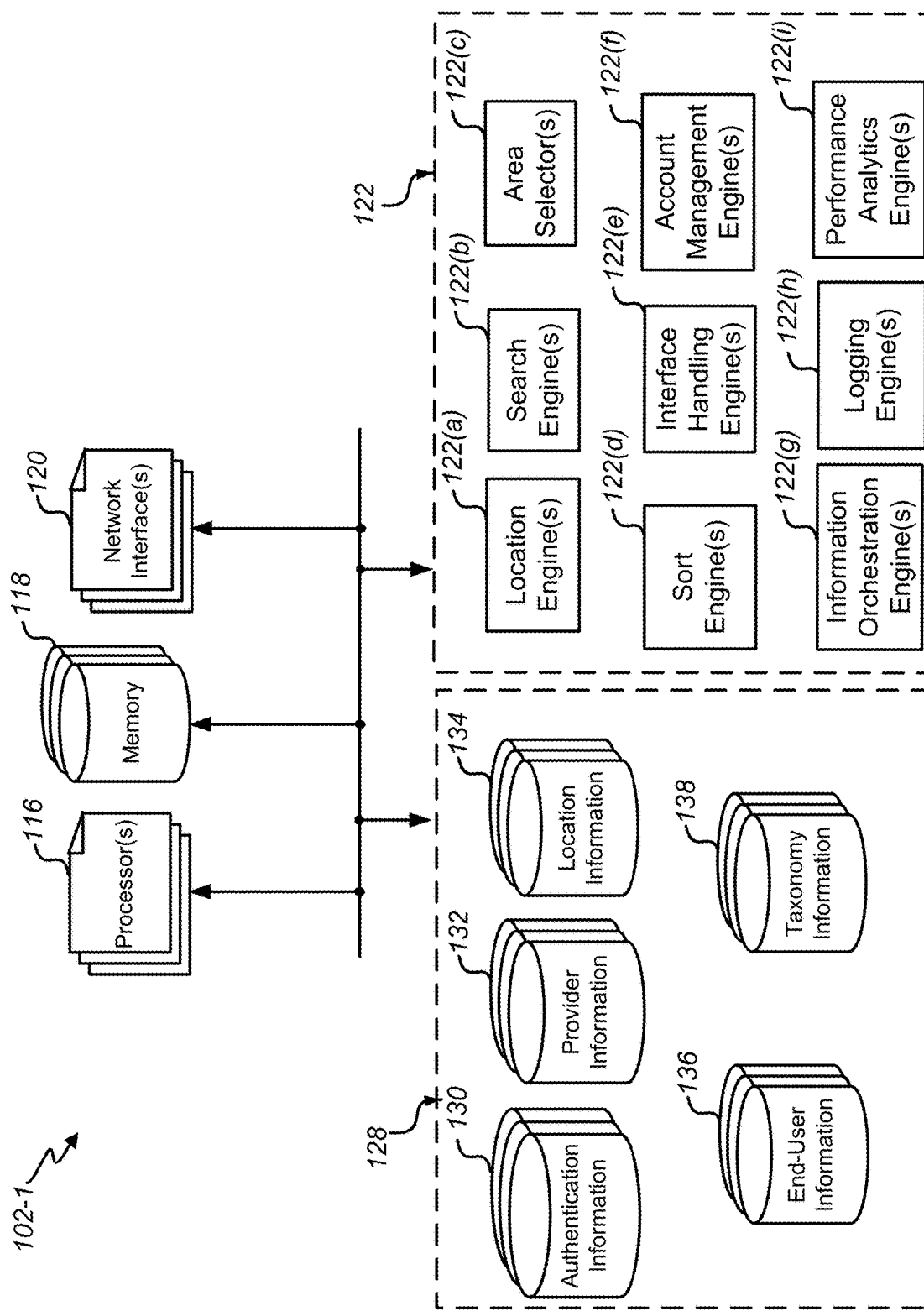
FIGS. 2A and 2B are high-level block diagrams of one example of a business information handling system, in accordance with certain embodiments of the present disclosure.
Figure 2B:
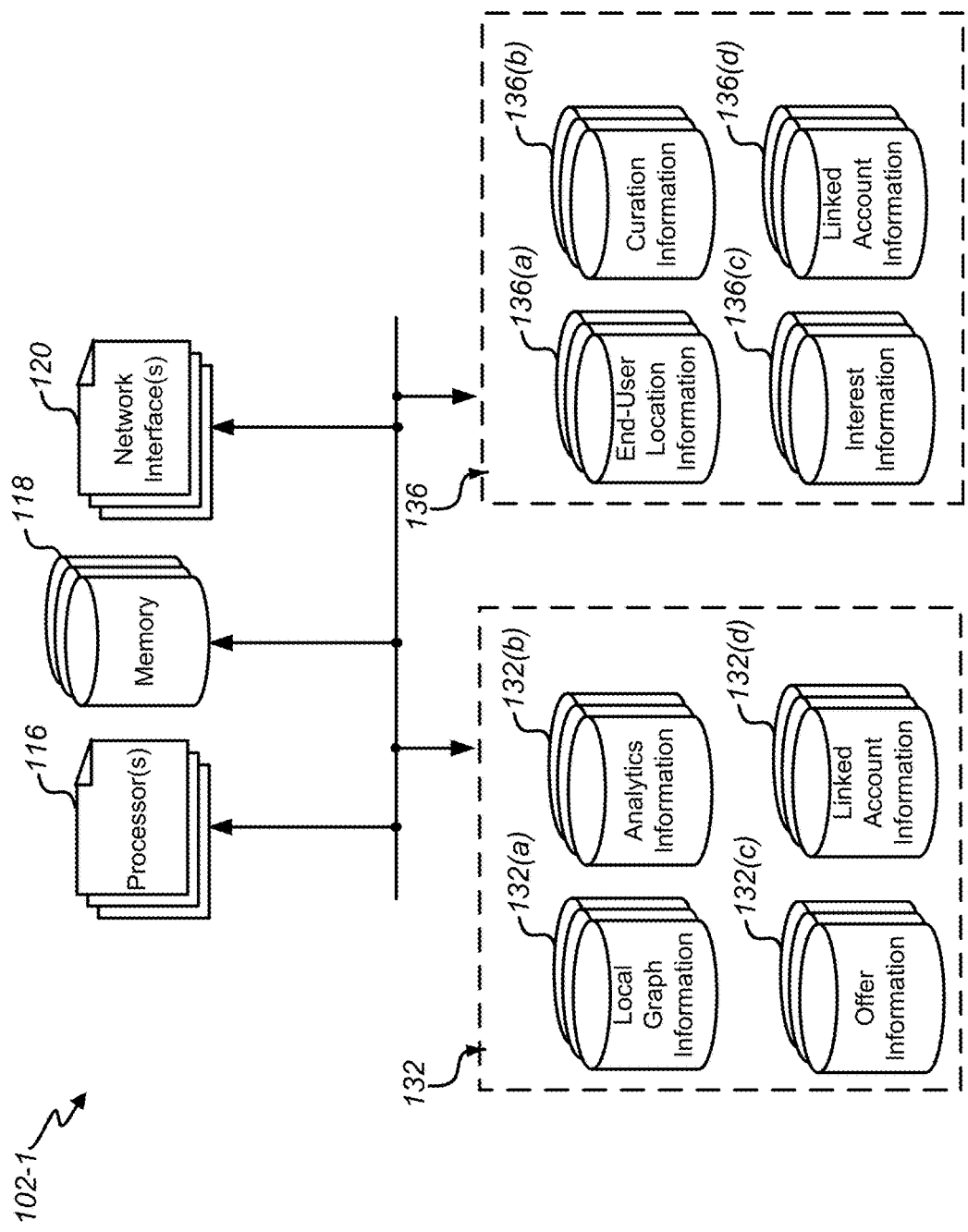

FIGS. 2A and 2B show high-level block diagrams of a business information handling system 102-1, in accordance with certain embodiments of the present disclosure. The business information handling system 102-1 may correspond to the business information handling system 102 of FIG. 1, but one embodiment of the business information handling system 102 is shown in more detail. While engines, modules, repositories, and other components are described separately herein, it should be appreciated that the components may be combined and/or implemented differently in any combination to provide certain features in various embodiments. In various embodiments, different processes running on one or more shared computers may implement some of the components.

As depicted, the business information handling system 102 may include one or more processors 116 communicatively coupled to one or more memories 118. The business information handling system 102 may include one or more network interfaces 120 communicatively coupled to processors 116. In certain embodiments, one or more processors 116, one or more memories 118, and/or one or more network interfaces 120 may correspond to one or more servers, which may include communication servers, web servers, gateways, application servers, database servers, and/or one or more other types of servers. In certain embodiments, the business information handling system 102 may be implemented in or with a distributed computing and/or cloud computing environment with a plurality of servers and cloud-implemented processing, memory, and data resources. Thus, with accretion of service information, the system may allow for scaling out with additional processing resources, server resources, data storage resources, data management resources, and the like. Some embodiments may use different types of servers to service different types of computing devices. The network interface(s) 120 may include any suitable input/output module or other system/device operable to serve as an interface between one or more components of the business information handling system 102 and the network 108. The business information handling system 102 may use the network interfaces 120 to communicate over the network 108 using any suitable transmission protocol and/or standard.

In some embodiments, one or more servers may communicate via one or more types of communication protocols, such as HyperText Transfer Protocol (HTTP), File Transfer Protocol (FTP), Wireless Application Protocol (WAP), etc. A server may provide static web pages, dynamic web pages, web services, web applications to a computing device of an end user or provider for execution in a web browser running on the computing device, scripts for execution within an isolated environment in a browser, and/or rich-client applications to the computing device that may have access to functions of the operating system running on the computing device.

Certain embodiments may provide a multi-channel communication regime to coordinate multiple communication channels used by end users and providers. Multiple communication pipes within a communication pipe could be implemented according to certain embodiments. Some embodiments may implement a greater number of communication channels. For example, one set of channels could be used for a consumer to request help, and one set of channels could be used for a provider to respond to the end user. The system can use web communication, text communication, voice communication, e-mail communication, push notification, and/or the like.

The business information handling system 102 may include one or more data repositories 128. One or more data repositories 128 may retain any information suitable for embodiments of this disclosure. The data repositories 128 may include database(s), database management system(s), server(s) to facilitate management/provision/transfer of information related to embodiments of this disclosure. In various embodiments, the data repositories 128 may be implemented in various ways. For example, one or more relational or object-oriented databases, or flat files on one or more computers or networked storage devices, may store the information. It should be appreciated that information corresponding to the repositories may be stored elsewhere and/or in other ways, or may not be stored, depending on the implementations chosen. Likewise, while various segregations of information corresponding to the repositories are provided herein, it should be appreciated that such examples are non-limiting, and some or all the information may be handled in any suitable manner.

In some embodiments, the one or more data repositories 128 may include one or more authentication information repositories 130 may retain any authentication information suitable to facilitate security for embodiments of this disclosure. The authentication information repositories 130 may include database(s), database management system(s), server(s) to facilitate management/provision/transfer of authentication information, and/or the like. The repositories 130 may retain authentication information of one or more particular end users 104, providers 106, and/or other data sources 110. The authentication information may include information to check credentials of end users 104, providers 106, and/or other data sources 110 that may use one of their corresponding interfaces to seek access, transfer information, and/or make business-related transactions with business information handling system 102. The authentication information may be used to provide security for transactions, restrict the access granted to a certain set of information and/or features, implement certain control and/or features for certain parties, and/or the like.

The one or more data repositories 128 may include one or more provider information repositories 132. The one or more provider information repositories 132 may retain provider information of particular providers 106. The repositories 132 may retain any information related to providers, including businesses and people, which may have street addresses or other location parameters, such as longitude and latitude coordinates, maps, driving directions, and/or the like, stored as locations in one or more location information repositories 134. For example, one or more provider information repositories 132 may retain any information related to provider identification information, provider profiles, provider certification information, business description, product descriptions, service descriptions, ratings/reviews/comments/preference indicia associated with providers, provider websites, provider pricing information, provider authentication information, provider statuses, provider relationships, organization details, payment methods, accounting information, credit information, asset information, collateral information, address information, contact information, business hours, availability, user account information, advertisements, announcements, and/or the like.

As illustrated in FIG. 2B, provider information may include local graph information 132(*a*). The local graph information 132(*a*) may include mapping information about a provider's connections to collections, windows, end users, and/or the like via the orchestration service. The local graph information 132(*a*) may include classification information about a provider and relation to user interest data and business categories. Generally, the local graph information 132(*a*) may include any information to facilitate provider inclusion in the orchestration platform in accordance with various embodiments described herein.

Provider information may include analytics information 132(*b*). The analytics information 132(*b*) may include any performance information related to particular providers, including any end-user data analytics related to particular providers. Provider information may include offer information 132(*c*) retained for particular providers. The offer information 132(c) may include offers that particular providers have created, business rules associated with provisioning offers to end users, and/or the like. Provider information may include linked account information 132(d). The linked account information 132(d) may include information about a provider's account(s) that are linked with the orchestration system, such authentication information for linked accounts, which accounts may include email accounts, short messaging accounts, online social/business networking accounts, and/or the like. The analytics information 132(b), the offer information 132(c), and the linked account information 132(d) may include any information to facilitate various features of one or more provider interfaces, in accordance with certain embodiments herein.

In some embodiments, the one or more data repositories 128 may include one or more end-user information repositories 136 to retain any suitable information associated with users in accordance with various embodiments disclosed herein. The end-user information may include end-user identification information, payment methods, accounting information, contact information, user account information, and/or the like. One or more end-user information repositories 136 may retain any information related to end-user location information 136(a), curation information 136(b), interest information 136(c) related to end user (which may include information related to indicia of interest), linked account information 136(d), and/or the like. The curation information 136(b) may include local graph information, which may include information about providers of interest, providers that have been added to a user's collection, geo-specific criteria for end user collections/profile, business information otherwise associated with the end user (which may include collection followings, e.g.), notes by the end user, photos and/or other images associated with the end user, preferences of the end user, arrangement/organizational particulars for business information associated with the end user, end-user requests, and/or any suitable information to facilitate any one or combination of the personal curation features described herein. The linked account information 136(d) may include information about an end user's account(s) that are linked with the orchestration system, end-user notification profiles, end-user authentication information, and/or any information to facilitate various features of one or more end-user interfaces, in accordance with certain embodiments herein.

In some embodiments, a computing device 105 may store end-user information 136. In some embodiments, both the computing device 105 and the online data repository(ies) 128 store the end-user information 136 for a particular end user 104. In some embodiments, when there is a data communication connection between the computing device 105 and the online data repository(ies) 128, the computing device 105 and the online data repository(ies) 128 may synchronize their copies of the end-user information 136 for the end user 104.

Referring again to FIG. 2A, the provider information 132 may be associated with locations 134. In various embodiments, the locations 134 may be part of the service provider information 132, or otherwise associated therewith. In some embodiments, the one or more data repositories 128 may include one or more taxonomy information repositories 138 to retain any suitable information associated with taxonomy feature in accordance with various embodiments disclosed herein. For example, one or more taxonomy information repositories 138 may retain mapping information, classification information, scoring criteria, and/or the like. Information retained in one or more taxonomy information repositories 138 may be used to classify user interest data/indicia, classify businesses, map user interests, businesses, and/or interest categories, and/or otherwise correlate and organize information in accordance with various embodiments disclosed herein.

The business information handling system 102 may include one or more information management handling engines 122 that may be stored in one or more memories 118 and may provide functionality when executed by one or more processors 116 to provide enhanced service provider handling features described herein. While the engines 122 are shown separately, it should be appreciated that in various embodiments the one or more engines 122 may be implemented collectively and/or integrally. The engines 122 may be configured to perform any of the steps of methods described in the present disclosure.

In some embodiments, one or more of the engines 122 and/or other modules may be servers communicating with the server(s). The server communication may be over a network, such as a local area network, a wide area network, an intranet, Internet, and/or the like. Any one or combination of the various servers may run on common or separate computers. In some embodiments, there may be one or more layers of application servers between communication servers and the data repository(ies) 128 to process the business logic and data access of the rich client applications. Alternatively, application servers may be integrated with the communication servers.

In some embodiments, one or more servers may provide listings information 132 with links to detail information, such as a map, business hours, driving directions, etc. The server(s) may provide user interfaces for the users to rate the listings information 132, provide reviews, view reviews from other users, make reservations via the listings information 132, make purchases via the listings information 132, etc. The server(s) can track various different types of user interactions with the listings to determine or estimate the level of user interest in the listings. The servers may provide rich client applications for execution in the mobile computing device to provide the user interfaces. The server(s) may be communicatively coupled to one or more of a location engine(s) 122(a), a search engine(s) 122(b), an area selector(s) 146(c), and/or a sort engine(s) 146(d) to process the search request and present search results based on the information stored in one or more data repositories 128.

In some embodiments, the location engine(s) 122(a) may include one or more engines and may use GPS coordinates, cellular tower triangulation techniques, Wi-Fi-based location information, carrier-provided location information, and/or other location determination systems to identify a location of the computing device 105. In some embodiments, the location engine 122(a) determines a location of interest to the end user 104 related to a search request. The location of interest may be based on a location of the computing device 105. In some embodiments, the end user 104 may explicitly specify the location of interest in a search request; and the location engine 122(a) extracts the location of interest from the search request. In some embodiments, a location of interest may be based on end-user information stored for a particular end user 104 and associated with identification information of the end user 104 or the computing device 105. In some embodiments, the end user 104 may specify some or all of the end-user information.

In some embodiments, the location engine 122(a) may automatically identify the location of interest based on determining the current location of the computing device 105 that is used to submit a search request and/or initiate a phone call. For example, the location engine 122(a) may determine the location of the computing device 92 based on a connection point the computing device 105 used to access the network 108 (e.g., based on the location of a wireless network access point, a base station of a cellular communication system, or a connection point to a wired network). In some embodiments, the computing device 105 automatically determines its current position (e.g., via a satellite positioning system, or a cellular positioning system) and transmits the determined or estimated position to the system 102 with the search request, or provides the position in response to a request from the location engine 122(a).

In some embodiments, the search engine 122(b) may retrieve information from the data repository(ies) 123 according to a search request. The search engine 122(b) may include logic for implementing searching of one or more information repositories. Other engines 122 may include and/or utilize the search engine 122(b) in various embodiments. The searching may be in response to information received over the network 94 from a user. Responsive to a query, the search engine 122(b) may search, retrieve, modify, and/or cause transfer of particular information from one or more information repositories.

The sort engine 122(c) may rank the information according to various bases discussed with embodiments herein. In various embodiments, the area selector 122(d) may be configured to select areas of interest in accordance with various embodiments described herein. In some embodiments, the area selector 122(d) may select a first geographic area based on the location of interest identified by the location engine 122(a). The search engine 122(b) may then retrieve a first set of service provider information that have corresponding locations within the selected first geographic area and that satisfies the search criteria, and, if sufficient results are not found for the first geographic area, a second geographic area may be selected in an iterative process, which second area may or may not include the first geographic area, for searching. In some embodiments, the search engine 122(b) may search for service provider information in a target area to obtain a set of search results; the area selector 122(d) may select geographic areas and may select groups of results that are within the selected geographic areas respectively.

In some embodiments, the interface handling engine(s) 122(e) may include logic to send, present, and receive information, with one or more of the interfaces to/from one or more consumers, service providers, and/or data sources. The interface handling engine(s) 122(e), with one or more the processors 116, may utilize one or more network interfaces 120 to transceive information through the network 108. The system 102 may pull and/or push information from those entities in any suitable way.

In some embodiments, the account management engine(s) 122(f) may include logic for implementing account features in various embodiments. By way of example without limitation, the account management engine(s) 122(f) may include logic one or more aspects of: handling user registration; managing account creation, updates, authentication, handling; and/or the like. The account management engine(s) 122(f) may be configured for acquiring, processing, formatting, and/or storing authentication information in the one or more authentication repositories 128.

In some embodiments, the information orchestration engine(s) 122(g) may include logic for implementing any features of personalized orchestration of business information in various embodiments disclosed herein. In some embodiments, the information orchestration engine(s) 122 (g) may facilitate an application on the end-user device to provide any such features. In some embodiments, the information orchestration engine(s) 122(g) may be incorporated in the application. In some embodiments, the information orchestration engine(s) 122(g) may include logic to implement and/or otherwise facilitate any taxonomy, classification, categorization, correlation, mapping, qualification, scoring, organization, and/or the like features discussed herein. The information orchestration engine(s) 122(g) may include interest data analytics modules may include logic to retrieve, process, derive, compile, aggregate, handle, store, report, and/or present information relating to interest data. In certain embodiments, the information orchestration engine(s) 122(g) may be configured to compile keyword criteria, for example, in an ontology, and could include an ontology reasoner or semantic reasoning module to make logical inferences from a set of facts in the ontology. Accordingly, the information orchestration engine(s) 122(g) may correspond to a reasoning engine configured to effect one or more features discusses herein. A pattern-based reasoner could be employed to use various statistical techniques in analyzing interest data in order to make inferences based on the analysis. A transitive reasoner could be employed to infer relationships from a set of relationships related to interest data. In certain embodiments, the information orchestration engine(s) 122(g) may include logic for implementing workflow features in various embodiments.

In some embodiments, the logging engine(s) 122(h) may include logic for implementing information logging features in various embodiments. By way of example without limitation, the logging engine(s) 122(h) could process data pulled and/or pushed from various entities. The logging engine(s) 122(h) could handle process, extracting, formatting, and/or storing/recording data including data for indicia of interest, preference data, taxonomy data, mapping data, and/or the like.

In some embodiments, one or more end-user data analytics engines 122(i) may include logic to retrieve, process, derive, compile, aggregate, handle, store, report, and/or present information relating to end-user data. The performance analytics engine(s) 122(i) may be configured to present any desirable information in any desirable manner. With respect to a particular provider, the logging engine(s) 122(h) and end-user data analytics engine(s) 122(i) may facilitate various features of one or more provider interfaces, in accordance with certain embodiments herein (e.g., interfaces 1800, 2100).

In some embodiments, one computer system implements one or more of the components of the system 102. Alternatively, different processes running on one or more shared computers may implement some of the components. For example, one computing module, thread, or process may implement multiple of the components. In some embodiments, special purpose data processing systems implement the one or more of the components. In some embodiments, processes running according to software instructions on general purpose data processing systems, such as general purpose personal computers or server computers, can implement the components. Thus, the implementations are not limited to particular hardware, software, or particular combinations of hardware and software.

Figure 3:
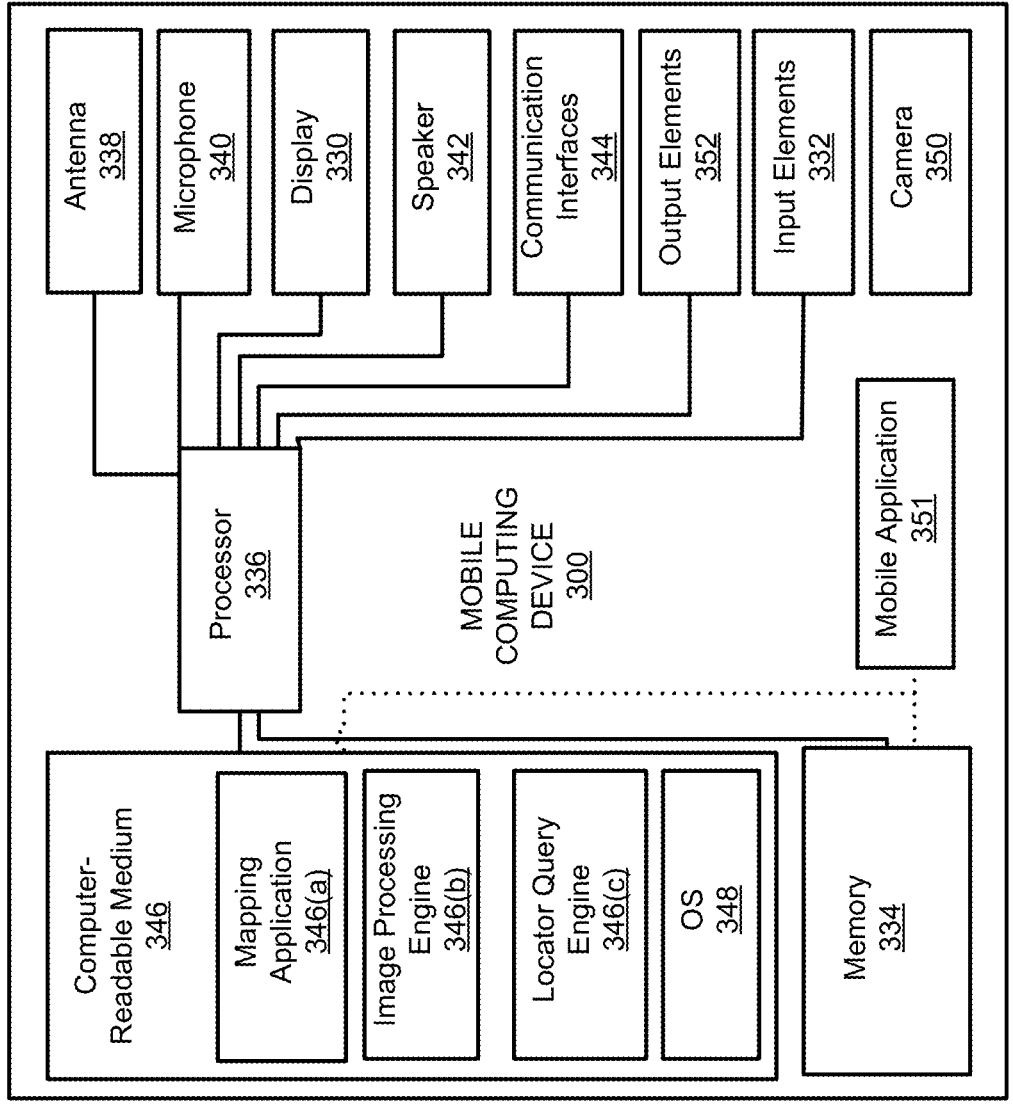
FIG. 3 is a block diagram of a mobile computing device, in accordance with certain embodiments of the present disclosure.

FIG. 3 is a functional block diagram of a mobile computing device 300, which may correspond to one or more of interfaces 105, 107, and/or 111, according to certain embodiments of the present disclosure. In some embodiments, the mobile computing device 300 may be provided with a mobile application 351 configured to run on the mobile computing device 300 to facilitate various embodiments of this disclosure. The mobile computing device 300 may be any portable device suitable for sending and receiving information over a network in accordance with embodiments described herein. For example without limitation, in various embodiments, the mobile computing device 300 may include one or more variously referenced as a mobile phone, a cellular telephone, a smartphone, a handheld mobile device, a tablet computer, a web pad, a personal digital assistant (PDA), a notebook computer, a handheld computer, a laptop computer, a vehicle computer, or the like.

As shown in FIG. 3, the mobile computing device 300 includes a display 330 and input elements 332 to allow a user to input information into the mobile computing device 300. By way of example without limitation, the input elements 332 may include one or more of a keypad, a trackball, a touchscreen, a touchpad, a pointing device, a microphone, a voice recognition device, or any other appropriate mechanism for the user to provide input. The mobile computing device 300 includes a memory 334 communicatively coupled to a processor 336 (e.g., a microprocessor) for processing the functions of the mobile computing device 300. The mobile computing device 300 may include at least one antenna 338 for wireless data transfer.

The mobile computing device 300 may also include a microphone 340 to allow a user to transmit voice communication through the mobile computing device 300, and a speaker 342 to allow the user to hear voice communication, music, etc. In addition, the mobile computing device 300 may include one or more interfaces in addition to the antenna 338, e.g., a wireless interface coupled to an antenna. The communications interfaces 344 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the mobile computing device 300 may be capable of transmitting and receiving information wirelessly through both short range, radio frequency (RF) and cellular and Wi-Fi connections.

Additionally, the mobile computing device 300 can be capable of communicating with a Global Positioning System (GPS) in order to determine to location of the mobile computing device 300. In the embodiment shown in FIG. 3, the antenna 338 may include a cellular antenna (e.g., for sending and receiving cellular voice and data communication, such as through a network such as a 3G or 4G network), and interfaces 344 may include one or more local communication interfaces. The antenna 338 may include GPS receiver functionality. In other embodiments contemplated herein, communication with the mobile computing device 300 may be conducted with a single antenna configured for multiple purposes (e.g., cellular, transactions, GPS, etc.), or with further interfaces (e.g., three, four, or more separate interfaces).

The mobile computing device 300 can also include at least one computer-readable medium 346 coupled to the processor 336, which stores application programs and other computer code instructions for operating the device, such as an operating system (OS) 348. The mobile application 351 may be stored in the memory 334 and/or computer-readable media 346. The computer-readable medium 346 can include a mapping application in some embodiments. In certain embodiments, the mapping application 346(a) can automatically run each time that a user accesses the mobile application 351.

The computer-readable medium 346 can also include an image-processing engine 346(b). The image-processing engine 346(b) can capture an image and compress the image in a format readable by a central processing server. With some embodiments, the image-processing engine 346(b) is separate from the mobile application 351. In other embodiments, the mobile application 351 may include the image-processing engine 346(b).

The computer-readable medium 346 on the mobile computing device 336 can also include a locator query engine 346(c), which allows a user to enter a word or phrase to locate an item, location, business, services, etc. With some embodiments, the locator query engine 346(c) is separate from the mobile application 351. In other embodiments, the mobile application 351 may include the locator query engine 346(c).

The mobile computing device 336 can additionally include an integrated camera 350, capable of capturing images and/or video, and output elements 352. In certain embodiments, the mobile computing device 336 may include a non-transitory computer-readable storage medium, e.g., memory 334, for storing images captured with the camera 350. In alternative embodiments, the mobile computing device 336 receives image data from an image capture device that is not integrated with the mobile computing device 336 and stores those images on the aforementioned non-transitory storage medium.

Figure 4:
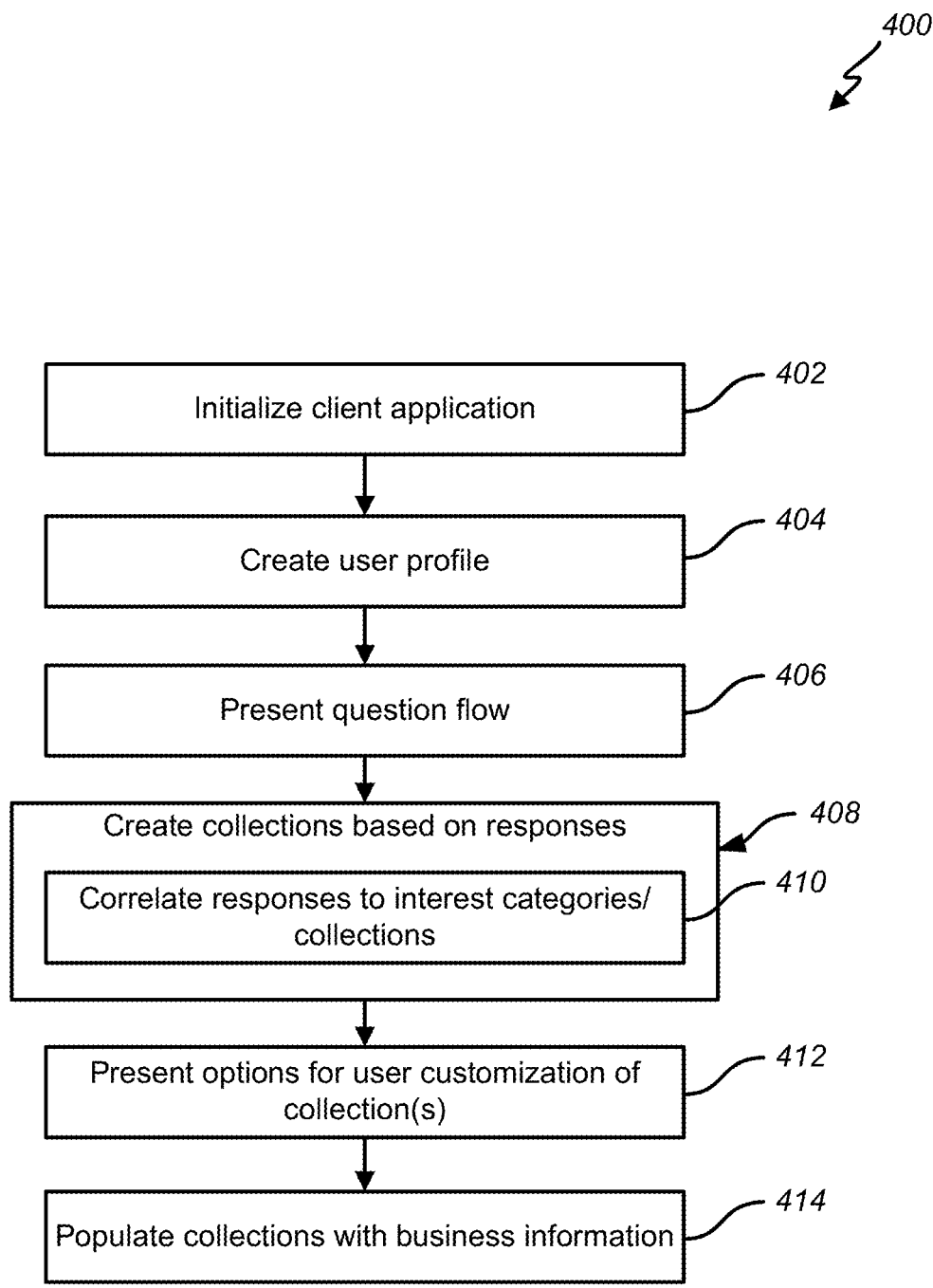
FIG. 4 is a block diagram that illustrates an example method of certain aspects of a personalized business information orchestration, in accordance with certain embodiments of the present disclosure.

FIG. 4 is a block diagram that illustrates an example method 400 of certain aspects of a personalized business information orchestration, in accordance with certain embodiments of the present disclosure. According to certain embodiments, the method 400 may begin as indicated by block 402. Teachings of the present disclosure may be implemented in a variety of configurations. As such, the order of the steps comprising the method 400 may be shuffled in any suitable manner and may depend on the implementation chosen. Moreover, while the following steps may be separated for the sake of description, it should be understood that certain steps may be performed simultaneously or substantially simultaneously.

One aspect of personalized business information orchestration may correspond to an end-user onboarding phase. The onboarding may include application initialization stage, as indicated by block 402. In some embodiments, the application could correspond to a webpage. In some embodiments, the end user could be using a mobile computing device. In some embodiments, a mobile application configured to run on a mobile computing device may be provided for the end user's mobile computing device. For example, the mobile application may be made available from the system 102 or any website for download to the mobile computing device; alternatively, it may be pre-installed on the mobile computing device and stored in the device's memory and/or computer-readable media. An end user installing a mobile application may correspond to initializing a client application on a computing device in some embodiments.

The end-user interface provided by the platform may facilitate the onboarding phase. In various embodiments, an end-user interface may include providing one or more display screens that may each include one or more user interface elements. An end-user interface may include any text, image, and/or device that can be displayed on a display screen for providing information to a user and/or for receiving user input. An end-user interface may include one or more widgets, text, text boxes, text fields, tables, grids, charts, maps, hyperlinks, buttons, lists, combo boxes, checkboxes, radio buttons, and/or the like.

Figures 8A, 8B, 8C:
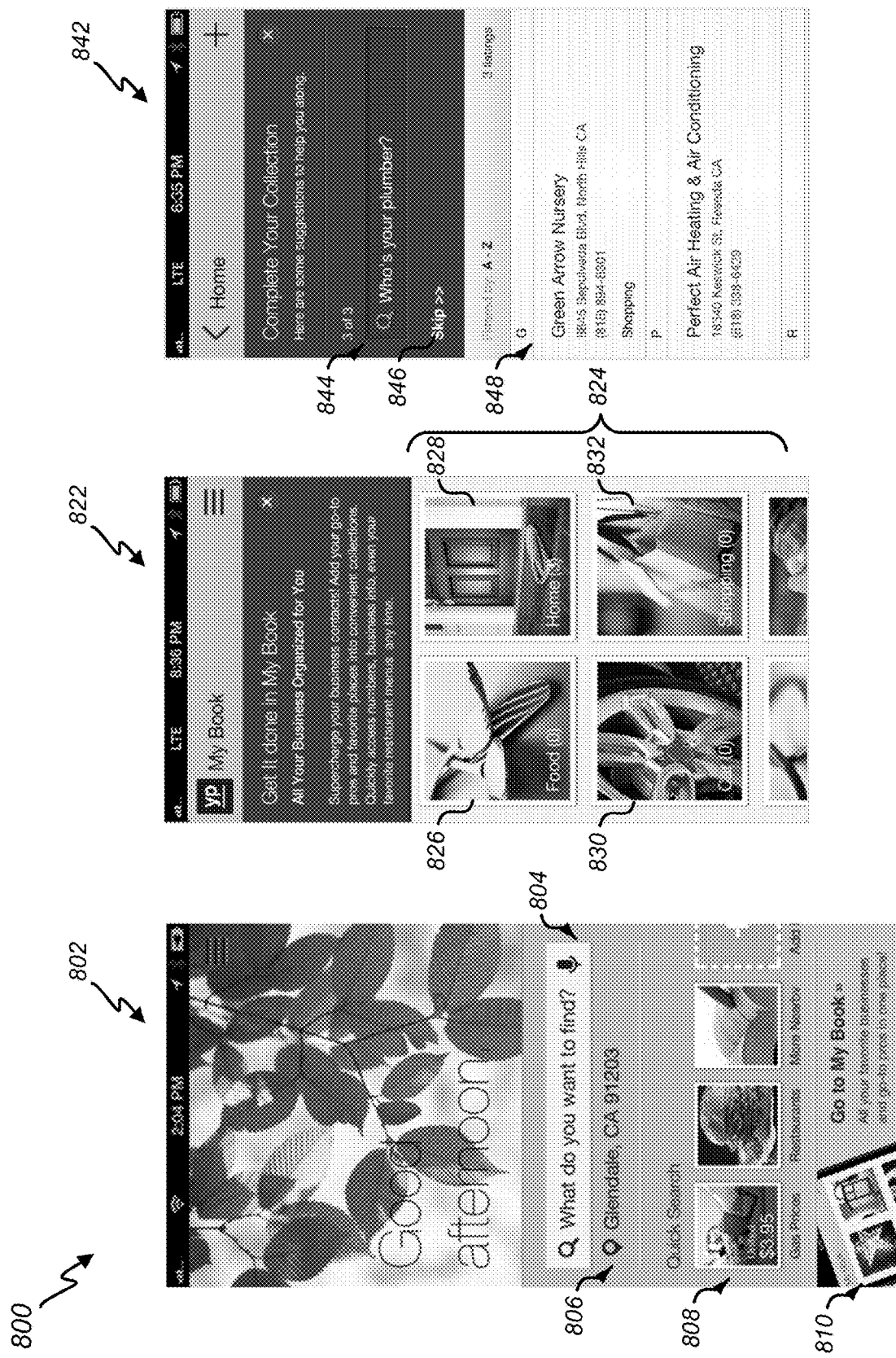
FIGS. 8A, 8B, 8C, 8D, and 8E are screenshots illustrating example end-user interfaces, in accordance with certain embodiments of the present disclosure.

FIGS. 8A, 8B, 8C, 8D, and 8E are screenshots illustrating example end-user interfaces 800, in accordance with certain embodiments of the present disclosure. FIG. 8A illustrates a graphical user interface 802 that may be used in implementations of certain embodiments of the present disclosure. FIG. 8A shows a screenshot, which may be a partial screenshot, of a search interface 802 that may be displayed via a mobile application or any suitable end-user interface 105 in various embodiments. In some embodiments, a webpage could implement a same or similar search interface, for example.

The search interface 802 can be displayed at a user device 300, for example. A query field 804 may be configured for input of keyword information for a search by a user, for example, via text entry and/or voice entry. In some embodiments, the search interface 802 may also include a location field 806 for location information to indicate a location of interest related to the keyword information for the search input by the user, for example, via text entry and/or voice entry. The location field 806 could automatically indicate a default location for the user automatically determined based any suitable location identification method, such as one or more of the location identification methods disclosed herein, including user history, a user profile, and/or the user's current location as detected by GPS, cellular positioning, network access point, and/or the like.

The search interface 802 can present user-selectable options 808 for quick searches according to any suitable category. The search interface 802 can present user-selectable options 810 related to one or more personalized collections of business information. The options 810 could correspond to an initialization process for a user to set up one or more personalized collections of business information; the options 810 could correspond to a navigational feature that enables the user to navigate to one or more personalized collections that have already been set up.

Referring again to FIG. 4, the onboarding phase of personalized business information orchestration may include a user profile stage, as indicated by block 404. A user profile may be created along with initialization of an application or embodiments for along with registering as a user via webpage in some embodiments. The user profile may be created automatically for the user, and user may be able to thereafter customize the profile. A user profile may include persistent information that is maintained about an end user. A user profile may include any data stored in an end-user information repository whether or not it is part of the profile as shown to an end-user via an end-user portal.

A personalized collection utility may include various features for identifying a user's interests. In some embodiments, as indicated by block 406, one or more questions may be presented to the user to gauge a user's interests. In certain embodiments, an automated question flow may present a series of questions presented to the user, the answers to which, as provided by user selections, may indicate user interests.

In some embodiments, organization of business information into collections may be based on default criteria and/or user-specified criteria. As some potential non-limiting examples of collections, there may be a home collection, a garden collection, a pet collection, a family collection, a health collection, a kids collection, a collection customized to a specific project, etc. A collection may allow for retrieval of listings at any time.

FIG. 8B illustrates a graphical user interface 822 for a personalized collection utility that may be used in implementations of certain embodiments of the present disclosure. FIG. 8B shows a screenshot, which may be a partial screenshot, of an interface that may be displayed via a mobile application or any suitable end-user interface 105 in various embodiments. In some embodiments, a webpage could implement a same or similar interface, for example. The personalized collection utility may provide one or more ways in which a user may organize the user's business relationship information. The personalized collection utility may automatically manage, update, and maintain relationship information in order to make the user's life a lot easier. Certain embodiments allow saving of listings information into one or more collections 824, and certain embodiments may automatically organize a user's listings into collections 824. By saving of listing information for later use, a user may readily retrieve listing information for businesses of interest.

In the example depicted, options or various collections 824 are presented, including a food collection option 826, a home collection option 828, a car collection option 830, and a shopping collection option 832. The options may be user-selectable options that enable a user to navigate to business information associated with each collection 824. A collection 824 may allow for retrieval of listings and/or other business-specific information at any time. In some embodiments, certain collection options could be presented to the user as a default, which the user may thereafter customize.

Referring again to FIG. 4, the onboarding phase of personalized business information orchestration may include a collection creation stage, as indicated by block 408. In some embodiments, a default set of collections could be presented to the user. In some embodiments, collection creation could include correlating responses, which were received from the user per the question flow, to interest categories/collections, as indicated by block 410. The most appropriate set of collections determined based on the responses may be suggested to the user, or the application could simply be configured to include the set of collections, and the user may thereafter customize the collections in any suitable manner.

As indicated by block 412, options for customization of collections may be presented to the user. And, as indicated by block 414, the collections may be populated with business information. Certain embodiments may provide the option for a user to create a custom collection. For example, a user could create a custom collection for a kitchen remodeling project. Providers that are helping, and/or could potentially help, the user with the project could be associated with the collection. Features could also be provided to the user to allow the user to make and retain notes related to the project, such as notes on the providers, indicia of whether the user likes particular providers or not, which providers have been contacted, information obtained from providers, which providers have been selected, etc.

Figure 5:
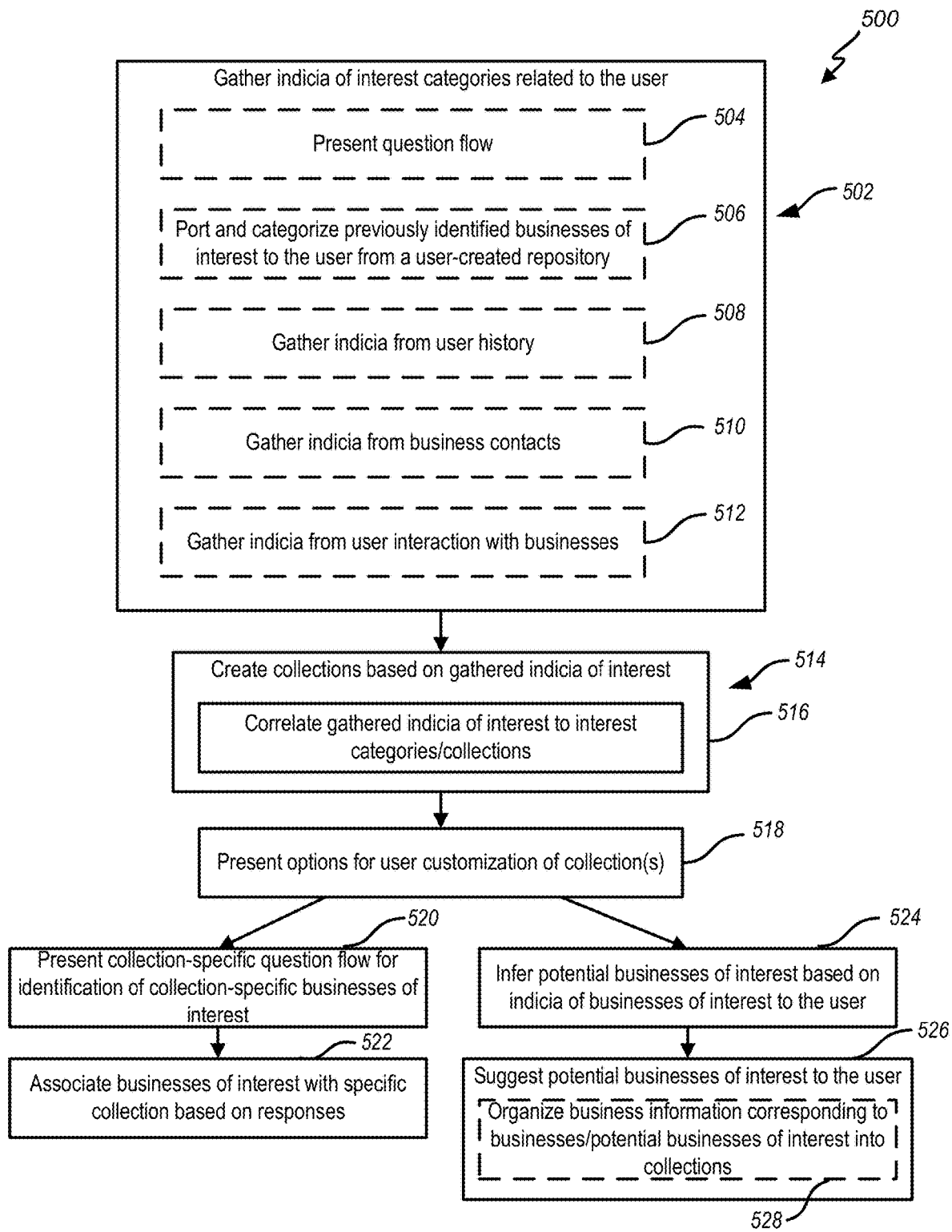
FIG. 5 is a block diagram that illustrates an example method of certain aspects of a personalized business information orchestration, in accordance with certain embodiments of the present disclosure.

FIG. 5 is a block diagram that illustrates an example method 500 of certain aspects of a personalized business information orchestration, in accordance with certain embodiments of the present disclosure. According to certain embodiments, certain aspects of the method 500 may be implemented in addition to or in alternative to certain aspects of the method 400. As indicated by block 502, indicia of user interests may be gathered. The personalized collection utility may include various features for identifying potential indicia of user interests.

In some embodiments, as indicated by block 504, one or more questions may be presented to the user to gauge a user's interests. This may correspond to block 406 of the method 400. Accordingly, an automated workflow may include a series of questions presented to the user, the answers to which, as provided by user selections, may indicate user interests.

Some embodiments may provide for porting and categorization of previously identified businesses of interest to the user from a user-created repository of information on businesses of interest, as indicated by block 506. Some embodiments may provide for options for user initiation of porting and categorizing; some embodiments may perform the process automatically. The application implementing the personalized collection utility may be configured with a plug-in, module, API, and/or otherwise to gather information from the end-user device and/or relate that information to the businesses of potential interest to the user.

In some embodiments, the personalized collection utility may include features for automatically identifying potential businesses of interest to a specific user based at least in part on user history information, as indicated by block 508. A particular user could have a history and/or profile associated with using search features facilitated by the business information handling system 102, for example, via a client application, a webpage, a mobile application, and/or the like. For example, businesses of potential interest may be identified from web browsing history information retained on the user computing device. Not only may businesses associated with the history and/or profile be identified, but also attendant business-specific information may be identified for population of collections. Some embodiments may provide for options for user initiation of gathering indicia from user history information; some embodiments may perform the process automatically.

In some embodiments, the personalized collection utility may include features for automatically identifying potential businesses of interest to a specific user based at least in part on business contacts of the user, as indicated by block 510. Some embodiments may provide for options for user initiation of gathering indicia based on business contacts; some embodiments may perform the process automatically. For example, business contacts retained on the user computing device (such as business contacts in an address book, a phone book, etc.) may be harvested.

Once one or more business contacts are identified based on harvesting of the user computer device and/or account, the backend system 102 may search for business information based on the identified business contact, supplying the application with pertinent updated information. In various embodiments, if the backend system 102 cannot confirm the identified business contact, the contact may be discarded or indicated as a potential business of interest needing clarification from the user. And more generally, in various embodiments, various indicia of interest may be captured, searched, correlated to logged business information, verified, updated, and/or used to gather additional related business-specific information by the application and/or the backend system 102.

In some embodiments, the personalized collection utility may include features for automatically identifying potential businesses of interest to a specific user based at least in part on user interactions with businesses, as indicated by block 512. Some embodiments may provide for options for user initiation of gathering indicia based on user interactions with businesses; some embodiments may perform the process automatically. Some embodiments may identify businesses of potential interest based on applications installed on the user computing device, such as mobile applications that are associated with particular businesses and/or business types. Some embodiments may identify businesses of potential interest based on phone call and/or messaging history information retained on the user computing device and/or available from other data sources. Some embodiments may identify businesses of potential interest based on email contact with businesses and/or business representatives. Some embodiments may identify businesses of potential interest based on calendar items related to appointments with businesses (such as hair appointments, nail appointments, dental appointments, etc.).

Some embodiments may identify businesses of potential interest based on user indications of preference (such as positive rating business, an indication of liking the business, friending or otherwise linking to a business, sharing business information with others, etc.) that the user has made via webpages and/or social media. Such indications of preference may be garnered from information associated with application on the user's computing device and/or via other data sources 110. The personalized collection utility may include features for automatically identifying potential businesses of interest to a specific user based at least in part on one or more other accounts of the user. The user's orchestration account could be linked (e.g., via API) to one or more other accounts of the user, including an account associated with online social/business networking services (which may include microblogging/short messaging services), an email account, and/or any other suitable data source 110. In some cases, the user may be prompted to login to the user's other account(s) to allow for the harvesting. In some cases, previously provided authentication information stored by the system 102 may be used so that logging in is not necessary to enable the harvest. Businesses of interest could be identified by approval/disapproval indicators, which may be in form of likes, dislikes, thumbs-up, thumbs-down, star-scale ratings, number-scale ratings, fan indications, affinity group association, messages to businesses, and/or the like. The approval/disapproval indicators could be those associated with the user's profile and/or profiles of friends/associates/connections of the user.

In some embodiments, the gathering of indicia of interest may support the generation of user profiles, and could be used to refine user profiles. In some embodiments, user profiles may be transferred from the application to the information handling system 102. In other embodiments, only information related to the profiles may be transferred to the backend system 102. The information handling system 102 may have profiles for businesses. As indicated by block 514, one or more collections may be created based on the gathered indicia of interest. As indicated by block 516, the gathered indicia of interest may be correlated to interest categories/collections. In some embodiments, the business profiles may include or be linked to one or more taxonomies that map particular businesses/business categories, particular interests/interest categories and/or particular questions for presentation to users.

As indicated by block 518, options for customization of collections may be presented to the user. As indicated by block 520, one or more collections-specific that questions may be presented to the user for identification of collection-specific businesses of interest. User-selectable options corresponding to interest categories may be presented for user selection. For example, options corresponding to categories such as my kids, my home, my pets, etc. may be presented to the user. The user-selectable options may allow the user to drill down into particular interest categories. For example, once a user taps into an individual collection, one or more questions may be presented to the user relating to the individual collection to help user set up that collection. Referring to FIG. 8B, for example, say a user taps the individual collection 828 relates to the user's category of "my home." The user may be presented with a collection-specific graphical user interface 842, as illustrated by FIG. 8C, which shows a screenshot, which may be a partial screenshot for a personalized collection utility that may be used in implementations of certain embodiments of the present disclosure.

As indicated by 844, one potential question presented the user could be "Who's your plumber?" The question could be presented with options 848 for a number of actual plumber names, plumber business names, and/or other plumber listings for the user to select. The options 848 presented with the question could be identified based on gathered indicia of businesses of interest to the user and/or options near the location of the user, such as the nearest three or so plumbers. Though not depicted, the nearby options could be indicated on a map presented to the user with the interface 842. A text entry field 844 could allow the user to enter an indication of a plumber in response to the question. Along with such questions, a user-selectable option to skip 846 a given question or a series of questions may be presented. Referring again to FIG. 5, one or more businesses of interest may be associated with one or more collections based on user responses to the collection specific questions, as indicated by block 522.

In some embodiments, information harvested regarding a user may be used to infer potential businesses of interest to the user, as indicated by block 524. And such potential businesses of interest may be suggested to the user, as indicated by block 526. For example, if interest data indicates that a user has a pet, local businesses related to pets and/or that otherwise would only be of interest if one has a pet could be identified/suggested as potential businesses of interest. Similarly, if interest data indicates that a user is a parent, businesses that would only be of interest to parents could be identified/suggested as potential businesses of interest. As indicated by block 528, business information corresponding to businesses/potential businesses of interest may be organized into collections as discussed herein.

Figure 6:
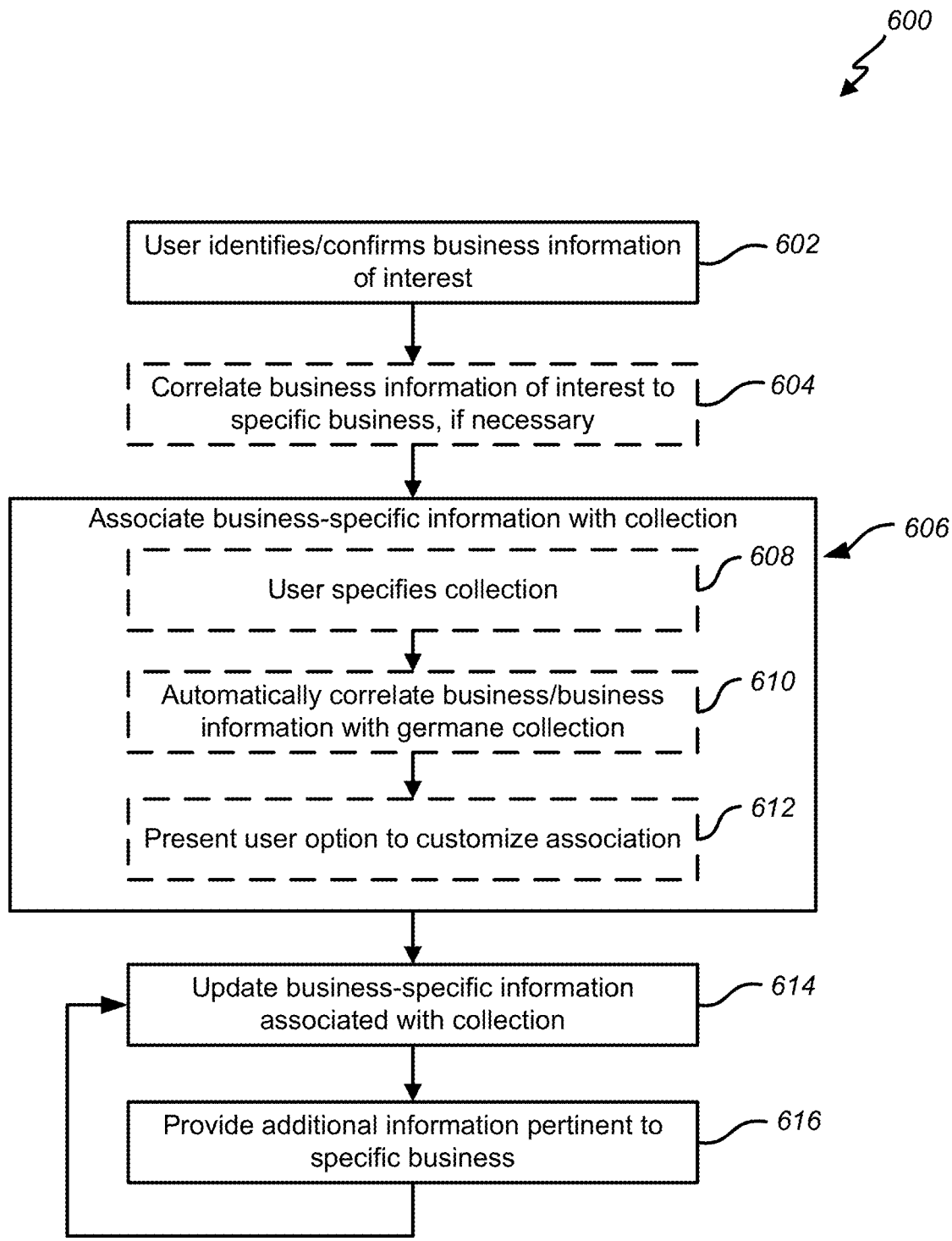
FIG. 6 is a block diagram that illustrates an example method of certain aspects of a personalized business information orchestration, in accordance with certain embodiments of the present disclosure.

FIG. 6 is a block diagram that illustrates an example method 600 of certain aspects of a personalized business information orchestration, in accordance with certain embodiments of the present disclosure. According to certain embodiments, the method 600 may begin as indicated by block 602. Teachings of the present disclosure may be implemented in a variety of configurations. As such, the order of the steps comprising the method 600 may be shuffled in any suitable manner and may depend on the implementation chosen. Moreover, while the following steps may be separated for the sake of description, it should be understood that certain steps may be performed simultaneously or substantially simultaneously.

Figures 8D, 8E:
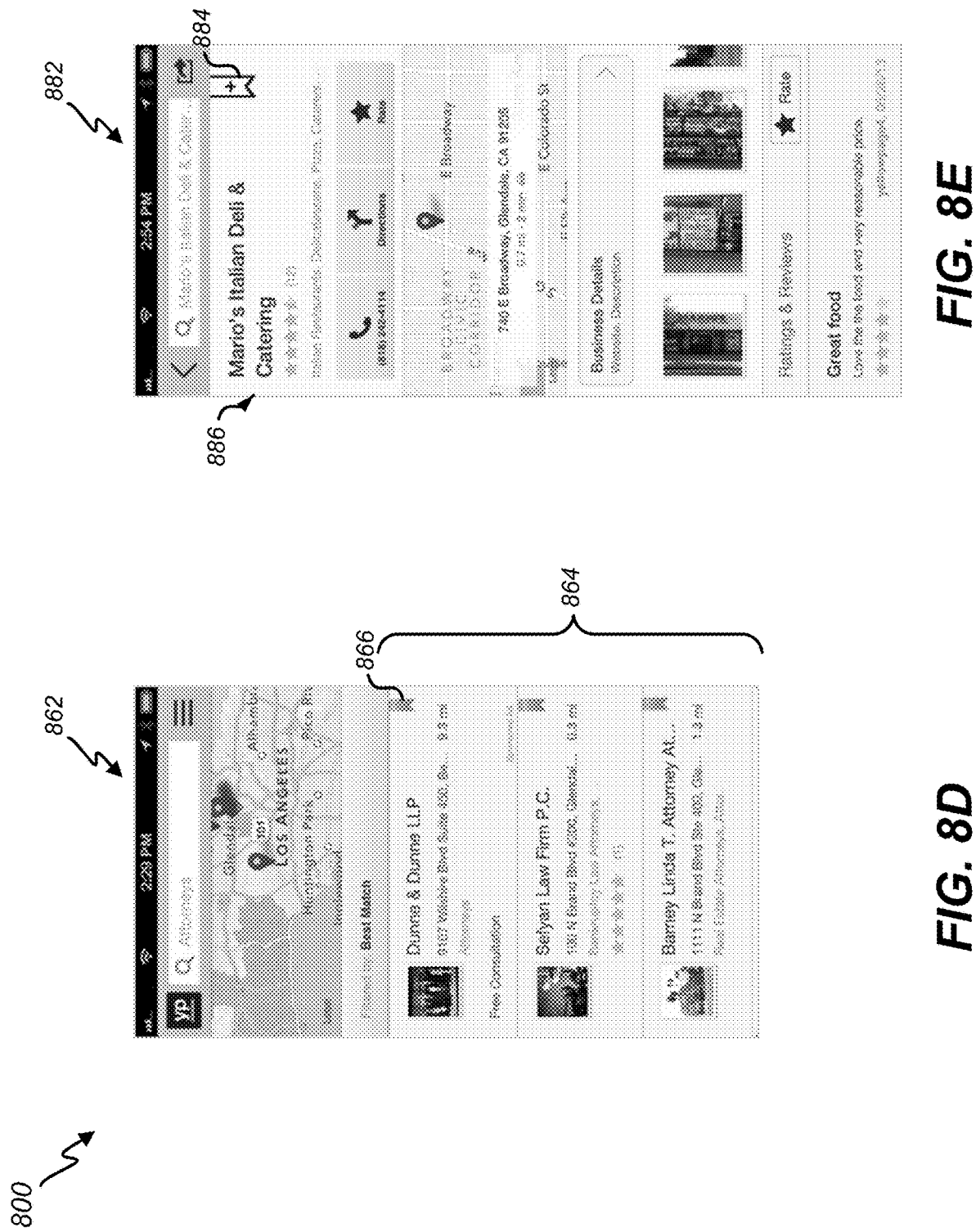

As indicated by block 602, an end-user may identify/confirm business information of interest. In some cases, a user may be performing a search with the application. FIG. 8D illustrates a graphical user interface 862 for searching for business information, in accordance with certain embodiments of the present disclosure. FIG. 8D shows a screenshot, which may be a partial screenshot, of an interface that may be displayed via a mobile application. In some embodiments, a webpage could implement a same or similar interface. Responsive to a search request by an end user, a set of businesses may be selected by the system 102 as corresponding to the user's search criteria, including location. The set of businesses may be compiled and presented to the consumer with as search results 864. Along with each search result 864, a user-selectable option 866 may be presented to the user so that upon user selection, e.g., a single click, a particular business may be added to the user's collections. Thus, in the example case, a specific business may already be identified by the system 102 prior to being presented to the user. In some cases, however, a specific business may need to be confirmed by the user, for example, when a suggestion has been identified based on gathered indicia of interest, and a potential business of interest is presented to the user.

As indicated by block 604, in some embodiments, the business information of interest may be correlated to a specific business if necessary. For example, when the business information of interest is not specific, is ambiguous, and/or corresponds to multiple businesses, a specific business may need to be identified based on the business information. The business information of interest could include one or more of gathered indicia of interest, responses to questions presented to the user, and/or interest categories.

As indicated by block 606, business-specific information may be associated with a particular collection. In some embodiments, the association may be according to a collection specified by the user, as indicated by block 608. In some embodiments, a user-selectable option may be presented to the user upon identification of a business of interest. For example, after a user selects an option such as option 866, a prompt could be presented to the user to indicate to which of the user's collections the particular business should be linked. In some embodiments, a user-selectable option could be presented for the particular business to be automatically correlated and linked with the appropriate collection. In some embodiments, the automatic correlation and linking of the particular business with the appropriate collection could be by default such that the user need not be prompted. Accordingly, as indicated by block 610, the business identifier or other business-specific information may be automatically correlated with a germane collection. In some embodiments, the user may be notified of the automatic correlation, and, as indicated by block 612, a user-selectable option may be presented to customize the association with the particular collection, in some embodiments.

As indicated by block 614, additional information pertinent to the specific business may be linked to the collection for presentation to the user. FIG. 8E illustrates a graphical user interface 882 for specific business information saved or savable in a collection, in accordance with certain embodiments of the present disclosure. FIG. 8E shows a screenshot, which may be a partial screenshot, of an interface that may be displayed via a mobile application. Business listing information 886 may be linked to the collection. The business listing information 886 may include address information, directions, ratings information, map information, business details, user reviews, coupons, etc. An indicator 884 may indicate that the specific business is saved in a collection or could be a selectable option to add the listing information for the specific business in a collection.

Referring again to FIG. 6, as indicated by block 616, business-specific information associated with a collection may be updated based on information from the information handling system 102. Business listing information associated with a collection may be automatically updated by the information handling system 102 such that, when listing information is retrieved from a collection, the listing information may be updated information. Thus, a collection allows for the maintenance of listing information of interest to provide a user with the most up-to-date listing information for the businesses that matter to the user. And, thus, if a provider associated with a collection has moved or changed phone numbers, the user will not be left with obsolete information (as the user would otherwise be if such information was recorded into an address book) because the change may be captured so that the collection would be automatically updated with the new information.

Figure 7:
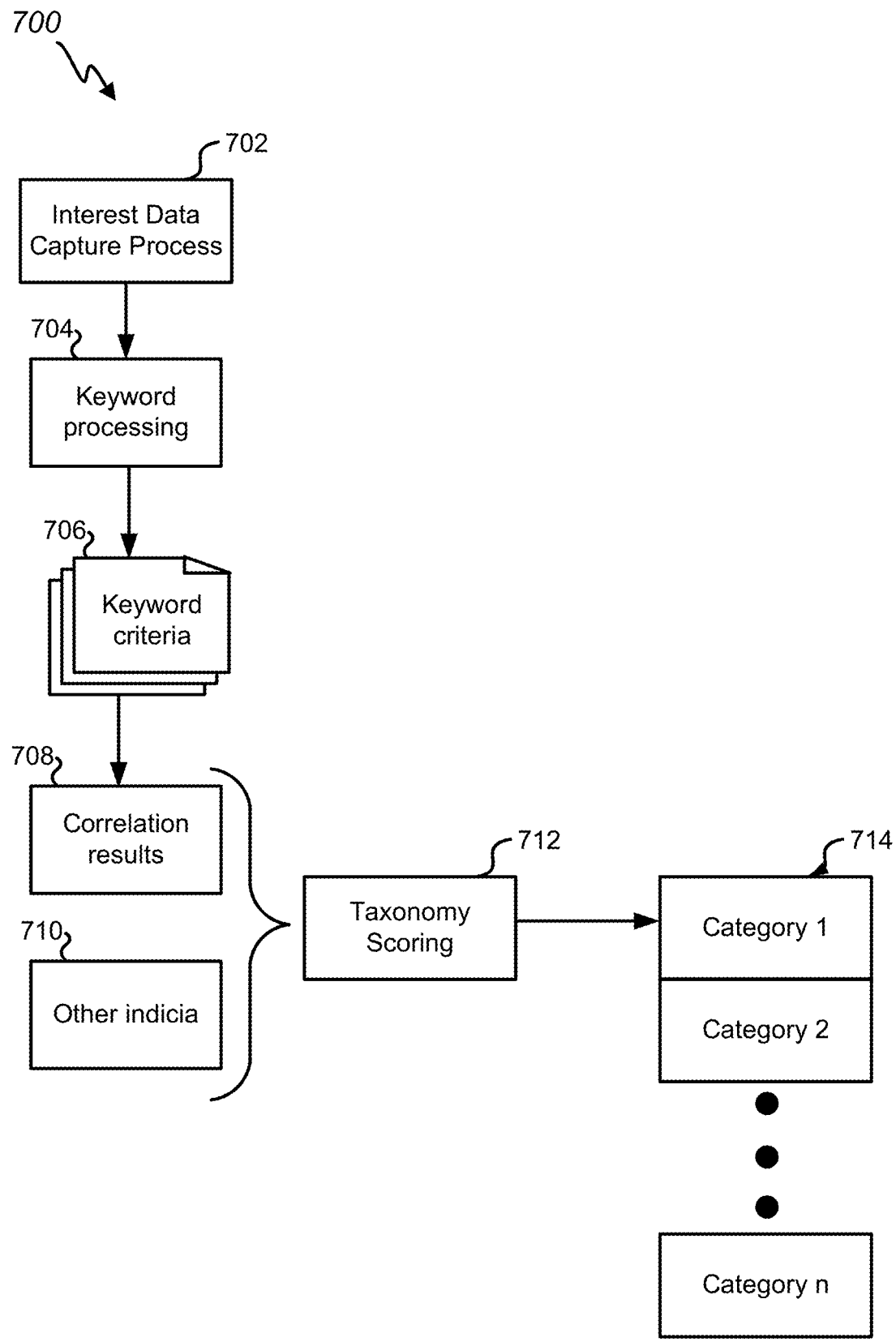
FIG. 7 illustrates a functional block diagram of certain aspects of personalized business information orchestration, in accordance with certain embodiments of the present disclosure.

FIG. 7 depicts a functional block diagram of certain aspects of personalized business information orchestration 700, in accordance with certain embodiments of the present disclosure. Various embodiments may employ any one or combination of various methods of correlation of interest data, interest categories, and businesses.

Interest data may include any suitable information that may be captured via an interest data capture process 702 to indicate, infer, and/or determine interest categories and/or businesses of interest. As discussed herein, certain embodiments may use a client application 351 installed on the user's computing device to facilitate data capture. In some embodiments, the client application 351 may qualify captured data in part or in whole and/or send captured data to the information handling system 102 for qualification.

Having interest data, the information handling system 102 and/or the application 351 may implement a qualification process. Some embodiments may qualify an interest according to a graduated scale. Any suitable scale may be used in various embodiments. In some embodiments, a scale could entail a categorization scheme 714, with any suitable categories. In some embodiments, a taxonomy scoring system 712 could be correlated to the category scheme, such that certain scores may correspond to certain categories so that, based on a given set of interest data, a high correlation score to a particular category may indicate the category is more appropriate. Some embodiments may score with a numerical expression. Accordingly, a taxonomy score may indicate which categories are more/most likely to be appropriate for a user, thus providing a quantitative estimate of a user interest. By way of example without limitation, a scale could include a range of scores from 0 to 100, or from 0 to 1,000, with the high end of the scale indicating greater probability. Some embodiments may use methods of statistical analysis to derive a score. Various embodiments may determine a score based on any one or more suitable quantifiers.

Some embodiments may employ a decision tree, checklist, workflow, and/or the like to capture various aspects of interest data and assess those aspects to infer interest qualification. Such a decision tree, checklist, and/or workflow may incorporate any one or combination of the depicted aspects and/or similar aspects in any desired order, according to various embodiments. Interest data can be consolidated and processed to yield a taxonomy score 712.

Certain embodiments may provide for keyword processing 704 of gathered interest data, such as any data related to indicia of interest discussed herein. In some embodiments, an impression engine, which could be included in the engine(s) 122, could perform keyword identification. The call impression engine could be configured to recognize evidence of interest potential. Taxonomy scores 712 may be based at least in part on keywords gathered.

The impression engine may identify keywords as distinctive markings and could compile the keywords for the purposes of characterization from the perspective of interest potential. The keywords could be correlated with keyword criteria 706 to characterize the data from the perspective of interest potential and to generate correlation results 708 that can be taken into account with scoring 712. In some embodiments, the correlation results 708 can be taken into account in conjunction with other indicia 710, which could correspond to any one or combination of the other indicia of interest potential discussed herein such as location information and/or the like. As discussed herein, various embodiments may employ any one or combination of methods of capturing location information, including but not limited to, gathering location information via any one or combination of the user's computing device, such as the device GPS capabilities, access points, third parties, receiving explicit location information with one or more search requests, inferring location information from one or more search requests, and/or the like.

Figure 9:
FIG. 9 is a screenshot illustrating an example end-user interface, in accordance with certain embodiments of the present disclosure.

FIG. 9 is a screenshot illustrating an example end-user interface 900, in accordance with certain embodiments of the present disclosure. FIG. 9 shows a screenshot, which may be a partial screenshot, of the end-user interface 900 that may be displayed via any suitable end-user interface 105, which may correspond to a webpage or mobile application in various embodiments. The end-user interface 900 may correspond to an end-user's personal account that would be accessible to the end-user after login and authentication.

The end-user interface 900 may present user identification information 902 that may retain in the one or more repositories 128. In various embodiments, user identification information 902 may include, for example, the user's name/alias, one or more images associated with the user (such as, images uploaded by the user, more or less generic images selected by default, and/or images pulled from other data sources, such as the user's linked online social media account(s)), and/or the like.

The end-user interface 900 may be presented responsive to a request for user's personalized business information transmitted from the end-user computing device, such as a login request. The system 102 may access the user's personalized business information retained in the one or more repositories 128. In some embodiments, certain personalized business information may be retained locally on the end-user computing, and the local information may be synchronized/updated based on the information retained in the one or more repositories 128. In other embodiments, personalized business information may be freshly transmitted, in whole or in part, from the system 102 to the end-user computing device.

The user's personalized business information may be provided in according with the user's curation information. The personalized curation information may include geo-relevant graph information specific to the user. The geo-relevant graph information may include collection information that specifies one or more collection characteristics. The collection characteristics may include any suitable parameters defining aspects of the user's collections, including one or more of collection themes, associated business categories, information about location(s) of interest to the user, businesses windows mapped to the collections, arrangement information specifying a visual arrangement of collections to presented to user, custom content added and/or modified by the user and/or other users (such as notes, images, graphical customizations, editorial customizations, etc.), privacy attributes, and/or any other collection characteristics described herein.

The geo-relevant graph information may include window information that specifies one or more window characteristics. The window characteristics may include any suitable parameters defining aspects of the windowed information provided to the user, including one or more of specific businesses mapped to a given window, geo-specific criteria for the specific businesses, custom content added and/or modified by the user and/or other users (such as notes, images, graphical customizations, editorial customizations, etc.), privacy attributes, and/or any other window characteristics described herein.

In some embodiments, the system 102 may access a set of business information retained in the one or more repositories 128, the set of business information being related to businesses specified by the geo-relevant graph information. The system 102 may window the set of business information to at least partially form one or more windowed sets of information. The windowing could include one or more of identifying selecting, processing, compiling, arranging, and/or providing any pertinent business information for a particular business of interest described herein.

For example, in various embodiments, the windowing could include using geo-specific criteria to furnish information for a particular business location (e.g., one out of multiple location options, say, for a business chain or other business that has multiple sites), a particular provider and/or contact (e.g., one out of multiple provider and/or contact options for a particular business), and/or the like. The windowing could include selecting only particular information items that pertain to a particular window. In some cases, a user could modify the type of content desired for a particular business, and particular information items could be furnished accordingly. The windowing could include checking the set of business information for updated information (such as changes in contact information, location information, review information, and/or any other pertinent information).

In some embodiments, the windowing could include gathering user-generated content pertaining to a particular business, discussed further herein. In some cases, user-generated content was previously provided by the end user and retained by the system 102. In some cases, user-generated content was previously gathered, pushed, and/or pulled from data sources 110 and retained by the system 102. In some cases, user-generated content is actively gathered, pushed, and/or pulled from data sources 110 on an as-needed basis to freshly provide the content with the windowed set of information and/or to update/check content previously retained and that is to be provided with the windowed set of information.

In some embodiments, windowed sets of information may be formed and retained by the system 102 in anticipation of a request to provide the information to the user. In some embodiments, windowed sets of information may be formed responsive to a request. In some embodiments, previously formed windowed sets of information may be updated responsive to a request. In various embodiments, window information components may be compiled prior to transmission to an end-user computing device and/or may be transmitted separately.

In the example depicted, the end-user interface 900 may present the user's current collections 904, the curation of which is facilitated by the platform. The user's current collections 904 may be indicated in any suitable manner, including with images, color coding, alphanumeric indicia, and/or the like. A sorting feature 918 may allow for presentation of one or more user-selectable options to sort the collections 904 in any suitable manner, including according to activity (e.g., activity by the user, a collaborator, a business, business information updating via the system 102, review activity, activity by other users registered with the orchestration service and/or other users interacting about the particular businesses via online social media services, and/or the like), latest updates, latest additions of businesses to a collection, alphabetically according to collection name, number of businesses associated with a collection, collaborative/non-collaborative characteristic, public/non-public characteristic, and/or the like.

In some embodiments, like the example depicted, numbers of businesses associated with each collection may be indicated. For example, twenty-one businesses are indicated as associated with the collaborative collection directed to the Santa Monica Restaurant theme, in the collaborator section 908 and in the collection section 904 with indication of the Santa Monica Restaurant collection 914. And, generally, with presentation of collections 904, whether collaborative or not, numbers of businesses associated with each collection 904 may be indicated as in the depicted example (e.g., the Car collection is textually indicated as having seven associated businesses) or in any other suitable manner.

One or more user-selectable options may be available to the user to designate whether a collection is public or private. A private designation could be a default in some embodiments. If a collection is designated as public, the collection could be viewable/searchable to other users. In some embodiments, collections may be graphically distinguished in any suitable manner based on being public or private. The example depicted portrays illustrative graphical private collection indicators 924 and public collection indicators 926. A collection could also be designate as viewable/searchable to a select group of other users. For example, the select group could include other users individually selected by the user, other users who are also friends/associates via an online social/business networking service, other users who associated with a certain affinity group, and/or the like.

The end-user interface 900 may include one or more social panes 906. The one or more social panes 906 could include a collaborator section 908 for embodiments that provide the option for the user to allow one or more collaborators to have access to one or more collections. For example, a husband and wife may both curate a Kitchen Remodel collection, like the depicted example, in view of their kitchen remodeling project. As another example, a user may collaborate with another in planning a trip, say a tour of the West Coast, visiting whiskey bars along the way. To that end, the tourists could curate a West Coast Whiskey Bars collection, like the depicted example. Accordingly, the collaborator section 908 could include information about one or more collaborators that have access to one or more collections of the user.

The end-user interface 900 may be configured to indicate, not only collaborators, but also the particular collaborative collections. In the example depicted, Angela M. is indicated in the collaborator section 908 as a collaborator with Ricardo on a kitchen remodel collection and a Santa Monica Restaurant collection. Collaborative collections may be graphically distinguished from non-collaborative collections. For example, a graphical indicator 916 corresponding to the Santa Monica Restaurant collection may indicate the collaborative nature of the collection. However, collections may be distinguished in any suitable manner, including with images, color coding, alphanumeric indicia, and/or the like.

Figure 10:
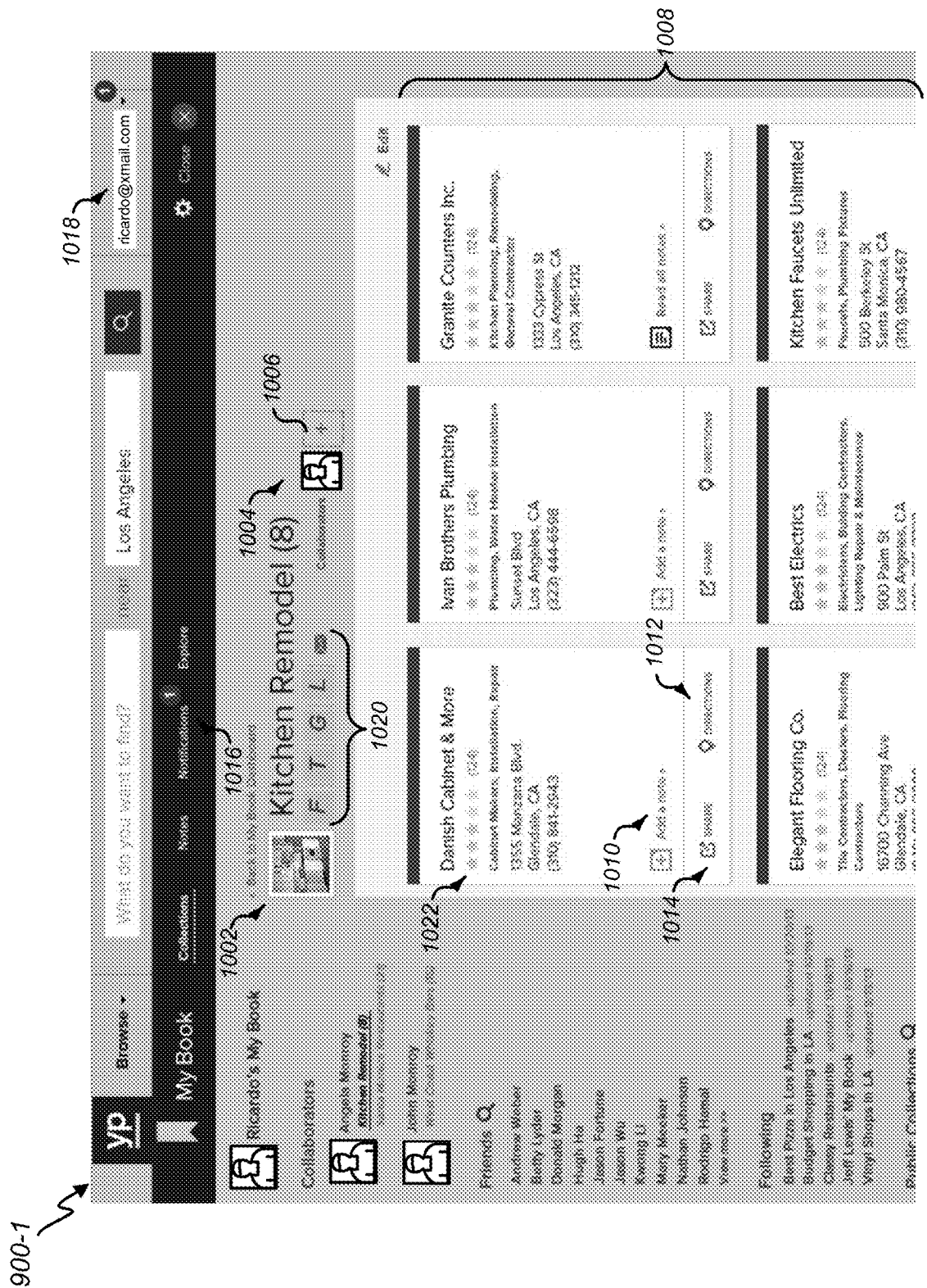
FIG. 10 is a screenshot, which may be a partial screenshot, of an end-user interface that may be displayed after navigating/drilling down into a collaborative collection, in accordance with certain embodiments of the present disclosure.

One or more user-selectable options may be provided to navigate to a collaborative or non-collaborative collection. For example, the user may tap or click into one of the collaborative collections 904 that is designated as being collaborative. FIG. 10 shows a screenshot, which may be a partial screenshot, of the end-user interface 900-1 that may be displayed after navigating/drilling down into a collaborative collection 1002. The example depicts a Kitchen Remodel collection 1002 relating to a remodeling project. The collection 1002 may include one or more curated information windows 1008, each corresponding to a business.

Each information window 1008 may present any suitable listing information for the respective business. In some embodiments, the listing information may be retained on the backend system 102 and provided to the user portal on demand. In some embodiments, the listing information may be retained on the user device 105 and updated by the backend system 102 on any suitable basis, including, for example, based on one or more of user login, user access of particular collections, launch of the application, a batch process, a real-time update when new information is available, and/or the like. In some embodiments, an information window 1008 may include advertisements from a business, images associated with a business, options for video/audio from a business for presentation to the user, a video/audio/textual chat option to connect with a business, a select-to-call option to connect with a business, and/or the like. An information window 1008 may include a directions feature 1012 configured to provide directions and/or mapping information consequent to user selection. The information may be provided in conjunction with a mapping application, resident on the device 105 and/or network-facilitated.

An information window 1008 may include a notes feature 1010 configured to allow the user to make and retain notes related to the provider, such as notes on the providers, indicia of whether the user likes particular providers or not, which providers have been contacted, information obtained from providers, which providers have been selected, etc. Any suitable content could be added in accordance with various embodiments. A user could add photos, for example. Say, a user has a photo of a desired kitchen design that the user wants to mimic for the user's kitchen remodel; the user could upload the photo to a kitchen remodel collection. In some embodiments, a user could import a photo from another account of the user, say a photo-sharing/repository account, an online networking services account, etc. The user could link to the other account as described herein, and a data collection utility provided by the orchestration account may be configured to port the photo(s) to the user's collection/window.

As another example, photos of one or more of a service need, a completed service, a service in progress, receipt(s), warranties, invoices, and/or the like could be uploaded to the orchestration account. Each photo may be time-stamped by the system 102 and retained in the one or more repositories 128 for later access and retrieval by the user. Accordingly, the platform may provide a way to have a filing system directed to services—a record system for the user. As described herein, a vendor could be a collaborator or could be otherwise enabled to view certain collections/windows of the user. In this manner, certain embodiments may provide an additional means to facilitate ongoing engagement with local vendors.

An information window 1008 may include a share feature 1014 configured to share an information window 1008 with others in one or more ways. For example, the share feature 1014 may include one or more user-selectable options to propagate the information window 1008 to another collection in some embodiments. Say, for example, that the user decides a particular business is appropriate for another collection of the user, the user can add the corresponding information window 1008 to the other collection via the share feature 1014.

As another example, the share feature 1014 may include one or more user-selectable options to share the information window 1008 with another user of the online orchestration service in some embodiments. In some embodiments, entire collections can be shared. The end-user interface 900-1 may include one or more collection share options 1020 configured to allow sharing of collection information in any suitable manner.

A window and/or collection could be shared with another user of the online orchestration service, for example, via a notification to an account associated with another user. Responsive to a share selection, the platform may send a notification to an account associated with another user. The notification could be provided via the other user's account. By way of example, the end-user interface 900-1 may include notification features 1016 that allow a user to be apprised of new notifications received as directed to the user, and allow the user to view the notification(s) upon user selection of one or more notification options. Thus, in the example depicted, the user, Ricardo, could receive a notification 1016, which could be a result of another user sharing an information window 1008 and/or collection 1002.

In various embodiments, the shared information could be at least partially viewed and/or incorporated into user's account with viewing of the notification 1016, with viewing a message corresponding to the notification 1016, and/or with selection of one or more user-selectable options provided consequent to the notification 1016. The presentation of shared information could be by way of summary information that summarizes and/or characterizes information from/relating to the shared collection. For example, summary information about the shared information could be generated and included for viewing with viewing of the notification 1016 and/or a message corresponding to the notification 1016. In some embodiments, the shared information could be viewed, at least in part, with selection of one or more user-selectable options provided with the notification 1016 and/or a message corresponding to the notification 1016. In some embodiments, one or more user-selectable options may be provided for incorporating the corresponding collection/information window into a collection of the user.

The share feature 1014, 1020 may include one or more user-selectable options to share the information window 1008 and/or collection 1002 with others via any suitable means of notification. For example, text messages, voice notifications, push notifications, e-mails, social/business networking services account postings/messages, alerts with the application, and/or other any suitable means could be employed to allow for the presentation of collection/window information. In some embodiments, the user's orchestration account could be linked (e.g., via API) to one or more other accounts of the user, say, an email account, for example. The end-user interface 900-1 may include linked account features 1018 that may allow for notifications of any communications received via the other account and/or may provide one or more user-selectable options to launch and/or otherwise access the other account.

The user's orchestration account could link to any suitable account of the user, including an account associated with online social/business networking services and/or any other suitable data source 100. And, thus, a posting about the business could be made in association with the user's account and/or another's account responsive to the user selection of the share option. In some cases, the user may be prompted to login to the user's social/business networking media account to make the posting. In some cases, previously provided authentication information stored by the system 102 may be used so that logging in is not necessary to make the posting in the other account. The share feature 1014, 1020 may be configured to facilitate the setup of the information sharing, whether it be a networking services account posting, an email, a text message, or otherwise, and present the communication setup for previewing and dispatch by the user. A link or other user-selectable option could be shared to allow for the viewing/incorporation of further collection information. In some embodiments, users who are not yet registered with the service could be invited to do so in conjunction with a collection sharing communication.

In some embodiments, a snapshot of a collection or a single window could be shared. The snapshot could take any suitable form, include an image, a text file, and/or the like. A share feature 1014, 1020 could present an option to send a snapshot, and, consequent to user selection, could convert a collection/window to a snapshot form and proceed with communication in a manner discussed above.

FIG. 11 shows an example 1100 of sharing collection information via social/business networking services account postings, in accordance with certain embodiments. Say, for example, the user, Ricardo, is asked about who did the work on his kitchen remodel. The user can share information about his Kitchen Remodel Collection via a posting 1102 to his social media account. The posting 1102 may include summary information 1104 about the collection. The posting 1102 may include one or more user-selectable options to view more collection information, to view collection information via the online orchestration service, to login/register with the orchestration service, and/or the like.

Figure 12:
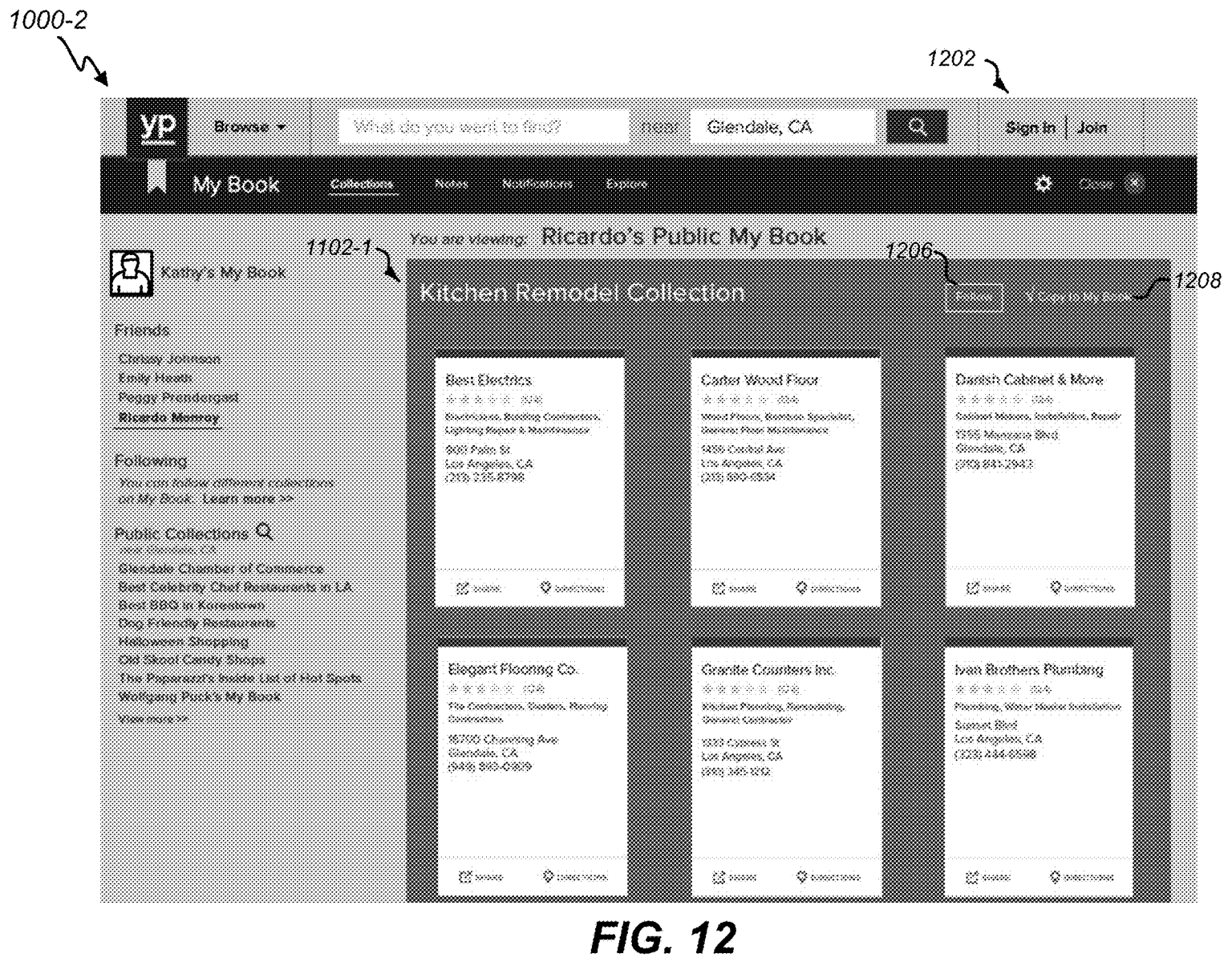

For example, one or more user-selectable options may be provided to navigate to a public profile accessible via the orchestration platform. FIG. 12 shows a screenshot, which may be a partial screenshot, of a public profile 1000-2 that may be displayed after selection of a link made available with posting 1102. The example depicts Ricardo's public Kitchen Remodel Collection 1102-1. The collection 1102-1, having been designated as public, could be a landing page viewable, for example, as a result of a user selection of a link from a posting 1102.

In some embodiments, one or more user-selectable options may be presented depending on the viewer. For example, login/registration options 1202 may be provided. For a registered user, a follow option 1206 may be provided to enable the user to follow Ricardo's collection. After the user opts to follow the collection, update notifications may be sent to the user based on subsequent actions taken with respect to the collection, such as collection curation, annotation, augmentation, and/or any modification of interest taken.

For a registered user, a copy option 1208 may be provided to enable the user to copy the collection 1102-1 to the user's set of collections. Once copied over to the user's collection set, the copy could become the user's collection. The user may then use and modify the collection as desired.

Referring again to FIG. 11, in some embodiments, user feedback from the social/business networking services may be captured by the system 102. For example, information about user approval/disapproval indicators 1106, which may be in form of likes, dislikes, thumbs-up, thumbs-down, star-scale ratings, number-scale ratings, and/or the like, could be captured. Captured user feedback could be processed and reflected back through the orchestration services platform. Thus, a certain collection and/or business may have accumulated user feedback from other forms and such feedback could be indicated via the user's collection(s) and/or information window(s) in any suitable manner.

Referring again to FIG. 10, the interface 900-1 may indicate user feedback data in any suitable manner. For example, an information window 1008 may include one or more user review indicators 1022. Similar review features could be provided on a collection basis, in addition or alternative to an individual business basis. The one or more user review indicators 1022 may include composite and/or segregated review information garnered from reviews via the listing service of the platform, online social/business networking service(s), the orchestration service, and/or any suitable data source(s) 100. In various embodiments, the system 102 may actively monitor, gather, push, and/or pull user feedback data from such sources in any suitable way. As a particular example of gathering user feedback on businesses, in many cases, businesses associated with the system 102 may have individual business pages setup for public viewing/interfacing via a one or more online social/business networking services and/or other data sources 100. In some cases, the system 102 may facilitate setup of such business pages for the businesses. User feedback data from such sources may be monitored, gathered, and/or pulled by the system 102.

When presented via the interface 900-1, the source of composite review information could be distinguished. For example, review information coming from the listing service could be so indicated, review information coming from social media could be so indicated, etc. Moreover, the types of review information could be differentiated. For example, say user feedback from one social media site includes feedback in the form of "like" indications; an information window 1008 could indicate the number of likes that the business received via that social media site over any time period(s) of interest (e.g., the past year, six months, month, week, day, hour, etc.). Thus, certain embodiments may provide for temporal windowing may allow a user to see businesses trending in the user's neighborhood, city, and/or other local area.

The example depicts the collection 1002 configured as having one collaborator, as indicated by 1004. A collaborator could be another user of the online orchestration service in some embodiments. In some embodiments, users who are not yet registered with the service could be invited to do so in conjunction with an invitation from a registered user to be a collaborator. One or more user-selectable options 1006 could be presented via the end-user interface 900-1 to allow the user to enlist collaborators, who may be registered users or who may not be registered. Responsive to enlist option selection, the platform may send a notification to an account associated with an invitee. In some embodiments, where an invitee is a registered user, the notification could be provided via the invitee's accounts. The end-user interface 900-1 may include notification features 1016 that allow a user to be apprised of new notifications received as directed to the user, and allow the user to view the notification(s) upon user selection of one or more notification options. Thus, in the example depicted, the user, Ricardo, could receive an invitation via a notification 1016. However, any suitable means of notification may be employed. For example, text, voice, e-mail, alerts with the application, and/or the like could be sent. In some embodiments, the user's orchestration account could be linked (e.g., via API) to another account of the user, say, an email account, for example. The end-user interface 900-1 may include linked account features 1018 that may allow for notifications of any communications (which communications are not limited to collaboration and registration invitations) received via the other account and/or may provide one or more user-selectable options to launch and/or otherwise access the other account. A notification could include a link or other communication reference referring back to the platform, prompting the invitee to respond. For example, the notification could provide a link for users to register and/or login to the platform to respond. In some embodiments, the invitee may respond via the same medium in which the notification was sent (e.g., text, voice, e-mail, etc.), and the system 102 may process the response, extracting requested information.

Some embodiments may allow the user to determine a level of access granted to a collaborator. In some embodiments, the access could be read-only access. Thus, the user could specify that one or more other users may only be allowed to view a certain collection. In addition to viewing access, the level of access could include write access. A collaborator could have editing access and/or access to add content such that the collaborator may add notes, photos, preference indicia, ratings indicia, additional business selections/information, etc. Accordingly, any changes that one collaborator makes to a collection may be reflected in the collection as viewed by one or more other collaborators.

A collaborator could be a service provider associated with one or more of the businesses designated in the collaborative collection. For example, a user might want a general contractor to be a collaborator on a project, which general contractor could be associated with a designated business or could be independent. Accordingly, such collaborators could help coordinate a project or otherwise provide input on a project. And, more generally beyond the example of a general contractor, any desired business provider could be a collaborator and be enabled to provide input.

Referring again to FIG. 9, the one or more social panes 906 could include a friends section 918 for embodiments that provide for interaction between the orchestration service and one or more online social media services (e.g., via API). A user may have the option to associate the user's orchestration account with one or more social/business networking services. One or more user-selectable options and workflows may be provided for the user to provide necessary authentication information for the user's other networking account(s) and to associate the other networking account(s). In some embodiments, the system 102 may retain the authentication information and link to the data sources 110 to coordinate interface with the other accounts, gather information from the user's particular account(s), and provide information for presentation via the end-user interface 900. Consequent to such association, the friends section 918 could identify friends and/or others that are linked to the user via social/business networking services. Additional information, such as whether certain friends/associates are logged in to the orchestration service and/or social/business networking services, could be presented via the friends section 918. Those friends/associates that have orchestration accounts could be distinguished from those that do not in any suitable manner.

Figure 13:
FIG. 13 is a screenshot, which may be a partial screenshot, of the end-user interface that may be displayed after navigating to another user's public collections, in accordance with certain embodiments.

In some embodiments, one or more user-selectable options may be provided to navigate to another user's account. The friend indicators in the friends section 918 could in include such options, for example. In addition or alternative, a search interface could be provided to search for other user accounts. FIG. 13 shows a screenshot 1000-3, which may be a partial screenshot, of the end-user interface 900 that may be displayed after navigating to another user's public collections, for example, by selecting an option 1302 from the social panes 906. The example depicts public collections 1304 of another user, Jason. Accordingly, only those collections 1304 which have been designated as public would be viewable.

Referring again to FIG. 9, the one or more social panes 906 could include a collection following section 920. The collection following section 920 may identify public collections that the user has selected to follow. Additional information, such as update information or any other suitable information pertaining to the followed public collections, could be indicated, as well. Update notifications could be general or could be specific, indicating, for example, that business information has changed (new telephone number, new reviews, new ratings, a change in ratings of the business by third party organizations, a change in business profiles/webpages, etc.)

The user may be presented with options to search 922 for public collections of others. The search could be geo-aware such that public collections associated with the user's general vicinity could be searched. The option to search another vicinity of interest to the user could also be provided so that the user may indicate a different vicinity of interest. In some embodiments, options to input a trip, by starting point, endpoint, route, and/or otherwise may be provided so that the user could search for collections relevant to the trip. For example, a user may be interested in a tour of California wineries and may so indicate in order to search for collections pertaining thereto. Public collections could be selected for presentation to the user based at least in part on one or more of business location(s) in relation to a location of interest to the user, relevance of a business to an identified interest of the user, how many users are following the collections, positively trending collections with respect to a particular time period(s) (which trending could be based on collection additions, collection followings, ratings, and/or any suitable basis), activity in the collections, ratings of the collections, and/or the like. Certain public collections could be selected for presentation to the user as suggestions, though the user may not have actively searched for the public collections. Having found a public collection of interest, one or more user-selectable options may be presented to the user to peruse, share, incorporate into the user's collection(s) (selectively or in whole), and/or follow the collection.

Figure 14:
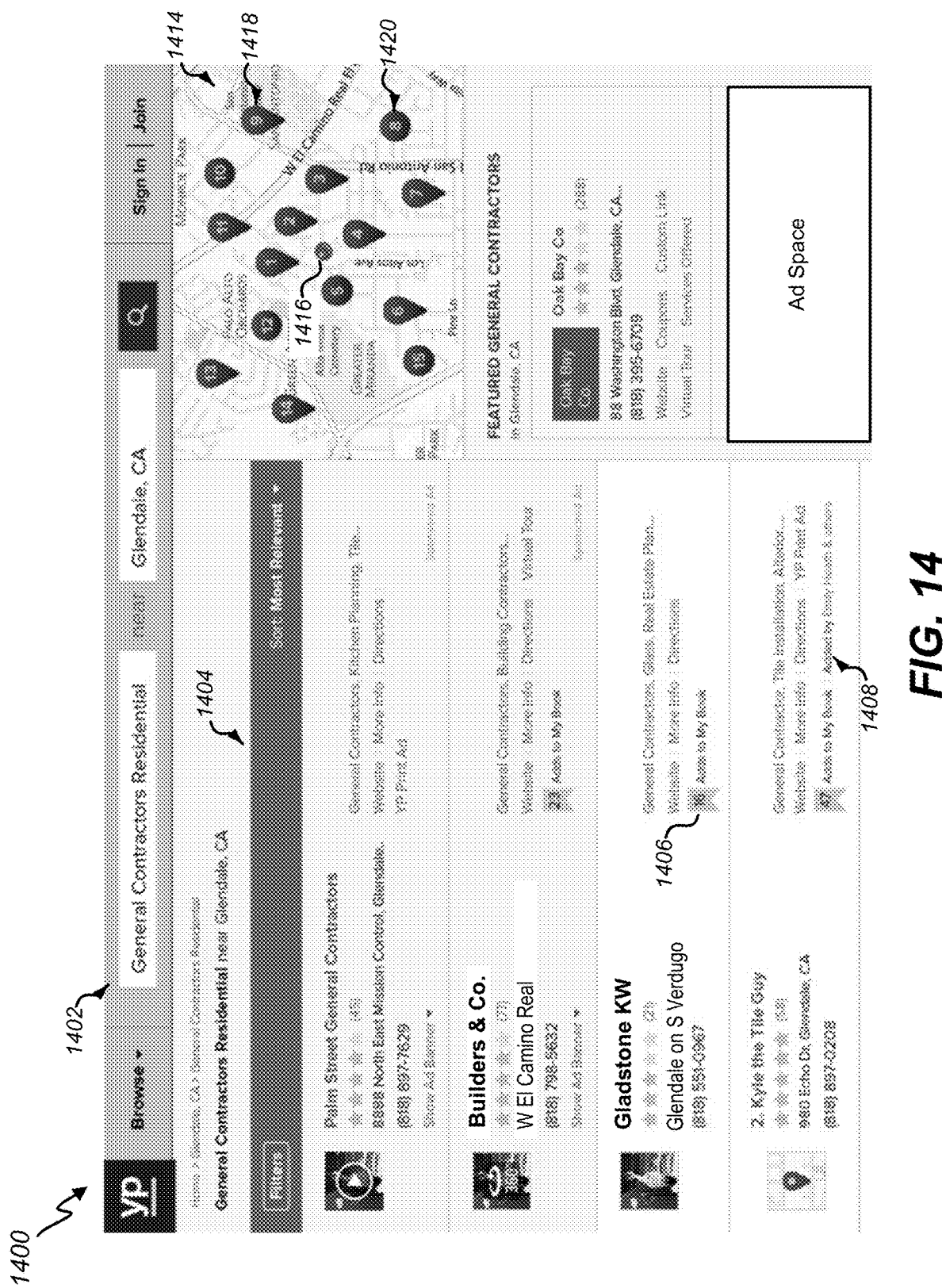
FIG. 14 is a screenshot, which may be a partial screenshot, of a search interface, in accordance with certain embodiments of the present disclosure.

FIG. 14 shows a screenshot, which may be a partial screenshot, of a search interface 1400 that may be displayed via a mobile application, webpage, or any suitable end-user interface 105, in accordance with certain embodiments of the present disclosure. A search feature 1402 may be provided with one or more of the end-user interfaces 800, 900, and/or the like. The search feature 1402 could be made available to registered users, non-registered users, and/or non-logged-in users. The search feature 1402 may include a query field and a location field, and may be the same or similar to search interface features described herein. Responsive to a search request by an end user, a set of businesses may be selected by the system 102 as corresponding to the user's search criteria, including location. The set of businesses may be compiled and presented as search results 1404.

In some embodiments, interest data, user preferences, curation characteristics, collection characteristics, demographic characteristics, business characteristics, profile types/characteristics, and/or the like that correspond to particular end users could be characterized by the system 102 and retained as user-specific profiles associated with various criteria (e.g., keyword criteria, taxonomy criteria, categorization criteria, etc.) that allow for correlation of multiple end users based on end-user characteristics. The system 102 could anonymize any of such information and could provide anonymous depictions of user preferences and profile types to help personalize the experience for a given end user and help find businesses that other users like the given end user enjoyed. User-selectable options for user-specific profile types, criteria, and/or any suitable characterization of other users could be presented via the search interface 1400 to allow for searching. For example, a user could search for other users that have interest in pets, children, or any suitable interest category, and be presented with anonymized search results for the user to see what businesses are of interest to those other users. A user could refine a search by demographic characteristics, location characteristics, interest data, user preferences, curation characteristics, collection characteristics, business characteristics, profile types/characteristics, and/or the like. In some embodiments, the system 102 may automatically search on behalf of the user, without user selection, and present search results as suggestions to the user. The search results could anonymously indicate any suitable characterization of the other users.

In some embodiments, certain public collections could be selected for presentation to the user with the search results 1404. In some embodiments, the collection could be selected as suggestions, though the user may not have actively searched for the public collections. One or more user-selectable options may be presented to the user to peruse, share, incorporate into the user's collection(s) (selectively or in whole), and/or follow the collection.

In some embodiments, with respect to particular business listing in the search results 1404, an indicator 1406 may indicate whether a particular business listing is in a collection by other users and may further indicate a number of users who have added the particular business listing to a collection. Such information indicated by the collection addition indicators 1406 may lend a measure of credibility and trustworthiness to a business; an addition to one's collection indicates a willingness/desire to engage with a business.

Some embodiments may provide a map view 1414 of search results. The map view 1414 could indicate search results depicted in a vicinity of a reference location 1416 that corresponds to the location of interest. Collection addition indicators 1418 could be positioned on the map view 1414 to indication business locations corresponding to the search results. The collection addition indicators 1418 may each indicate a number of users who have added a particular business listing to a collection. In some embodiments, the collection addition indicators 1418 may correspond to a set of the most relevant search results, and relatively less relevant search results could be indicated by different collection addition indicators 1420. The indicators 1418 and 1420 could be graphically distinguished in any suitable manner, including with images, shape differentiation, color differentiation, alphanumeric indicia, and/or the like. One or more of the indicators 1418 and 1420 could correspond to user-selection options that allow a user to view further details and/or adding businesses to collections consequent to selection of a particular indicator. In some embodiments, the map view 1414 and/or a similar map interface may be provided to allow for interactive searching and adjustment in order to find businesses of interest for addition to collections.

In some embodiments, one or more user-selectable options may be provided for refining location criteria for the collection addition indicia. For example, a user may be able to indicate a range, such as a radius of X miles from specified location of interest. In some embodiments, a user could indicate an area of interest with any suitable parameters, e.g., including one or more counties, municipalities, zip codes, distances from reference points, etc. In some embodiments, a user-selectable map interface may be presented, enabling user to define an area by selecting one or more points on the map interface. For example, predefined service areas, such as zip codes and/or the like, could be presented on the map for selection. The map interface could allow a user to define a perimeter of a service, e.g., by drawing on the map with a line drawing tool, cursor, finger/stylus contact with a touch interface, selection of perimeter boundaries such as roads, rivers, etc. Hence, collection addition indicia may be location-specific and refined to any suitable degree of granularity to provide enhanced relevance.

A user logged in to the orchestration platform could have a linked social/business networking services account. And, in some embodiments, with respect to a particular business listing in the search results 1404, an indicator 1408 may indicate whether a particular business listing has been added by others who are friends/associates/connections of the user via an online social/business networking service, other users who associated with a certain affinity group, and/or the like. Thus, certain embodiments may surface user-generated content from social graphs in order add a trust factor for consideration of particular businesses, if applicable. The network-specific addition indicators 1408 may be differentiated from more general collection addition indicators 1406 in some embodiments in order to add trustworthiness differentiation, as an addition of a business to personal collection by social media friends may be considered as an endorsement and may further allow reaching out to the others for further information if desired.

Figure 15:
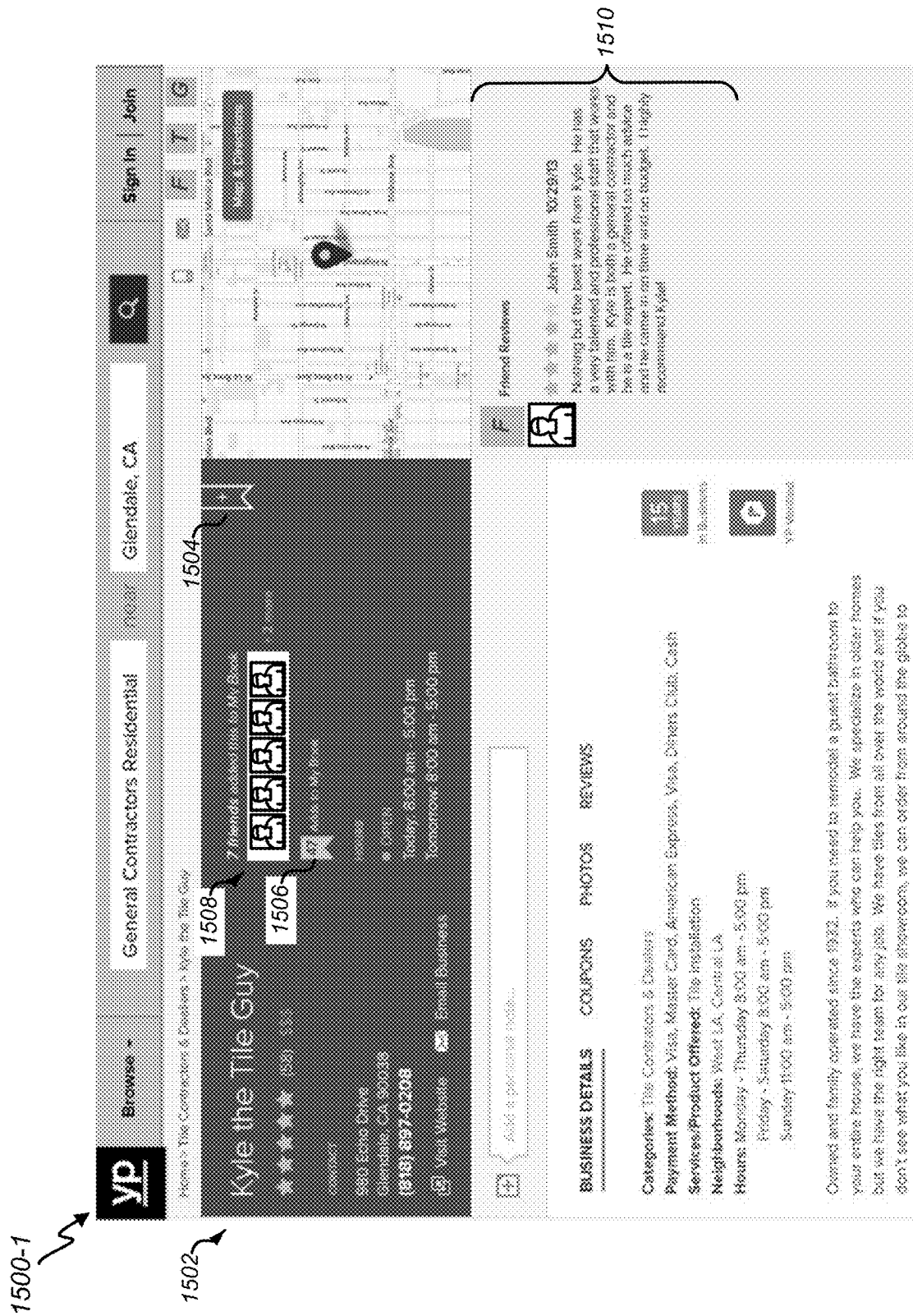
FIG. 15 is a screenshot, which may be a partial screenshot, of a search interface with business-specific information that may be displayed responsive to user selection, in accordance with certain embodiments of the present disclosure.

User-selectable options may be presented to the user with search results to allow a drill-down to more specific information for a particular business. FIG. 15 shows a screenshot, which may be a partial screenshot, of a search interface 1400-1 with business-specific information 1502 that may be displayed responsive to user selection, in accordance with certain embodiments of the present disclosure. With respect to a particular business, the business-specific information 1502 may include any one or combination of information items and/or features described herein. A user-selectable option 1504 may be presented to the user so that upon user selection, e.g., a single click, a particular business may be added to the user's collections. A collection addition indicator 1506 may indicate whether a particular business listing is in a collection by other users and may further indicate a number of users who have added the particular business listing to a collection. A network-specific indicator 1508 may indicate whether a particular business listing has been added by others who are friends/associates of the user via an online social/business networking service, other users who associated with a certain affinity group, and/or the like. In some embodiments, the network-specific indicator 1508 may include images of the friends/associates scraped from the social/business networking service.

The business-specific information 1502 may include a friends/associates review window 1510 that surfaces review content by the user's friends/associates gathered from one or more online social/business networking services. The system 102 may actively monitor, gather, push, and/or pull review content from one or more online social/business networking services in any suitable way. In some embodiments, like the example depicted, the review window 1510 may surface individual review content, that is, content from an individual friend/associate of the user. The review content may include any one or combination of reviewer identification information, ratings, review comments, preference indicia, date information, and/or the like. The review content may be gathered from business pages associated with the one or more online social/business networking services in some cases. In some embodiments, review content may be gathered from business websites, with the reviewers being correlated to the user as being related via the online social/business networking services.

Figure 16:
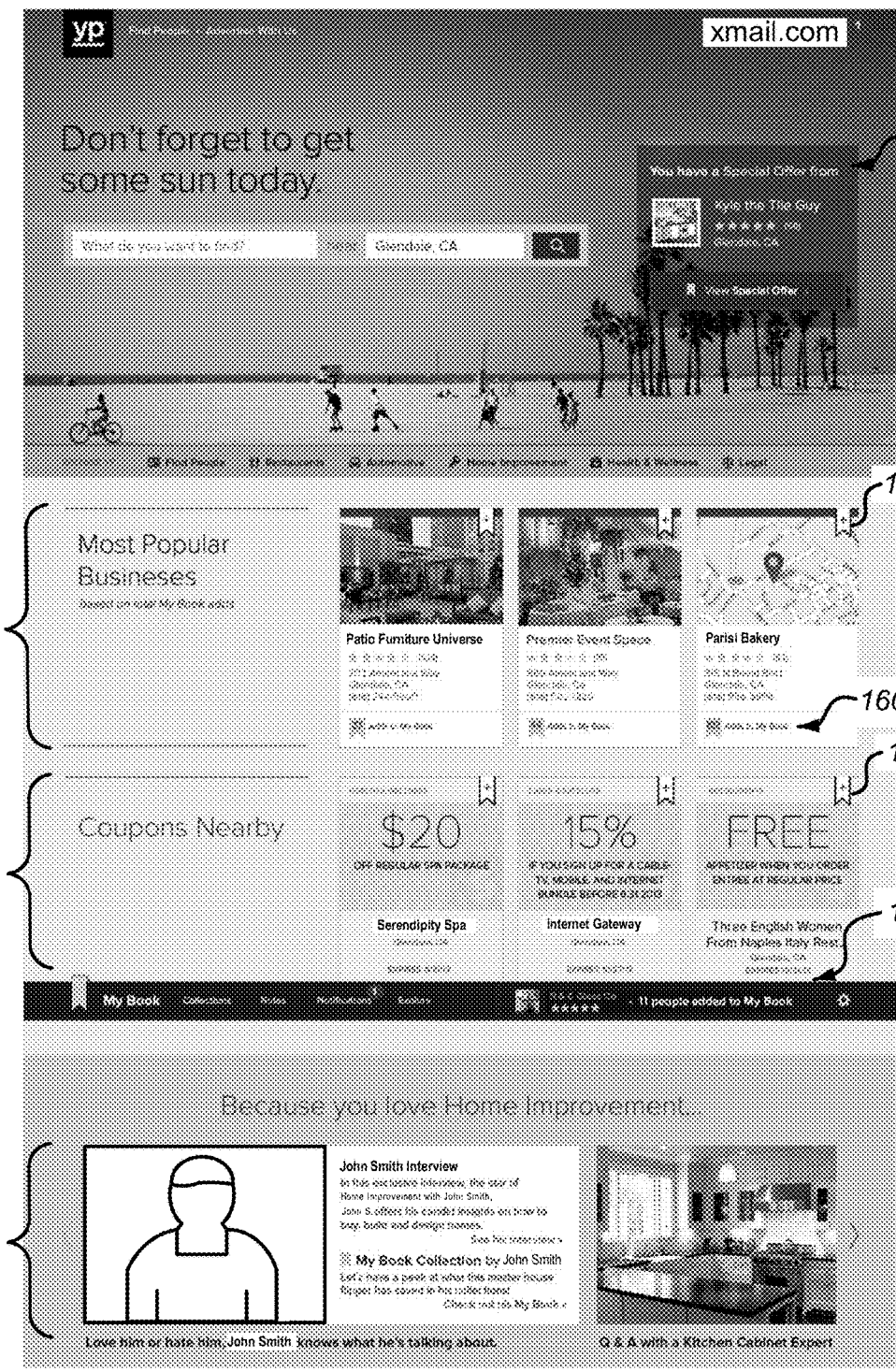
FIG. 16 is a screenshot, which may be a partial screenshot, of an end-user interface, in accordance with certain embodiments of the present disclosure.

FIG. 16 shows a screenshot, which may be a partial screenshot, of an end-user interface 1600 that may be displayed via a mobile application, webpage, or any suitable end-user interface 105, in accordance with certain embodiments of the present disclosure. The end-user interface 1600 may be similar to other interfaces described herein and may include any one or combination of features of other interfaces described herein. In some embodiments, the end-user interface 1600 may include one or more targeted advertising windows 1602.

The targeted advertising window 1602 may allow for presentation of advertising offers that are targeted to the user. The targeted advertising window 1602 may allow for a business to have an option of deciding to which consumer to send offer information and/or which offer information to send. With some embodiments, a targeted advertising option may be made available to businesses that have been added to a collection of the user. In some embodiments, the targeted advertising could be customized to the consumer by the business. Thus, a business could develop and/or maintain a relationship with the user after the collection addition by pushing a special offer to the user. For example, say a particular business has been added to a collection, but no further engagement between the consumer and the business has ensued. Noting this, the business may wish to have the option to direct one or more offers to the consumer in order to incentivize further engagement. Similarly, say a particular business has been added to a collection and has done business with the consumer, the business may wish to have the option to follow up with the consumer with directed offers to maintain and/or develop the relationship with the consumer. Perhaps, the business has not had contact with the consumer in a while; noting this, the business may wish to send a special offer to the consumer. The targeted advertising information could include one or more of an electronic coupon (which could correspond to a savable and/or printable discount coupon), advertising information, promotion information, offer information, business card information, any suitable business-related information, and/or the like. In various embodiments, in addition or alternative to the targeted advertising window 1602, an advertiser may have any one or combination of options for presenting offers, including via email, text messaging, a mobile app, a website, linked online social/business networking service(s), regular mail, push notifications, telephonic notification, etc.

In some embodiments, the end-user interface 1600 may include one or more selected business windows 1604. The selected business windows 1604 may present certain business information windows for businesses that the user has not already added to a collection. With some embodiments, as in the example depicted, business information may be selected for presentation as the most popular businesses based on total collection additions. Business windows could be selected for presentation based at least in part on one or more of business location(s) in relation to a location of interest to the user, relevance of a business to an identified interest of the user, a number of collection additions by other users with respect to particular businesses, a number of collection additions by other users who are related to the user via online social/businesses networking service(s), trending of such collection additions with respect to a particular time period(s), ratings of businesses, and/or the like. The selected business windows 1604 may include collection addition indicators 1606, as described herein. Along with each selected business window 1604, a user-selectable option 1608 may be presented to the user so that upon user selection, e.g., a single click, a particular business may be added to the user's collections. In some embodiments, the selected business windows 1604 may be selected regardless of what has already been added to the user's collections, and whether a particular business has been added to the user's collections could be graphically indicated in any suitable manner (e.g., though not depicted as such, an indicator 1608 for a business already in the user's collections could be different than an indicator 1608 for a business not already added).

In some embodiments, the end-user interface 1600 may include one or more selected coupon windows 1610. In some embodiments, the selected coupon windows 1610 may present certain coupon information for businesses near a location of interest to the user. In some embodiments, the system 102 could select the coupon information by actively monitoring location of interest data of the user and correlating that data to coupon information retained by the system 102. In some embodiments, coupon information could be correlated to businesses already added to the user's collections in order to apprise the user of pertinent offers relating to those businesses of interest. In some embodiments, the system 102 could monitor location of interest data for the user and notify businesses already added to the user's collections of an opportunity to direct coupon information to the user. Responsive to the notification, a business could provide coupon information to the system 102 for presentation to the user. In some embodiments, the system 102 may gather, push, and/or pull coupon information from businesses, business websites, and/or any suitable data source 110 in any suitable way, and then provide pertinent coupon information to users via one or more selected coupon windows 1610. The selected coupon window 1610 could be configured to provide an electronic coupon that could be savable and/or printable. Along with each selected coupon window 1610, a user-selectable option 1612 may be presented to the user so that, upon user selection (e.g., a single click), the coupon may be saved in association with the user's account. If the corresponding business is already added to the user's collections, the coupon information could be retained and accessible in association with the corresponding business in the appropriate collection. In some embodiments, if the corresponding business is not already added to the user's collections, selection of the option 1612 could also add the corresponding business to the user's collections, in conjunction with retaining the coupon information for later access in association with the corresponding business.

In some embodiments, the end-user interface 1600 may include an activity reporter 1614. The activity reporter 1614 could include one or more widgets, in some embodiments. The activity reporter 1614 may be configured to a report activity about the orchestration platform as the activity is occurring in real-time and/or at a high speed. The activity reporter 1614 may report any suitable information regarding any suitable activity, such as collection additions, new users joining the orchestration service, new reviews, new businesses joining the service, new followings of public collections, etc.

In some embodiments, the end-user interface 1600 may include an editorial section 1616 that may surface editorial content. As in the example depicted, the editorial section 1616 could expose promotional/editorial material that incorporates links to a public collection. The public collection could correspond to a collection associated with a celebrity, and could be tied to one or more endorsements. The public collection could be made available for public viewing, following, sharing, and/or copying.

Figures 17A, 17B, 17C:
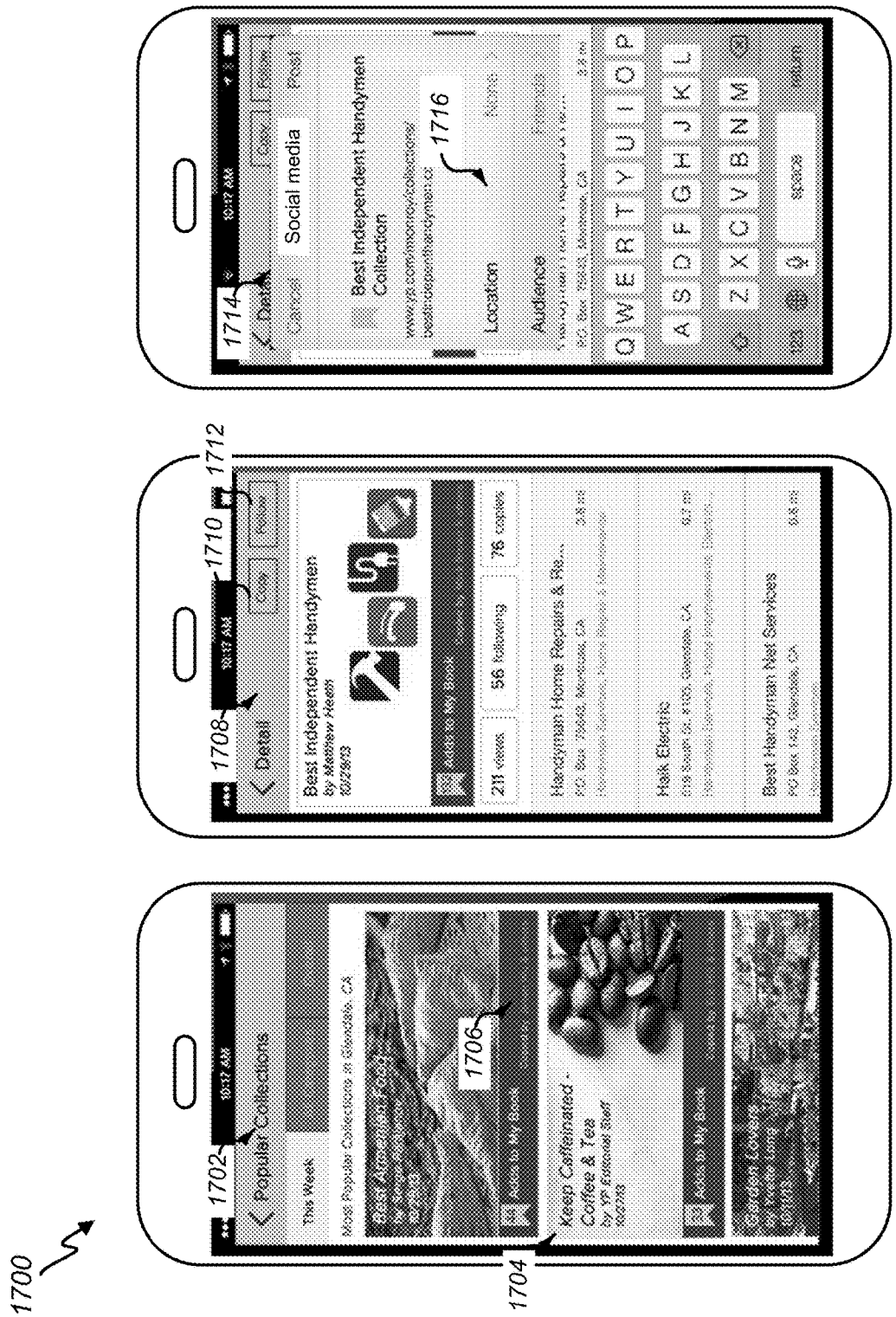
FIGS. 17A, 17B, and 17C are screen displays illustrating example end-user interfaces, in accordance with certain embodiments of the present disclosure.

FIGS. 17A, 17B, and 17C are screen displays illustrating example end-user interfaces 1700, in accordance with certain embodiments of the present disclosure. The end-user interfaces 1700 may be displayed via a mobile application or any suitable end-user interface 105 in various embodiments. The end-user interfaces 1700 may be similar to other interfaces described herein and may include any one or combination of features of other interfaces described herein. In some embodiments, the end-user interfaces 1700 may include one or more popular collections windows 1702. In various embodiments, the system 102 and/or the end-user device 300 may be configured to identify location information corresponding to the current or recent location of the end-user device 300 and/or user, and use the location information as a basis for identifying geo-aware selections for indication via the end-user interfaces 1700. In addition or alternative to the location information and relative business location(s) as bases, collections may be selected for presentation to the user based at least in part on relevance of a business to an identified interest of the user, relevance of a business to an identified demographic aspect of the user, how many users are following the collections, positively trending collections with respect to a particular time period(s) (which trending could be based on collection additions, collection followings, ratings, and/or any suitable basis), activity in the collections, ratings of the collections (which could include user votes for collections), instances of sharing of the collections, copies of the collections, and/or the like. Thus, certain embodiments may provide for temporal windowing may allow a user to see businesses trending in the user's neighborhood, city, and/or other local area.

As indicated by collection 1704, certain collection may not be created by and users but may be created and curated by staff of the orchestration service in some embodiments. In conjunction with such staff-curated collections, feedback from the crowd/community may be solicited. For example, incentives may be provided so that users provide feedback on certain collections corresponding to geographical area and business category. In some cases, users may be enticed to add businesses to such a collection. Those that bubble to the top of such a collection (e.g., in terms of ratings, additions, shares, copies, and/or the like) may be given greater visibility in the collection and/or otherwise via the orchestration service features.

In some embodiments, celebrity collections may be available for public viewing, following, sharing, and/or copying. In some embodiments, particular businesses, which may include individual or groups of service providers, may have collections tailored for clients. For example, a real estate agent may curate a collection of local vendors tailored for sharing with clients that have bought or in the process of buying a house in a particular area. Such a collection could include recommended vendors that could be of use to such clients, such as an inspector, a handyman, a pool service, utility providers, lawn care service, housecleaning service, etc. Additionally, the real estate agent may want to have multiple collections tailored to various categories of clients—clients in certain metropolitan areas, neighborhoods, income classes, etc.

In some embodiments, the system 102 may track instances of collection sharing in order to track referrals. Say, for example, a real estate agent shares a collection with a client, and the client contacts a merchant via the shared collection, for example, via a communication reference provided via the collection, which reference could be a click-to-call reference, click-to-message reference, click-to-email reference, click-to-chat reference, and/or the like. The application and/or system 102 could monitor for such communications made via the collection. The system 102, being notified of such communications, may retain tracking information, which could be used as a basis for rewarding the real estate agent for the referral. In some embodiments, for example, an account of the real estate agent could be automatically credited with a referral reward in any suitable form for the lead that was delivered. Beyond the example of a provider having an incentive to provide referrals, the end user could similarly be incentivized to give referrals by sharing of collection/window information. Such incentives may be based on end-user qualification, scoring, and monetization discussed herein.

In some embodiments, a network-specific indicator 1706 may indicate whether a particular collection has been added by others who are friends/associates of the user via an online social/business networking service, other users who associated with a certain affinity group, and/or the like. The network-specific indicator 1706 may identify one or more of the friends/associates. In some embodiments, the end-user interfaces 1700 may provide collection-specific detail information 1708, copy options 1710, and/or follow options 1712, as described herein. The end-user interfaces 1700 may provide one or more collection share options 1714 configured to allow sharing of collection information in any suitable manner, as described herein. For example, as indicated in FIG. 17C, a collection could be shared via social/business networking services account postings, and the collection share options 1714 may facilitate that. In some embodiments, the collection share options 1714 may include user-selectable options 1716 to restrict the posting to a certain audience. Additionally, the user-selectable options 1716 may provide the option to geographically restrict the posting to an audience associated with a certain geographical area. The system 102 may, for example, only make the posting to those friends/associates who have associated locations, as indicated by a social/business networking service, within a particular vicinity corresponding to the user-specified location.

Figure 18:
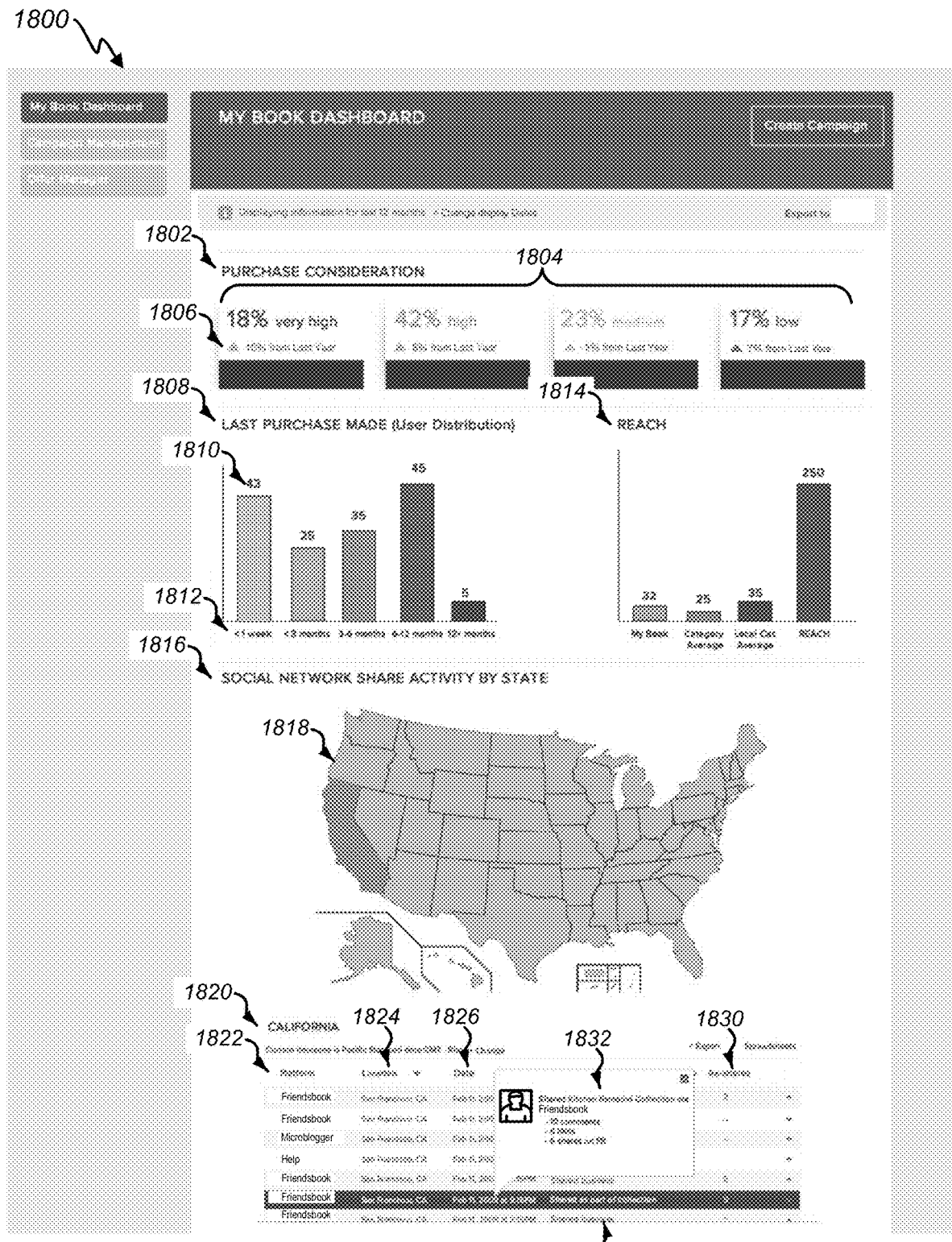
FIG. 18 illustrates one embodiment of a merchant dashboard for an advertising platform that may correspond to a provider interface, in accordance with certain embodiments of the present disclosure.

FIG. 18 illustrates one embodiment of a merchant dashboard 1800 for an advertising platform that may correspond to a provider interface(s) 700, in accordance with certain embodiments of the present disclosure. The merchant dashboard 1800 may provide a particular merchant (i.e., a provider 106) access to demographic information about orchestration service users that have added the merchant's business to their collections. In some embodiments, the dashboard 1800 may correspond to a home page that a provider 106 might see upon initialization of an app or logging on to the platform. After a provider 106 logs in, different data points that can be of use to provider 106 may be presented via the dashboard 1800. The dashboard 1800 may include any software process or module operable to present and receive information to/from a provider 106, allow a provider 106 monitor advertising information, select different types of advertising data, identify desired metrics, automatically generate dashboard views, customize dashboard views, and/or the like. The dashboard 1800 may provide a graphical user interface (GUI) that includes any number and type of user-selectable options to facilitate various embodiments. In various embodiments, one or more user-selectable options may include one or more of a screen-labeled function key, an icon, a button, a soft button, a window, a menu, a control widget, a scroll bar, a slider, a listbox, and/or the like. In various embodiments, one or more user-selectable options may be selectable via one or more of touch, push, movement-based selection, and/or any suitable navigation feature. The example of the dashboard 1800 is not limiting, but may be illustrative of a mobile application and/or web interface 107.

Figure 19:
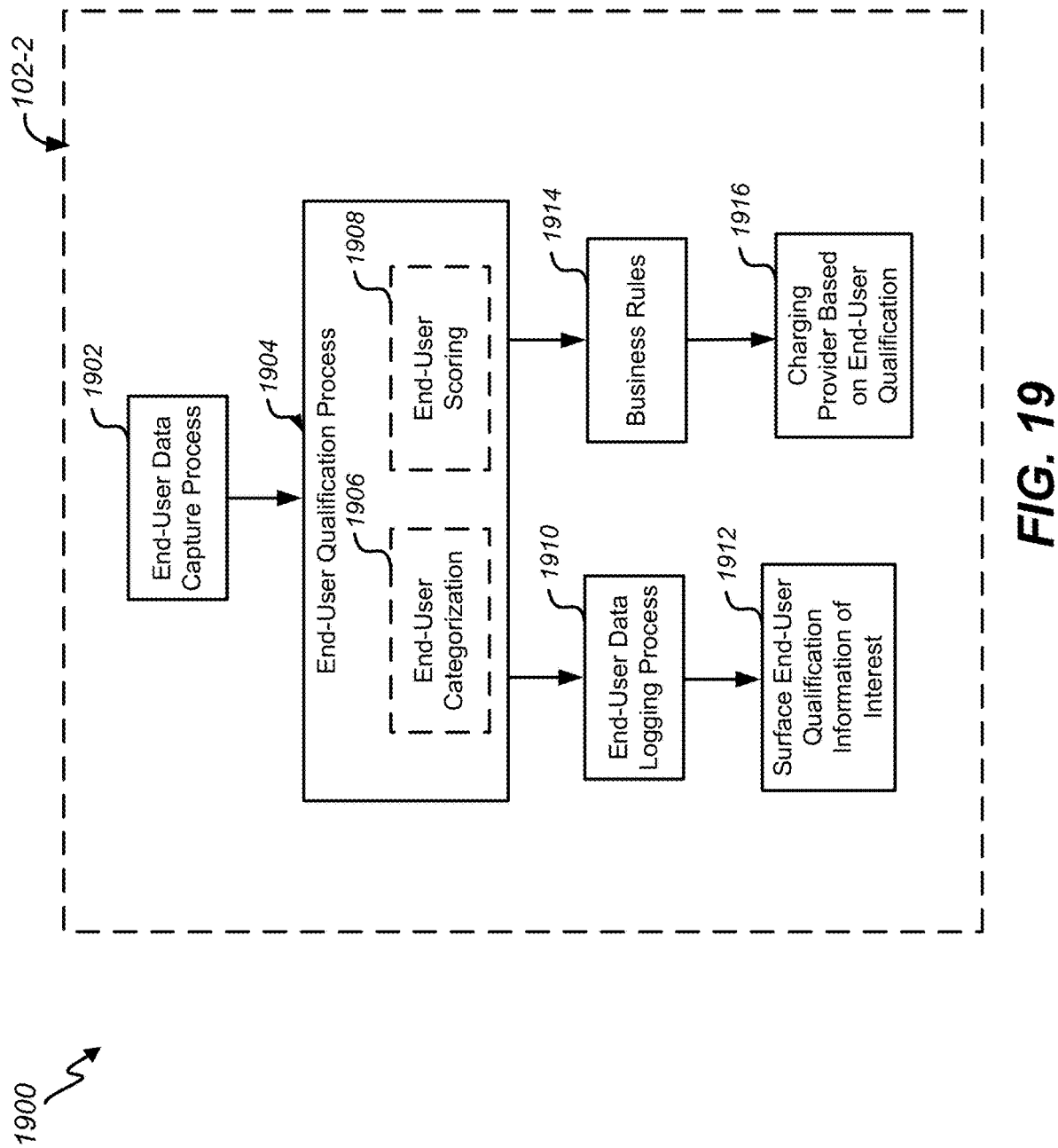
FIG. 19 depicts a functional block diagram of certain aspects of end-user qualification, in accordance with certain embodiments of the present disclosure.

In some embodiments, the dashboard 1800 may expose purchase consideration data 1802 about users who have added the particular merchant to their collections. A purchase consideration metrics feature may be configured to present access to details regarding any suitable aspects of consumer data capture and consumer qualification. FIG. 19 depicts a functional block diagram of certain aspects of end-user qualification 1900, in accordance with certain embodiments of the present disclosure. Various embodiments may employ any one or combination of various methods of qualifying end users. In some embodiments, an end-user may be simply identified as one having, or not having, made a purchase, engaged services, and or otherwise conducted business. In some embodiments, providers may be charged by the orchestration or other service based at least in part on such an identification.

Captured data may be used to qualify and users. End-user data may include any suitable information that may be captured to indicate, infer, and/or determine which end-users are likely to bring in business and/or actually have brought in business. An end-user's interactions with the orchestration platform can be broken down and assessed based on any one or combination of various factors, such as, for example, duration of various directed interactions, locations of the end user relative to business locations, demographic information of the end user, collection/window development by the end user, content added by the end user, communications with merchants, keyword analysis user-generated content and/or communications, and/or the like. Based on such indicia, an end user can be qualified.

Some embodiments may employ a decision tree, checklist, workflow, and/or the like to capture various aspects of consumer qualification data and assess those aspects to infer consumer qualification. Such a decision tree, checklist, and/or workflow may incorporate any one or combination of the depicted aspects and/or similar aspects in any desired order, according to various embodiments. End-user qualification data can be consolidated and processed to yield an end-user qualification score. Any one or combination of types of end-user data may be captured, analyzed, and qualified.

The system 102-2 may receive and process data regarding an end user in implementing the end-user data capture process 1902. In some embodiments, the system 102-2 may analyze any information received from an end user, which information may be associated with the end-user account and retained by the system 102-2 to provision orchestration service features to the end user. As discussed herein, certain embodiments may use a client application installed on the end-user computing device 105 to facilitate data capture.

The end-user data capture process 1902 may include any one or combination of various embodiments as discussed herein that gather information.

Having end-user data, the system 102-2 may implement a lead qualification process 1904. The system 102-2 may be configured to qualify end users in whole or in part. Though certain aspects of end-user qualification 1900 are depicted as being performed by the system 102-2, the processes for qualifying end users may, in some embodiments, be performed in whole or in part by a client application 351 installed on the end-user computing device 105 and/or the provider computing device 107.

Some embodiments may qualify an end-user according to a graduated scale. Any suitable scale may be used in various embodiments. In some embodiments, a scale could entail a categorization scheme 1906, with any suitable categories. For example, as depicted in FIG. 18, categories 1804 such as very high, high, medium, and low could be used to segment end users by purchase consideration.

Referring again to FIG. 19, in some embodiments, a scale could entail an end-user scoring system 1908. The end-user scoring system 1908 could be correlated to the category scheme in some embodiments, such that certain scores correspond to certain categories. Some embodiments may score an end user with a numerical expression, for example, an end-user score. An end-user score may be an assessment of an end-user's potential to engage a merchant and conduct business. Accordingly, an end-user score may indicate which end users are more likely than others to bring in business, thus providing a quantitative estimate of the probability that a given end user will provide business. By way of example without limitation, a scale could include a range of end-user scores from 0 to 100, or from 0 to 1,000, with the high end of the scale indicating greater probability. Some embodiments may use methods of statistical analysis to derive an end-user score. Various embodiments may determine an end-user score based on any one or more suitable quantifiers.

In some embodiments, the system 102-2 may implement an end-user data logging process 1910 which gleans data pertinent to qualification from end-user data associated with the end-user account. The system 102-2 may generate and maintain an end-user qualification profile that may include any suitable qualification information corresponding to a particular end user. As indicated by block 1912, any suitable end-user qualification information of interest may be surfaced, for example, by way of the merchant dashboard 1800. For example, information about end users that have added a particular provider to collections could be compiled, analyzed, formatted, and/or otherwise processed to window any analytics of interest.

In some embodiments, the system 102-2 may implement business rules 1914 to take action based at least in part on the end-user qualification. The provider advertising with the orchestration/listing service could be charged based on the end-user qualification 1916 in some embodiments. The account management/billing module(s) 112(*f*) could implement a code system by which a provider is charged based on the end-user qualification. For example, a provider could be charged differently based on whether end-users are more or less qualified. The charging process could be a performance-based system where charges based on an addition of a provider to an end-user collection and/or based on end-user actions taken with respect to the particular provider thereafter.

In some embodiments, the charges could be based on end-user score. Charges could be proportional to end-user score in some embodiments. Charges could be applied contingent on one or more thresholds. For example, a minimum threshold could be employed, where an end-user score not meeting the minimum threshold could result in no charge. An end-user score above the minimum threshold could result in a charge. The charge could be based on one or more score bands, for example, one or more score bands above the minimum threshold. By way of example, an end-user score above a 50% minimum threshold could be correlated to quartile bands. A discounted charge could be applied based on an end-user score correlated to a 50-75% band. A full charge could be applied based on an end-user score correlated to the 75-100% band. Some embodiments could implement a proportional charge, such as an end-user score correlated to 75% could result in a charge of 75% (or some other proportion) of the full charge.

Figure 20:
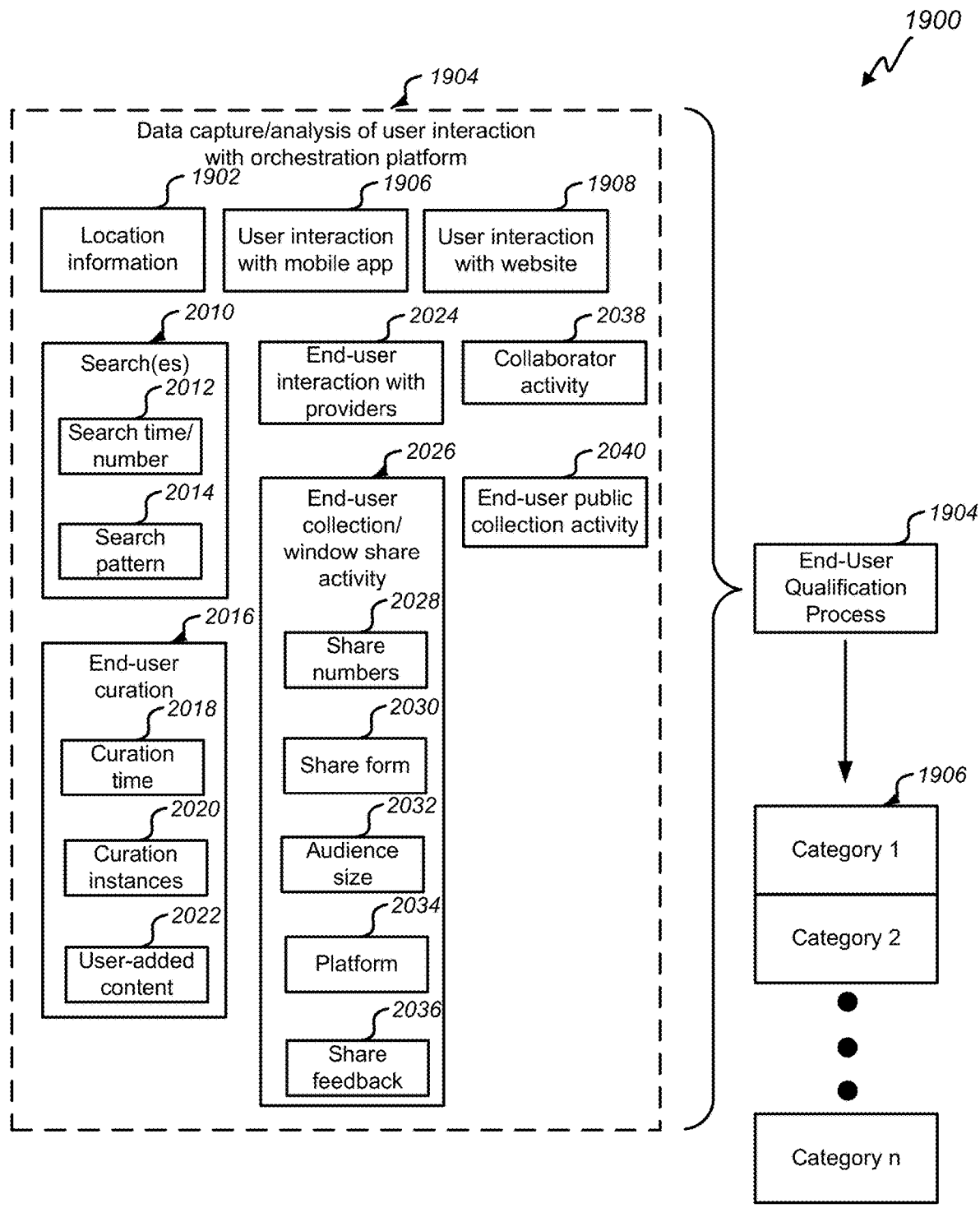
FIG. 20 depicts a functional block diagram of certain aspects of end-user data capture, analytics, and qualification, in accordance with certain embodiments of the present disclosure.

FIG. 20 depicts a functional block diagram 2000 of certain aspects of end-user data capture, analytics, and qualification, in accordance with certain embodiments of the present disclosure. The criteria for qualifying consumers may take into account the extent of end-user interaction. A greater extent of interaction could increase a ranking assigned to a particular user. The user interaction considered may include one or more of interaction directed to the merchant, the business area of the merchant, and/or other merchants related to the merchant's business area. The criteria for qualifying consumers may take into account the extent of user interaction with a collection and/or information window associated with the merchant, the business area of the merchant, and/or other merchants related to the merchant's business area. The qualification of a particular consumer may also be weighted as a result of keywords being used in communication and/or commentary associated with a collection and/or window related to the merchant— e.g., the keywords may indicate a user ready to buy, engage services, and/or otherwise conduct business. The qualification of a particular consumer may be weighted more heavily as a result of indicia that the consumer made a purchase, engaged services, and or otherwise conducted business.

As indicated by block 2002, in some embodiments, location information may be captured to provide an indication of the end user's location. As discussed herein, various embodiments may employ any one or combination of methods of capturing location information, including but not limited to, gathering location information via any one or combination of the end-user orchestration platform profile, the communication device 105, 300, such as the device GPS capabilities, access points, third-party data sources, determining the area code associated with the device, differentiating between whether a caller uses a landline or wireless network, receiving explicit location information with one or more search requests, inferring location information from one or more search requests, and/or the like. Gathering of location information may be facilitated by the application 351 of the end-user device sending tracking information to the system 102. In some embodiments, gathering of location information may be performed before an end user places a call, for example, via the mobile application. Various location quantifiers could be assigned to a user based on the business of interest. For example, with some businesses, proximate location of an end user is important, say, for a plumber for example. With other businesses, proximate location of an end user may not be so important, or the fact that an end user travels frequently may be more important some businesses, for example, businesses which tailor to travelers. As an example, a number of points could be assigned to the end user based on an identification of the importance of proximity to the business/category of interest and the location information gathered for the end user.

In some embodiments, as indicated by block 2004, an end user's interaction on the orchestration platform may be captured as data of interest. For example, as indicated by blocks 2006 and 2008, in some embodiments, end-user interaction with the mobile application 351 and/or website provided by the system 102 may be captured. As indicated by block 2010, the user interaction may involve one or more searches. A user, for example, may spend significant time searching for businesses relating to a certain category. As indicated by block 2012, the amount of time and/or the number of searches may be taken into account as an indicator of relatively greater interest. The time spent searching a particular category of service providers and/or the number of searches could be correlated to an increased indicator of interest in any suitable manner. Merely by way of example, a number of points could be assigned to an end user based on the time spent searching and/or the number of searches. Various interest quantifiers could be assigned to an end user based on search time in a proportionate manner. For example, a number of points could be assigned for every minute of search time. Various interest quantifiers could be assigned to an end user based on the user meeting any one or combination of various thresholds of search time. As an example, a number of points could be assigned after the end user accrues 5 minutes of search time.

As indicated by block 2014, in some embodiments, a search pattern may be taken into account as lead data of interest. The search focus or non-focus may be considered. Certain embodiments could differentiate between searches to detect a pattern of searches corresponding to a given category of searches. For example, an end user might spend 5 minutes of searching, viewing results, linking to provider websites, reading reviews, etc., all related to a particular category of service providers, say plumbers in a particular geographic area. Such search time could be distinguished from non-focused searching, such as searching related to various categories, which might not be related. In such cases, no additional points or a lower number points may be assigned.

As indicated by block 2016, in some embodiments, end-user curation may be taken into account as end-user data of interest. End-user curation 2016 may be assessed in terms of curation time 2018. For example, time spent arranging and customizing a collection and/or information window maybe taken as a higher level of interest and be assigned points accordingly. Time spent accessing, editing, and/or augmenting a collection and/or information window may be taken as an indication of interest and be assigned points accordingly. End-user curation 2016 may be assessed in terms of curation instances 2020. For example, instances if arranging, customizing, editing, and/or augmenting a collection and/or information window may be gauged to determine interest. End-user curation 2016 may be assessed in terms of user-added content 2022. User-added notes and/or reviews, for example, could be assigned certain points, with more extensive notes/reviews being assigned a greater amount of points. As another example, instances of user-added photos and/or images may be assigned points accordingly. User-added photos and/or images that correspond to receipts, invoices, warranties, etc. may be identified as evidence that the end-user has transacted business with a merchant, thus evincing a greater level of interest. Other user-added content that could be assessed may include any other suitable user added content discussed herein, including ratings indicia, preference indicia, etc.

As indicated by block 2024, in some embodiments, an end user's interaction with one or more other merchants via the orchestration platform could be assessed and assigned points accordingly. For example, if a user adds a merchant as a collaborator or otherwise allows a merchant to view a collection, then that situation may be taken as an indicator of a high level of interest. As another example, if a user communicates with a merchant via the platform (e.g., via a type of click-to-contact link, chat window, email, text, and/or like means that is facilitated by the orchestration platform and/or links thereto), that likewise can be taken as an indicator of interest. An end user's interaction with one or more other merchants could be assessed based on instances, repeated engagements with specific merchants, frequency of interaction (with merchants of a certain business type, e.g.), duration of interaction, type of interaction, and/or the like.

As indicated by block 2026, in some embodiments, an end user's collection/window share activity could be assessed and assigned points accordingly. Instances of sharing could be assessed based on numbers of occurrences 2028, form of sharing 2030, the size of the audience 2032 to whom the information shared, the platform 2034 to which the information shared, feedback on shares 2036 by others (e.g., in the form of preference indicia, reviews, re-shares, etc.), and/or like. As indicated by block 2038, in some embodiments, an end user's collaborator activity could also be assessed, with instances/numbers of collaborators being taken into account.

As indicated by block 2040, in some embodiments, an end user's public collection share activity could be assessed and assigned points accordingly. Instances of collection publicizing could be assessed based on numbers of occurrences, numbers of followers, instances of copying, feedback on public collections by others (e.g., in the form of preference indicia, reviews, etc.), and/or like.

With regard to any of these bases for qualification or similar bases, scoring or otherwise assigning significance to such bases may be implemented to any suitable level of granularity. For example, with respect to feedback on shares 2036, type of feedback and extent of feedback can be differentiated and accorded various levels of significance. As a specific example, a simple indication that a friend/connection of the end user likes something that the end user shared on a social/business network may be accorded less significance than a re-share and/or comment by a friend/connection. Similarly, not all comments need be treated the same. In some abundance, keyword analysis such as described herein may be used to assess the significance of comments made by friends/connections.

Accordingly, various embodiments according to the present disclosure may provide for windowing end-user analytics that can provide market insights to providers. Moreover, various embodiments may qualify end-user aspects of the orchestration platform so that expansion, collaboration, sharing, and/or other use of the orchestration platform may be monetized (e.g., based on end-user qualification analytics). Such monetization can be used to incentivize sharing, marketing efforts, endorsement efforts, and/or other use of the orchestration platform. And, the incentive position may take the form of a reward system, be it monetary or otherwise.

Referring again to FIG. 18, the purchase consideration data 1802 about end users who have added the particular merchant to their collections could be presented based on the end-user qualification information analytics. The purchase consideration data 1802 could correspond to any time period(s). Additionally, the purchase consideration data 1802 could compare to past data. The past data could also be presented, however, like in the example depicted, differential information 1806, such as percentage increases/decreases, could be presented. In addition to segmented analytics information about multiple end users, any suitable information about individual end users, such as a qualification score, underlying qualification data, and/or the like, could be viewable, for example, responsive to user selection of one or more user-selectable options.

Other end-user analytics that could also be presented may include purchase information 1808. For example, the purchase information 1808 may take into account purchases made by respective end users. A last purchase of each respective end user may be taken into account, and a user distribution of numbers of end users 1810 who have made last purchases over any suitable time period of interest 1812 may be presented, like in the example 1808 indicated. In various embodiments, the purchases considered could be purchases made with the particular merchant, with other competitor merchants that end users have added to a collection and that are in the same business category of the merchant, and/or with other collection-added merchants generally.

The dashboard 1800 may provide one or more user-selectable time options. A time period selection feature may be configured to allow for selection of a time period for which to view certain performance metrics. Past performance, current performance, and projected options may be provided. Past performance could show performance metrics for past week, month, billing period, three months, six months, year, etc. Current performance could show real-time performance in the context of recent activity such as the last hour, day, week, etc. Projected performance could show extrapolation of past and/or current performance data into future, such as any coming time period. Projected performance could be based on any suitable factor, including aggregate performance of competitors in the market, publisher/platform performance, market data for a particular location, and/or the like.

Other end-user analytics that could also be presented may include reach information 1814. The reach information 1814 may include information about the number of users reached. The reach information 1814 could indicate one or more of users reached by a particular merchant, by merchants corresponding to a particular category (e.g., a service category, a product category, any suitable business category, etc.), by merchants corresponding to a particular locale, and/or the like. Such reach information 1814 could be graphically differentiated along any suitable lines. The reach information 1814 could be refined to expose reach information for any suitable time period, which time period could be user-selectable. The reach information 1814 could be differentiated based on specific platforms used. For example, users reached via the orchestration platform could be distinguished from users reached via social network connections. The reach information 1814 could include any share activity described herein. The reach information 1814 could reflect users who have specifically added a particular merchant to a collection. The reach information 1814 could also reflect users who have visited a particular merchant website, contacted a particular merchant, and/or otherwise linked to a particular merchant via the orchestration platform. Any one or combination of reach information 1814 items could be qualified according to any suitable bases, e.g., demographic information, visit number, value of customer, potential value of customer, quality of leads, social network connections, customer score, etc. And, such qualification could be graphically presented/distinguished in any suitable manner.

Other end-user analytics that could also be presented may include share activity information 1816. Any suitable share information may be gathered, analyzed, and windowed. The share activity could correspond to sharing of window information for a particular merchant, which could correspond to sharing based on an individual window and/or sharing based on a collection that includes window information for the particular merchant. The share activity could correspond to sharing between users of the orchestration platform. The share activity could correspond to sharing by a user of the orchestration platform to a non-user via any one or combination of the various means described herein. In the example depicted, the share activity information 1816 may correspond to sharing via one or more social networks.

The share activity information 1816 may be segmented by geography, like in the depicted example. While the example depicts segmentation by state, any suitable geographic segmentation may be employed in various embodiments, including neighborhood, city, metro area, county, and/or the like. In some embodiments, one or more user-selectable options may be provided for user-specified geos of interest to analyze data corresponding to the user-specified geos. For example, a user may be able to indicate a range, such as a radius of X miles from specified location of interest. In some embodiments, a user could indicate an area of interest with any suitable parameters, e.g., including one or more counties, municipalities, zip codes, distances from reference points, etc. In some embodiments, a user-selectable map interface 1818 may be presented. Some embodiments may enable a merchant user to define an area by selecting one or more points on the map interface 1818. For example, any predefined service areas, such as zip codes and/or the like, could be presented on the map for selection. The map interface could allow a user to define a perimeter of a service, e.g., by drawing on the map with a line drawing tool, cursor, finger/stylus contact with a touch interface, selection of perimeter boundaries such as roads, rivers, etc. Hence, share indicia may be location-specific and windowed in any suitable degree of granularity to provide enhanced relevance.

In the example 1818 depicted, user-selectable options may be presented for selecting share activity information by state. Consequent to user selection, geo-specific information 1820 may be presented. The geo-specific information 1820 may include any suitable details regarding the share activity. The share activity details may include one or more of platforms 1822 to which shares were directed, locations 1824 associated with the sharing end user, dates 1826 on which the shares occurred, times 1826 at which the shares occurred, distinctions 1828 as to whether the shares were individual business shares or collection shares, information on re-shares 1830, specifics as to collections shared 1832 (which may include one or more of comments received, ratings received, approval/disapproval indicia received, re-shares be a particular platforms, etc.), and/or the like. The share information presented with the merchant dashboard 1800 may be presented in any suitable manner. User-selectable options may be provided for exporting/converting the share information, in whole or in part, and to any desired format, including spreadsheets and other commonly used document formats.

Figure 21:
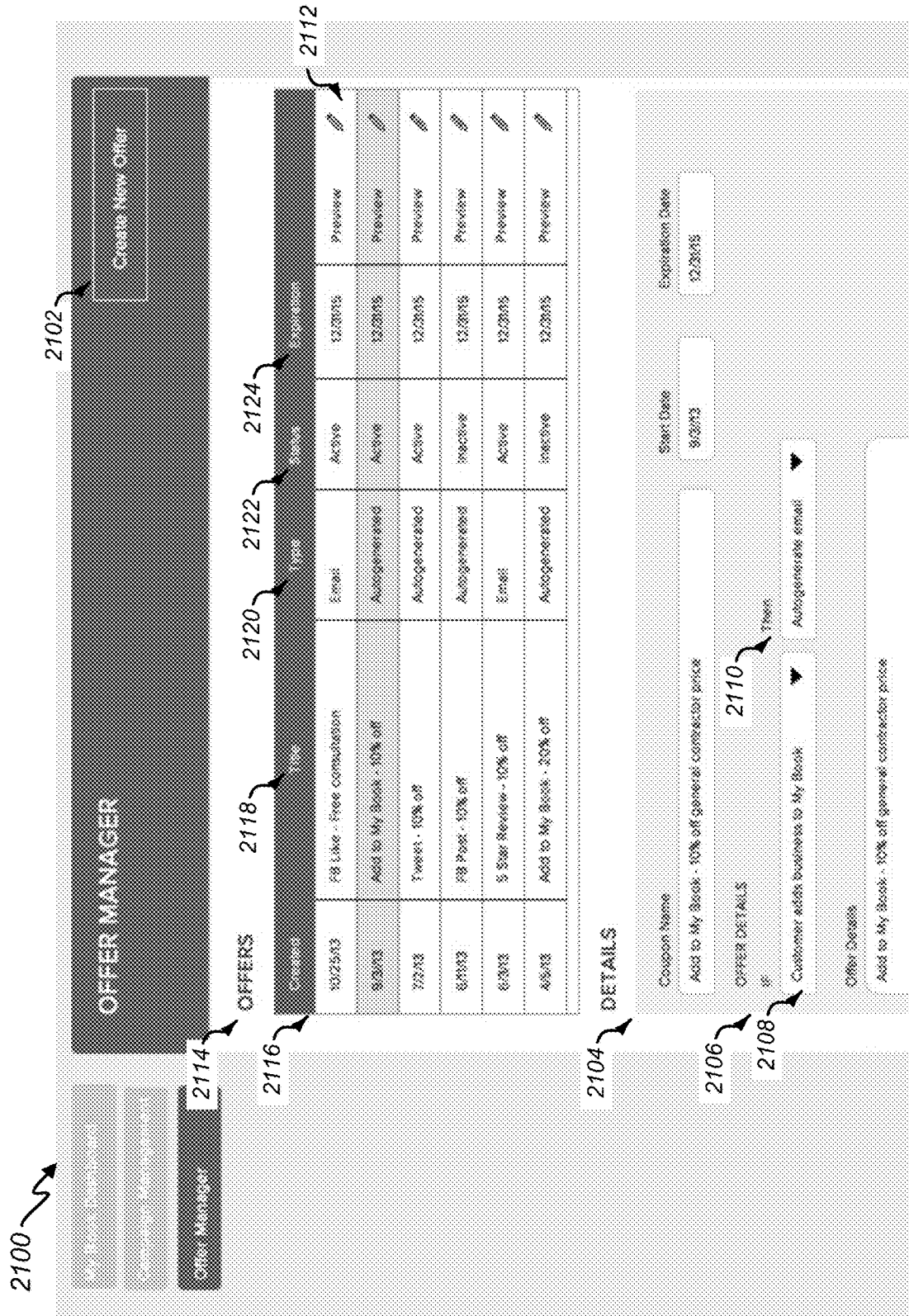
FIG. 21 illustrates one embodiment of an offer manager for an advertising platform that may correspond to a provider interface, in accordance with certain embodiments of the present disclosure.

FIG. 21 illustrates one embodiment of an offer manager 2100 for an advertising platform that may correspond to a provider interface(s) 700, in accordance with certain embodiments of the present disclosure. The offer manager 2100 may be provided in conjunction with the merchant dashboard 1800. The offer manager 2100 may allow for the creation of an advertising profile and may be configured to facilitate marketing automation. With an advertising profile, a merchant may be able to indicate specific offer information for provisioning to end users of the orchestration platform. An advertiser profile may include persistent offer provisioning information that is maintained for subsequent offer provisioning based on one or more trigger events. An advertiser profile may be retained in the one or more repositories 128.

One or more user-selectable options 2102, which may include workflows, may be provided via the offer manager 2100 to allow a merchant to create and/or designate certain offer information. In some embodiments, one or more templates 2104 may be provided for selection and/or input of desire details. Various coupon templates could be provided by the system 102 and presented to allow a choice of one or more templates. The various coupon template options could differ in terms of style, content, form, and/or the like. A coupon template 2104 could include fields for entry of information by the merchant. For example, the merchant may have an option to designate a service and/or product, offer/discount information, start date, expiration date, terms and conditions, and/or any suitable information to facilitate offer information provisioning. In some embodiments, the system 102 may at least partially populate a template with merchant information based at least in part on listing information and/or previous offer information already retained for a specific merchant. For example, a template could be pre-populated with merchant information such as business name, business location, and/or the like. In cases where there are multiple options for a given advertiser (say, multiple locations, multiple goods/services, and/or the like), the system 102 could identify those options and facilitate user-selectable options for the merchant to designate.

In some embodiments, a merchant may upload information for use in offer provisioning, and the offer manager 2100 could be configured to provide user-selectable options to facilitate such uploading. A merchant could upload any suitable offer information in any suitable form in various embodiments. For example, a merchant could upload an electronic coupon, images and/or other graphical/video data, audio data, and/or the like. Such uploaded data could correspond to any suitable advertising content.

In some embodiments, a merchant may be provided with options to designate certain business rules 2106 for offer information provisioning. Such business rules 2106 could specify one or more temporal conditions, such that provisioning may depend on one or both of temporal condition(s) and trigger events. Temporal conditions could include one or more of time parameters, day parameters, date parameters, location parameters, and/or the like that could be conditions for offer provisioning. Business rules 2106 specifying time parameters could include, e.g., rules for handling provisioning in view of a time of day when a trigger event occurs. Business rules 2106 specifying day parameters could include, e.g., rules for handling provisioning in view of a day of the week when a trigger event occurs. Business rules 2106 specifying date parameters, e.g., could include rules for handling provisioning in view of a date on which a trigger event occurs. Any suitable interface features, including input fields, telephone dialer inputs, IVR inputs, and/or user-selectable clock, calendar, and/or like GUI components could be provided to facilitate advertiser specification of business rules in various embodiments.

Business rules 2106 specifying location parameters could include, e.g., rules for handling provisioning in view of a location identified for an end user. Accordingly, with an advertiser profile, a merchant may be able to indicate specific areas for which particular offer provisioning to be targeted. In various embodiments, a target area could be specified in any suitable manner, including, for example, by one or more counties, municipalities, zip codes, distances from reference points, etc. In some embodiments, a user-selectable map interface may be presented as described herein.

Business rules 2106 specifying trigger event(s) 2108 could include, e.g., rules for handling provisioning in view of any one or combination of events associated with an end user's orchestration account. For example, trigger events 2108 could include one or more of an end user adding a business to a collection, a forming of a new collection around a theme, an addition of collaborator (e.g., adding a merchant as a collaborator), otherwise allowing a merchant to have access to a collection/window, a sharing of a collection and/or business window with another orchestration service user, a sharing of a collection and/or business window with a linked account (e.g., email, text message, online social/business networking services—one or more of which could be differentiated with distinct rules for handling sharing with distinct accounts), a copying/following of a collection, making a collection/window public, adding content to a collection/window, a time period since a last activity with respect to a business window, an end user's search relevant to a merchant not already added to the end user's collection, an end user's search relevant to a merchant already added to the end user's collection, a search for other merchants (e.g., a search relevant to a business already added to a collection of an end user, which search could potentially turn up competitors), and/or the like. In some embodiments, one or more trigger events 2108 could include location parameters to allow for provisioning in view of a location identified for an end user.

Business rules 2106 specifying a form of provisioning 2110 could include, e.g., rules for provisioning offer information via one or more of text messages, voice notifications, push notifications, e-mails, social/business networking services account postings/messages, alerts with the application, and/or other any suitable means. The offer manager 2100 may be configured to present an offer that a merchant has set up for previewing 2112. In some embodiments, the system 102 may subsequently use any one or combination of merchant-specific business rules 2106 to identify appropriate offer information options for one or more of a particular end user, trigger event, and/or conditions. In some embodiments, the system 102 may be configured to automatically provide offer information to an end user based on the merchant-specific business rules 2106 on behalf of the particular merchant without further merchant intervention. In some embodiments, the system 102 may be configured to present automatically identified offer information (i.e., identified based on the merchant-specific business rules 2106) for merchant selection so that the merchant may have the choice as to whether to dispatch the offer information.

In some embodiments, the system 102 can select pertinent offer information for transmission, select a delivery manner/form, and/or transmit pertinent offer information responsive to a trigger event based at least in part on the advertiser profile. In some embodiments, the system 102 may be configured to provide one or more offer information options to a merchant based on the merchant-specific business rules 2106. Accordingly, the system 102 can filter various offer information provisioning options with the merchant-specific business rules and present an appropriate subset of those options to a merchant for merchant selection.

In some embodiments, the offer manager 2100 may include a dashboard summary 2114 configured to present information and user-selectable options for offers retained by the system 102 for the merchant. The dashboard summary 2114 may present information such as offer creation date 2116, offer identification information 2118, specific form of provisioning 2120, offer status 2122, offer expiration 2124, and/or any other appropriate offer information. In some embodiments, the offer manager 2100 may be configured to present offer suggestions. The offer suggestions could prompt the merchant to create offers that the merchant has not already created. For example, offer manager 2100 may identify potential trigger events related to the merchant (e.g., an end user adding the merchant to a collection), and may query the merchant to whether create an offer in view of the potential trigger events.

Accordingly, certain embodiments may provide a merchant with a way to communicate with end users that are not only potential customers, but also potential promoters of the merchant. Certain embodiments may allow a merchant to market events, product offerings, and/or service offerings to end users.

Figure 22:
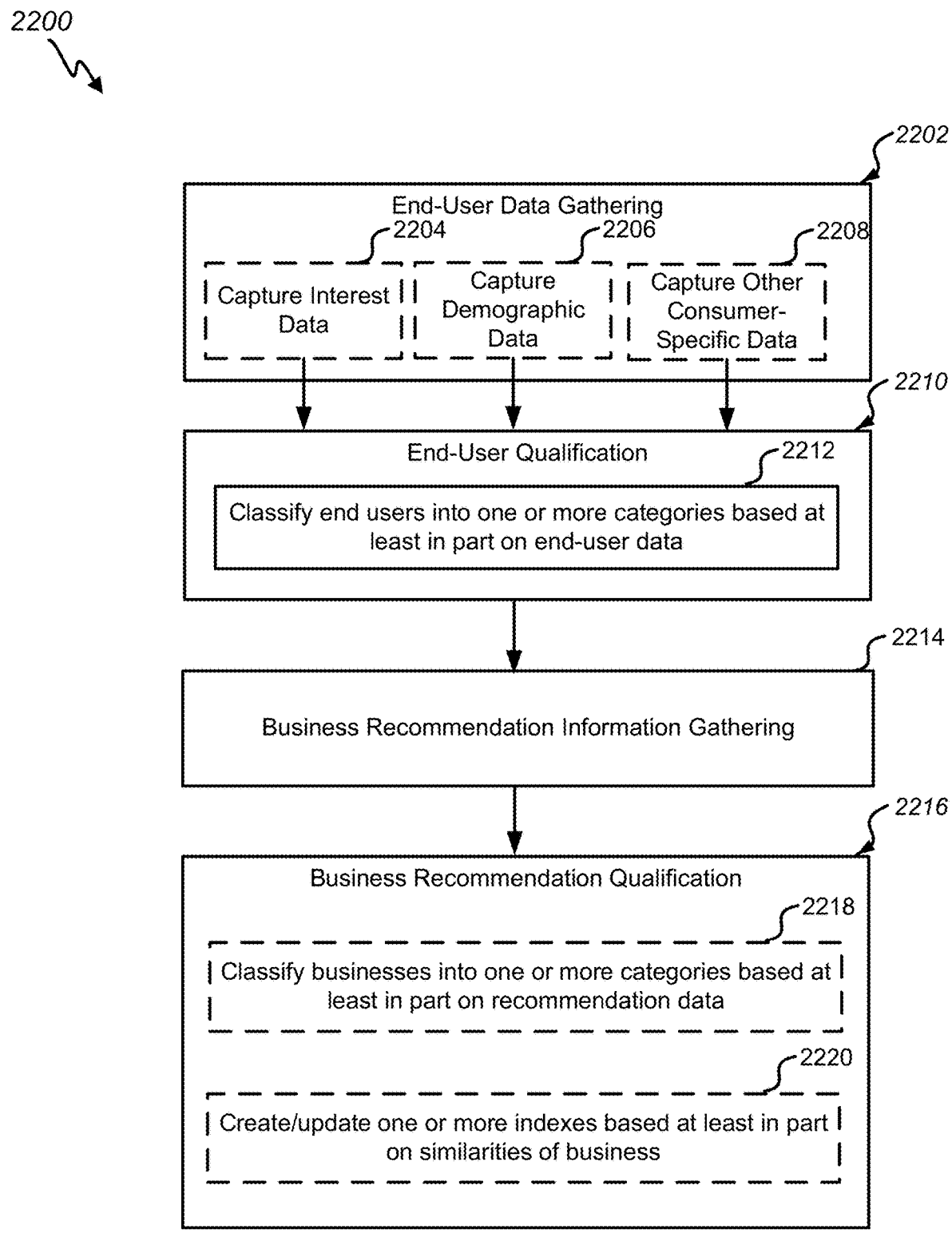
FIG. 22 is a diagram of an exemplary environment with which embodiments may be implemented, in accordance with certain embodiments of the present disclosure.

FIG. 22 shows a block diagram of a method 2200 of assisting a user to identify one or more businesses of interest, in accordance with certain embodiments of the present disclosure. One or more engines 122 may be configured to harvest and qualify end-user data. According to certain embodiments, the method 2200 may begin as indicated by block 2202.

Teachings of the present disclosure may be implemented in a variety of configurations. As such, the order of the steps comprising the method 2200 and other methods disclosed herein may be shuffled in any suitable manner and may depend on the implementation chosen. Moreover, while the following steps (and those of other methods disclosed herein) may be separated for the sake of description, it should be understood that certain steps may be performed simultaneously or substantially simultaneously.

As indicated by block 2202, end-user data may be gathered. The end-user data gathering may include capturing interest data, as indicated by block 2204. The capturing of interest data may include any one or combination of interest data capturing features disclosed herein.

The end-user data gathering may further include capturing demographic data, as indicated by block 2206. The capturing of demographic data for particular end users could be a part of interest data capturing. Any suitable demographic information could be harvested in various embodiments, for example, information about income level, education level, lifestyle, age, family/household, home ownership, etc. In some instances, demographic data could be provided by an end user as part of profile setup and/or development with the platform. Demographic data could be inferred from interest data and/or collection information, in some embodiments. For example, a user who has a collection directed to children or who has added a particular child-directed business to a collection (e.g., a pediatric dentist) could be taken as an indication that the user has or is otherwise associated with one or more children. In some embodiments, demographic data could be harvested from accounts that a user has linked with the system. In some embodiments, demographic data could be gathered from one or more third-party data sources 110.

The end-user data gathering may further include capturing other consumer-specific data, as indicated by block 2208. Any suitable consumer specific information could be harvested in order to allow for characterization of a particular user. For example, such consumer-specific information could include information on whether the consumer is proximate to life milestones such as a graduation, a new job, a wedding, childbirth, purchasing a home, etc. Consumer-specific information could include particular purchases or buying habits of the consumer, in some embodiments. Consumer-specific information could be inferred from interest data and/or collection information, in some embodiments. In various embodiments, demographic data could be harvested from accounts that a user has linked with the system and/or gathered from one or more third-party data sources 110.

As indicated by block 2210, particular end users may be qualified based at least in part on the end-user data gathered. The consumer data may be analyzed with respect to individual users. One or more engines 122 may be configured to classify end users into one or more categories. In some embodiments, the engines 122 may include a classifying engine to classify end users into one or more categories. In some embodiments, the orchestration engine 122(*g*) may be or include a classifying engine. A classifying engine may classify each of a plurality of end users into at least one category of a set of categories that represent classifications of end users based at least in part on one or more sets of attributes defined for classifying various end users.

The end-user qualification may include any one or combination of qualification features disclosed herein. As indicated by block 2212, an end-user may be classified into one or more categories based at least in part on the end-user data. Any suitable categories may be employed for characterization of end users. By way of example, and users may be categorized according to interests, demographics, consumer habits, life stages/milestones, and/or the like to any suitable degree of granularity.

As indicated by block 2214, information relating to business recommendations may be gathered. Such information may include information pertinent to end users having indicated a preference for particular businesses. Preference indicia may include users having indicated a preference for particular businesses, ratings for particular businesses, and/or the like. Business recommendation information may be aggregated from the platform. For example, such information could include instances of businesses being added to collections, being shared, being copied, being rated, and/or the like.

In addition or alternative, business recommendation may be aggregated from outside the platform. Some embodiments may identify business recommendation information based on user indications of preference (such as positive rating business, an indication of liking the business, friending or otherwise linking to a business, sharing business information with others, etc.) that the user has made via webpages and/or social media. Business recommendation information could be identified by approval/disapproval indicators, which may be in form of likes, dislikes, thumbs-up, thumbs-down, star-scale ratings, number-scale ratings, fan indications, affinity group association, messages to businesses, and/or the like. The approval/disapproval indicators could be those associated with the user's profile and/or profiles of friends/associates/connections of the user.

Information relating to business recommendations may further include location information pertinent to the businesses and/or users associated therewith. Information relating to business recommendations may further include the date and/or time information associated with the pertinent activities (e.g., additions to collections, shares, likes, etc.). The information may include any suitable information pertaining to explicit and/or implicit indicia of preference for businesses, interest in businesses, ratings of businesses, and/or like, such as the examples disclosed herein.

As indicated by block 2216, information relating to business recommendations may be qualified. As indicated by block 2218, businesses may be classified into one or more categories based at least in part on the information relating to business recommendations. Information about recommendations could be gathered, analyzed, and classified according to any suitable bases.

As indicated by block 2220, one or more indexes may be created based at least in part on similarities between businesses. The one or more indexes may link businesses based on the classifications and associated recommendation-specific information. By way of example, the one or more indexes may associate businesses based at least in part on any one or combination of the following.

Information with respect to a particular business may be analyzed in order to identify one or more business attributes. In some embodiments, the system may include a matching engine that can receive business information, identify attributes of the business based at least in part on the business information, and match the business to one or more categories based on category information retained in a repository. The business may be matched to one or more categories that each represent classifications of business sharing common attributes. In some embodiments, one or more taxonomies that map particular profile information to particular categories may be used in correlating business profile information with one or more categories. The business could be classified according to products and/or services that the business provides. The business could be classified according to location, for example, a market that the business serves and/or a physical site of the business. The business could be linked to location identifier(s) (such as a directory code(s) relevant to the business listing of the suggestion); geo coordinates corresponding to the business (e.g., latitude and longitude); and/or the like.

The indicia of preference for each business may be quantified and qualified according to the form of preference indicia (e.g., additions to collections, shares, likes, etc.). The various forms could be qualified differently to assess varying degrees of preference. For example, sharing a business that a user has added to a collection could indicate a greater degree of preference than simply adding the business to the collection. Likewise, a user actually communicating and/or engaging with the business may indicate a greater degree of preference than simply adding the business to the collection.

Aggregated recommendations may be classified according to user types/categories. In a set of embodiments, one or more collaborative filtering algorithms may be employed to define similarities between businesses based at least in part on demographic and/or consumer data. Businesses may be classified according to demographic data for particular end users that have indicated preferences for the businesses. For example, types of users that predominantly recommend certain businesses may be identified based at least in part on income level, education level, lifestyle, age, family/household, home ownership, etc. Types of users that predominantly recommend certain businesses may be identified based at least in part on user proximity to life milestones (such as a graduation, a new job, a wedding, childbirth, purchasing a home, etc.) and/or particular purchases or buying habits.

Information about user identifications associated with preference indicia with respect to businesses may be retained. For example, information about multiple relationships between user identifications may be retained. Such relationships could include relationships of users of the orchestration platform, of a social network, of a business network, of an affinity group, and/or the like. Accordingly, various embodiments aggregate recommended businesses and user identifications of people that recommend businesses in any one or combination of forums. The relationship information could include relationship graphs about relationships between user identifications via the orchestration platform and/or other forums. For example, the relationship information could indicate which users are related as collaborators on the platform, which users are related based on followings via the platform, which users are related as friends or connections via the platform and/or the other forums, which users are related as indirect connections through intermediate users, which users are members of affinity groups, etc. Mapping of related user identifications may be retained to facilitate identification of multiple user identifications associated with a particular user. For example, a user of the orchestration platform may have one user identification for logging into the platform and a different user notification for logging into a linked account.

In some embodiments, one or more of the data repositories and/or indexes may be updated periodically. Updating may occur at any suitable time. Updating may capture one or more of listing name changes, new business openings, business closings, preference data changes, and/or the like.

Certain embodiments may ensure or improve data integrity based on assessing frequencies for particular preferences over time. For example, preference distribution can change over time. There can be seasonal distribution changes, weekly distribution changes, and daily distribution changes. Analyzing the distributions may identify popular changes over a particular time period, such as the last 60 or 90 days. For example, analyzing the distributions may identify: how many preferences are indicated for a particular business in a particular area; how many businesses correspond to a particular user types in a particular area; how the changes impact the collaborative filtering analysis; and/or the like.

Figure 23:
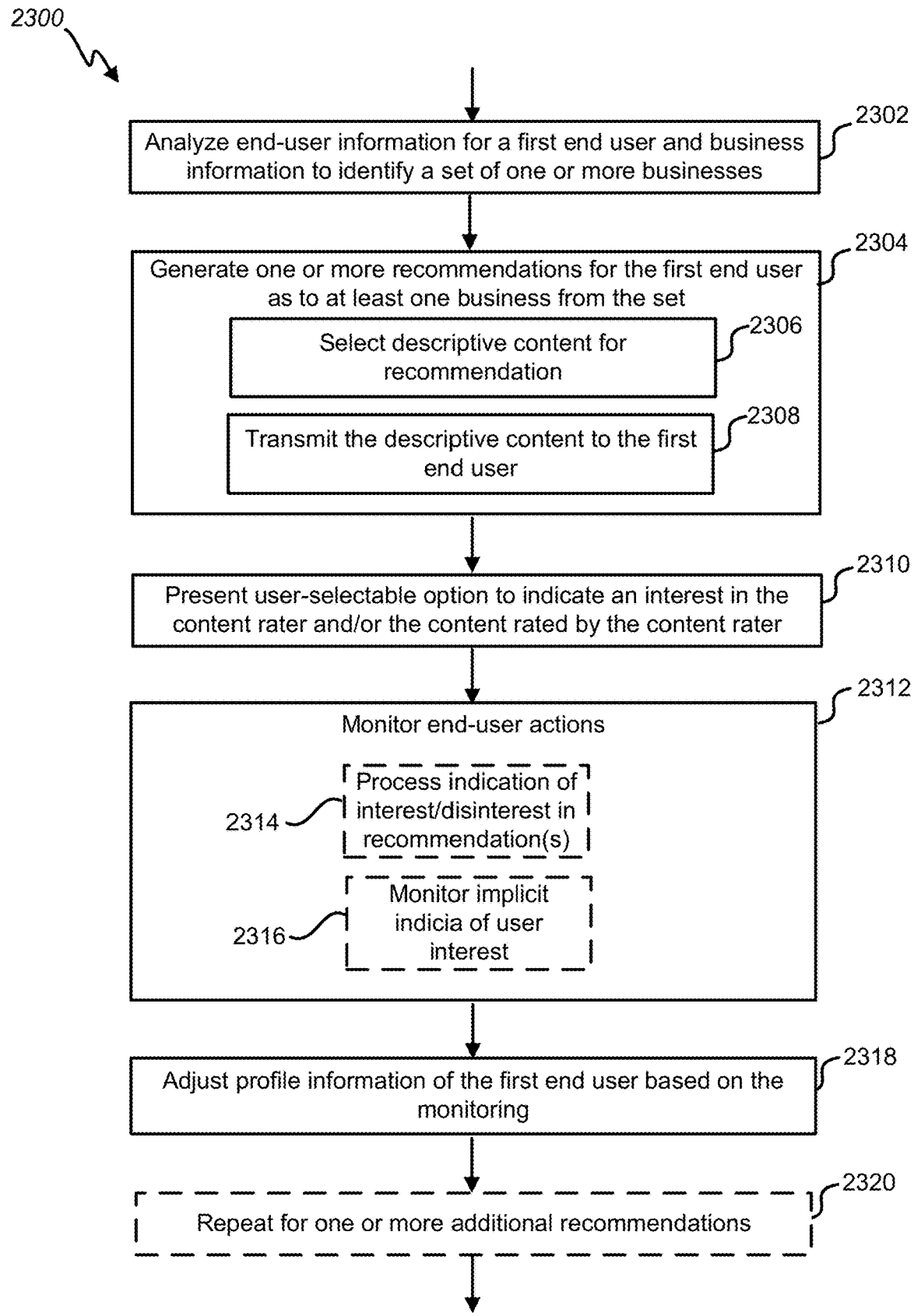
FIG. 23 is a diagram of an embodiment of a special-purpose computer system, in accordance with certain embodiments of the present disclosure.

FIG. 23 is a block diagram that illustrates an example method 2300 of certain recommendation features for particular end users, in accordance with certain embodiments of the present disclosure. One or more engines 122 may be configured to facilitate the recommendation features. As indicated by block 2302, end-user information for a first end user may be analyzed with respect to qualified business information to identify a set of one or more businesses based at least in part on the end-user qualification. The user may be identified based on user identification information and/or device identification information for a device that may be associated with a user.

Information related to the user and/or specific to the user may be gathered and analyzed in view of the one or more indexes to match the user with a set of one or more recommendations. Analysis of information about an identified user could entail comparing the user information to information about other users (e.g., to determine user similarities) in order to recommend businesses (e.g., others' favorite or otherwise preferred businesses) for the identified user to review.

In some embodiments, the one or more engines 122 (e.g., a recommendation engine 2402 discussed further herein, which may include a matching engine) may be configured to match the user to one or more businesses based at least in part on correlating categories. The matching could, in some embodiments, be based at least partially on comparing user attributes/categories with business attributes/categories. For example, they may be matched according to preferences, certain biographical information, demographic information, interests, location information, etc.

Any suitable correlation process may be employed. A scoring system could be correlated to the category scheme in some embodiments, such that certain scores correspond to matches of certain categories. Some embodiments may score a match with a numerical expression, for example, a match score, with higher scores being assigned to higher correlations of user attributes/categories with business attributes/categories. A high correlation may be identified using any suitable qualification scheme (e.g., a score threshold, a score ranking, etc.).

As indicated by block 2304, one or more recommendations for the user may be generated as to at least one business from the set of one or more businesses. The one or more engines 122, for example, may be configured to assess matches of the user and one or more businesses. A recommendation could be based on the highest correlation between the user and a business. As part of generating the recommendation, descriptive content indicative of a business may be selected, as indicated by block 2306. As indicated by block 2308, the descriptive content may be transmitted to a computing device and/or account associated with the user.

As indicated by block 2310, one or more user-selectable options to indicate an interest in the recommended business may be presented for selection by the user. Options could be provided for a user to add the recommended business. Descriptive content indicative of the recommended business may be provided with one or more user-selectable options and/or may be revealed with user selection of an option. Options could also be provided to allow the user to indicate disinterest in the recommendation and/or further recommendations.

In some embodiments, descriptive content could be anonymized so that one or more specific recommendations are offered to an individual user without revealing identities of other users from whom the one or more specific recommendations are derived. Though anonymized, a specific recommendation could be offered with a general characterization of the other users. As one example out of many possibilities, a recommendation for a dog owner in Glendale, Calif., could indicate that other dog owners in Glendale have a preference for a particular veterinarian.

In some embodiments, descriptive content may not be anonymized. Certain users of the platform may have public recommendation information. Real estate agents, for example, may curate a collection of local service providers relevant to those who have bought or in the process of buying a house in a particular area (such as recommended inspectors, handymen, and the like) and may wish to have such recommendations public. Accordingly, recommendations may not necessarily be anonymized.

In some embodiments, the recommendation may include a customized collection of advertising information for businesses. The customized collection may be automatically generated by the system for an individual user based on the analysis. The customized collection may be presented to the user as a curated collection with user-selectable options that allow the user to select and/or de-select recommended businesses for retention in association with the user. For example, the user may select one or more recommended businesses for additions to a new or existing collection of the user. As another example, the user may select a recommended collection for addition as a new collection or for addition to an existing collection.

As indicated by block 2312, end-user actions may be monitored consequent to the recommendation being provided. Any one or combination of actions and determinations may be correlated to indicia of greater or lesser interest in any suitable manner (e.g., based on a scoring scheme). As indicated by block 2314, an indication/disinterest of user interest by the user responsive to the recommendation may be processed. The user adding the recommended business to a collection may be taken as an indication of user interest. Alternatively, the user may indicate disinterest in the recommendation and/or further recommendations by selecting the appropriate option.

As indicated by block 2316, the end-user responses to recommendations could be monitored for implicit indicia of user interest. For example, it may be determined whether the user ignores the recommendation for a particular period of time. If the user has not taken action with respect to the recommendation after a threshold of time, such inaction may be taken as an indication of disinterest.

As another example, it may be determined whether the user ultimately removes the recommended business from a collection after having added the business. This may be deeded as an indication of disinterest in the business. Other examples may include monitoring for indications that the user engages with the business (e.g., through communication links provided by the platform), develops notes regarding the business, enlist collaborators for a collection including the business, and/or shares the business information with others, which actions may be taken as indications of interest in the business.

As indicated by block 2318, profile information associated with the user may be adjusted based at least in part on the monitoring. For example, the profile information may be updated in view of positive responses to the recommendation (e.g., adding the recommended business to a collection, engaging with the business, sharing the business information, etc.). Thus, in certain instances, additional recommendations can be made for the user periodically or at any suitable frequency, taking into account the addition of the business to the user's collection, as indicated by block 2320.

The profile information could be updated in view of negative responses to the recommendation. The system can disable the recommendation features based on the explicit rejection of the recommendation feature by the user. Instances of the user indicating disinterest in particular recommended businesses may be considered for future recommendations to adjust to the user preferences.

The system could also take into account implicit negative responses. For example, repeated instances of the user ignoring a certain number of recommendations may be taken as a lack of interest in recommendations, generally, and the generation of further recommendations could be halted indefinitely or for certain period of time, so as not to provide unwanted features to the user of the platform. A threshold number of ignored recommendations over a certain period of time, without the user having taken any action on any recommendation, could be employed to determine when to halt the recommendation provisioning process with respect to the particular user.

Figure 24:
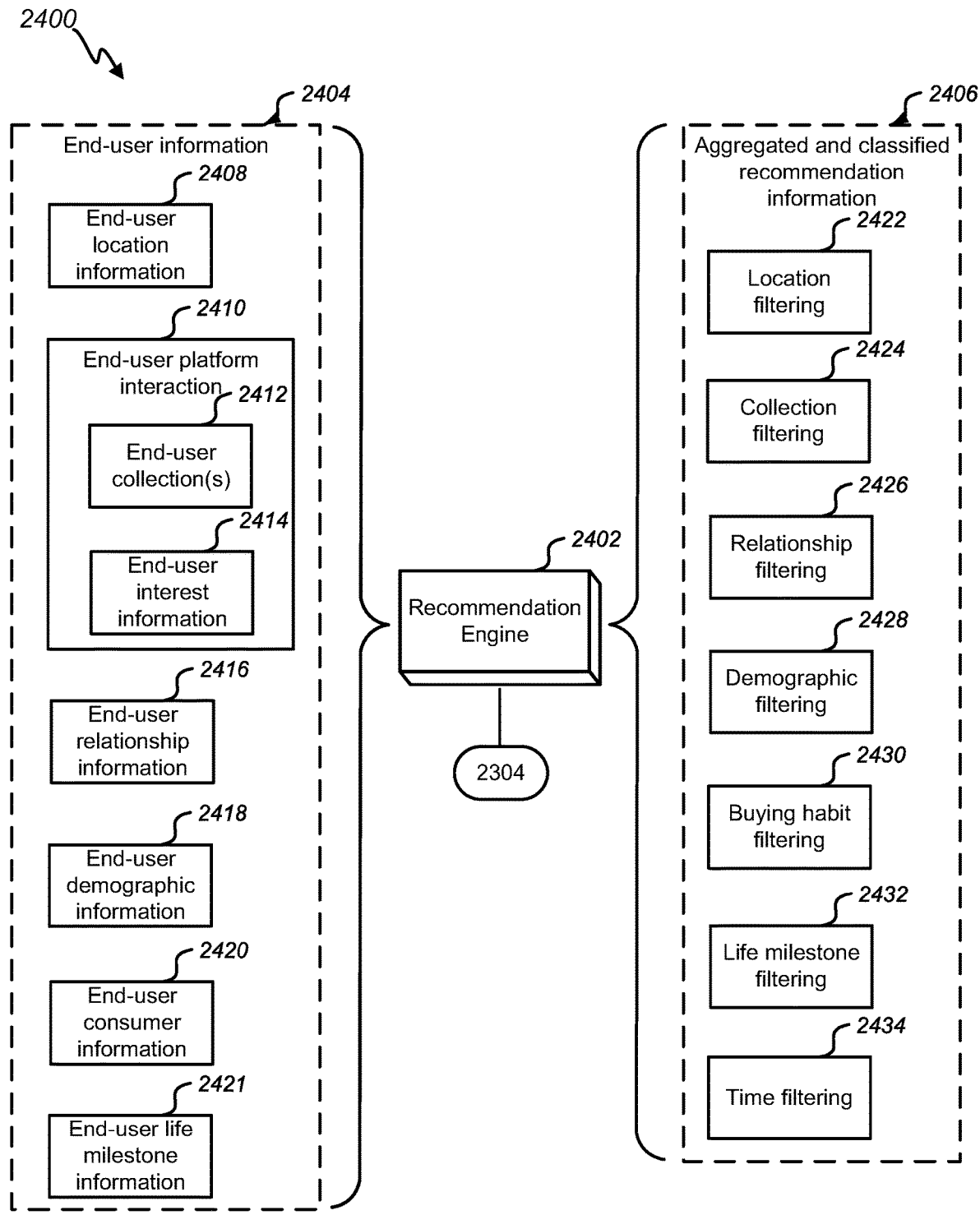
FIG. 24 depicts a functional block diagram of certain aspects of recommendation generation, in accordance with certain embodiments of the present disclosure.

FIG. 24 depicts a functional block diagram of certain aspects of recommendation generation 2400, in accordance with certain embodiments of the present disclosure. Various embodiments may employ any one or combination of various methods of determining recommendations for particular end users based at least in part on user characteristics. In a set of embodiments, recommendations could be based at least in part on demographic information. Recommendations could be based at least in part on any suitable consumer-specific information that may be cluster-based consumer data and/or user-targeted consumer data. In some embodiments, one or more aspects of the functional model 2400 may correspond to assessing/ranking/scoring relevance of recommendations in various embodiments discussed herein. In some embodiments, the functional model 2400 may be implemented as a decision tree.

One or more engines 122 may be configured to provide a recommendation engine 2402. The recommendation engine 2402 may analyze end-user information 2404 for a first end user and aggregated, classified business information 2406 to identify a set of one or more businesses. The recommendation engine 2402 may generate one or more recommendations, which may correspond to block 2304 of FIG. 23.

Certain embodiments may identify recommendations based at least partially on similarities of characteristics of a first end user and characteristics of other users from whom the business information 2406 has been derived. Any suitable algorithm for assessing similarity may be employed. Some embodiments may identify intersections between multiple sets of characteristics. Having set intersections identified, the intersections may be compared. A greater extent of an intersection may be an indication of a greater degree of similarity between the users. In some embodiments, the sets may be ranked according to the extent of the intersections. Any one or combination of the following aspects of end-user information 2404 and aggregated, classified business information 2406 may be used by the recommendation engine 2402 generate recommendations.

In some embodiments, end-user location information 2408 may be processed. The location information 2408 may correspond to location information for the user previously retained in conjunction with the platform as an area of interest for the user, such location information having been identified by the user and/or derived from user selections made with the platform. In some embodiments, the location information 2408 may include location information gathered by the system via the end-user computing device 105. Thus, the user's location may be updated, for example, as the user travels to various locations. While the user may generally be associated with a specific locale, certain embodiments may provide recommendations that are directed to a different location to which the user travels. The recommendation engine 2402 may use the end-user location information 2408 with location filtering 2422 to identify location-relevant business recommendations. Recommendations could be scored based on proximity to a relevant location of interest of the user.

In some embodiments, end-user platform interaction 2410 may be processed by the recommendation engine 2402. This may correspond to the data capture and analysis of user interaction further described herein. The end-user platform interaction 2410 may include information on end-user collections 2412 and end-user interest information 2414. For example, the current state of one or more of the user's collections could be analyzed as input to determine businesses already associated with the collections, similarities with businesses not currently associated with the collections, similarities with other users, and/or the like.

Further, the end-user interest information 2414, described further herein, may likewise be used as input to determine matching businesses and users. The end-user collections 2412 and end-user interest information 2414 may be used by the recommendation engine 2402 in conjunction with collection filtering 2424, which could include one or more collaborative filtering algorithms and/or indexes, to determine similarities between the first end user and other users and their business preferences. For example, say a set of collection/interest information for the first end user includes five characteristics, recommendation engine 2402 may determine that a threshold number of other users sharing those five characteristics have indicated a preference for a particular business in the relevant location that the first end user has not already included in a collection. Recommendations could be scored based at least in part on the extent of common characteristics shared by the first end user and the other users.

In the case that it is determined that the user travels to a new location that is different from a location with which the user is generally associated, it may be further determined whether businesses in the user's current collections have additional business sites in the new location. For example, a user may have a business already in the user's collection that is a part of a chain of businesses that includes an additional site in the user's current location. In some embodiments, an identification of the additional site in the new location may trump other recommendations such that the additional site may be selected as a top recommendation for the particular user. In other embodiments, the additional site may not automatically trump other recommendations but may be scored, perhaps relatively highly, along with other recommendation possibilities. In some embodiments, the additional site is a recommendation possibility may be further qualified based on other criteria, such as frequency of user visits to the business in the previous location (e.g., a chain business may be scored highly if the user frequently visited the business in the previous location).

In some embodiments, end-user relationship information 2416 may be processed by the recommendation engine 2402. The recommendation engine 2402 may select businesses based at least in part on the end user relationship information 2416 and relationship filtering 2426. Recommendations could be selected based at least in part on a number of recommendations derived from users within a certain degree of closeness to the first end user in one or more relationship graphs about relationships between user identifications via the orchestration platform and/or other forums. Recommendations could be scored based at least in part on the relationships between the first end user and the other users, with various embodiments differentiating degrees of closeness and/or forums.

In some cases, only the most relevant relationships to the first end user are used as a basis for selecting recommendations. For example, associated user identifications within a predetermined maximum degree of closeness between the user identifications of the recommending users and the first end user may be considered for selecting recommendations. Closeness may be based on the number of independent relationships between two users. For example, two users may be directly related though a friendship/connection and may be considered to have a closer relationship when they are also members of the same group as compared to two users that do not share a common group. Furthermore, two users that share multiple common groups and have friendships or connections on multiple forums/networks may be considered to be closer than those that have fewer connections.

In some embodiments, end-user demographic information 2418 may be processed by the recommendation engine 2402 to select businesses based at least in part on demographic filtering 2428. The recommendation engine 2402 may determine a correspondence of demographic information of the first end user and other users associated with recommendations. Such determinations may be made based at least in part on any suitable demographic information, such as, for example, information about income level, education level, lifestyle, age, family/household, home ownership, etc. By way of example, the recommendation engine 2402 may determine based at least in part on demographic information that the first end user fits the profile of a relatively young, single male that is a recent college graduate living in an upscale downtown apartment, and may identify recommendations of other users that fit that profile at least to a certain extent. Recommendations could be scored based at least in part on the extent of common demographic characteristics shared by the first end user and the other users.

In some embodiments, end-user consumer information 2420 may be processed by the recommendation engine 2402 to select businesses based at least in part on buying habit filtering 2430. The recommendation engine 2402 may determine a correspondence of buying habit information of the first end user and other users associated with recommendations. By way of example, the recommendation engine 2402 may determine based at least in part on the buying habit information that the first end-user matches a category corresponding to a cutting-edge technology consumer that tends to adopt the latest technology with regard to wireless devices for communication and home control, and may identify recommendations of other users of that consumer type. Recommendations could be scored based at least in part on the extent of common consumer characteristics shared by the first end user and the other users.

In some embodiments, end-user life milestone information 2421 may be processed by the recommendation engine 2402 to select businesses based at least in part on life milestone filtering 2432. The recommendation engine 2402 may determine a correspondence of life milestones of the first end user and other users associated with recommendations. For example, imminent and/or recent college graduates may be matched in order to identify recommendations based at least in part on the similarity. Recommendations could be scored based at least in part on the extent of common milestone characteristics shared by the first end user and the other users.

In some embodiments, the recommendation engine 2402 may use time filtering 2434 to take into account relevant time factors with recommendations. For example, certain recommendations may be more relevant to particular seasons or times during the year. Proximity to certain holidays, for example, may be relevant to certain businesses. In certain embodiments, a time decay factor may be implemented in order to qualify the relevance of recommendations based on how recent the preferences were indicated. For example, a time decay factor may be used with time-based recommendations (e.g., based on season, holiday, user actions, etc.) so that more recent preferences may be given more weight than less recent preferences.

Correspondence between the end-user information 2404 and aggregated, classified business information 2406 may be scored in certain embodiments. For example, weights may be assigned to intersecting sets of characteristics, and the weights may be taken into account with an overall relevance score. Any suitable criteria may be used to identify and assign a weight, and any one or combination of the weights may be summed or otherwise used at least as a partial basis for deriving an overall relevance score. Any suitable scale may be used for the scoring. The recommendation engine 2402 may use one or more blending algorithms to select businesses from a rich set of recommendations based at least in part on the scoring.

In some cases, only recommendations with a predetermined minimum number of associated user identifications may be considered for selection. In some cases, only recommendations having a minimum number of user recommendations overall and having a minimum number of recommendations from recommending users within a maximum degree of closeness to the first end user may be considered for selection.

In some embodiments, the recommendation engine 2402 may rank recommendations according to popularity of the recommendations (e.g., numbers of users indicating the preferences) and/or similarity between the first end user and recommenders. In some embodiments, having identified pertinent recommendations based on user similarities, subsets of recommendations may be selected based at least in part on popularity of the recommendations. In some embodiments, recommendations may first be selected based at least in part on popularity of the recommendations, and then subsets of recommendations may be selected based at least in part on user similarities. Various embodiments may balance popularity of recommendations and similarity of recommenders to the first end user in various ways, with various embodiments placing greater weight on one of those two considerations or equal weight on both.

Accordingly, in some embodiments, the engines 122 (e.g., the orchestration engine 122(*g*)) may be configured to facilitate individual selections, by end users, of businesses to retain information corresponding to the businesses. The engines 122 may process indicia of selections made by each end user, the indicia being received via a network. The engines 122 may retain collections of business information in one or more repositories. In some embodiments, the engines 122 (e.g., the orchestration engine 122(*g*) which may include a classifying engine) may be configured to classify each end user into at least one category of a set of categories that represent classifications of end users based at least in part on one or more sets of attributes defined for classifying various end users.

In some embodiments, the engines 122 (e.g., the recommendation engine 2402 which may include a matching engine) may be configured to process first information enabling unique identification of a first end user, process second information about a first location corresponding to the first end user, and match the first end user to a first category from the set of categories. The engines 122 may identify a first set of collection information associated with a first set of end users that correspond to the first category and the first location, determine a recommendation for the first end user based at least in part on the first set of collection information, the first category, and the first location, cause indication of the recommendation to a first end-user computing device, and facilitate selection of the first business to retain information corresponding to the first business in association with the first end user. In some embodiments, the engines 122 (e.g., the recommendation engine 2402 which may include a harvesting engine) may be configured to: gather data about the first end user from one or more data sources, and analyze the data about the first end user to determine a first set of one or more attributes of the first end user. The matching the first end user to the first category may be based at least in part on determining that the first set of one or more attributes of the first end user correspond to the first category, and the first set of end users that correspond to the first category may share the first set of one or more attributes in common with the first end user. In some embodiments, the engines 122 (e.g., the recommendation engine 2402 which may include a ranking engine) may be configured to rank a set of businesses associated with the first set of collection information based at least in part on a first metric, where the determining the recommendation for the first end user comprises selecting the first business based at least in part on the ranking.

Figure 25:
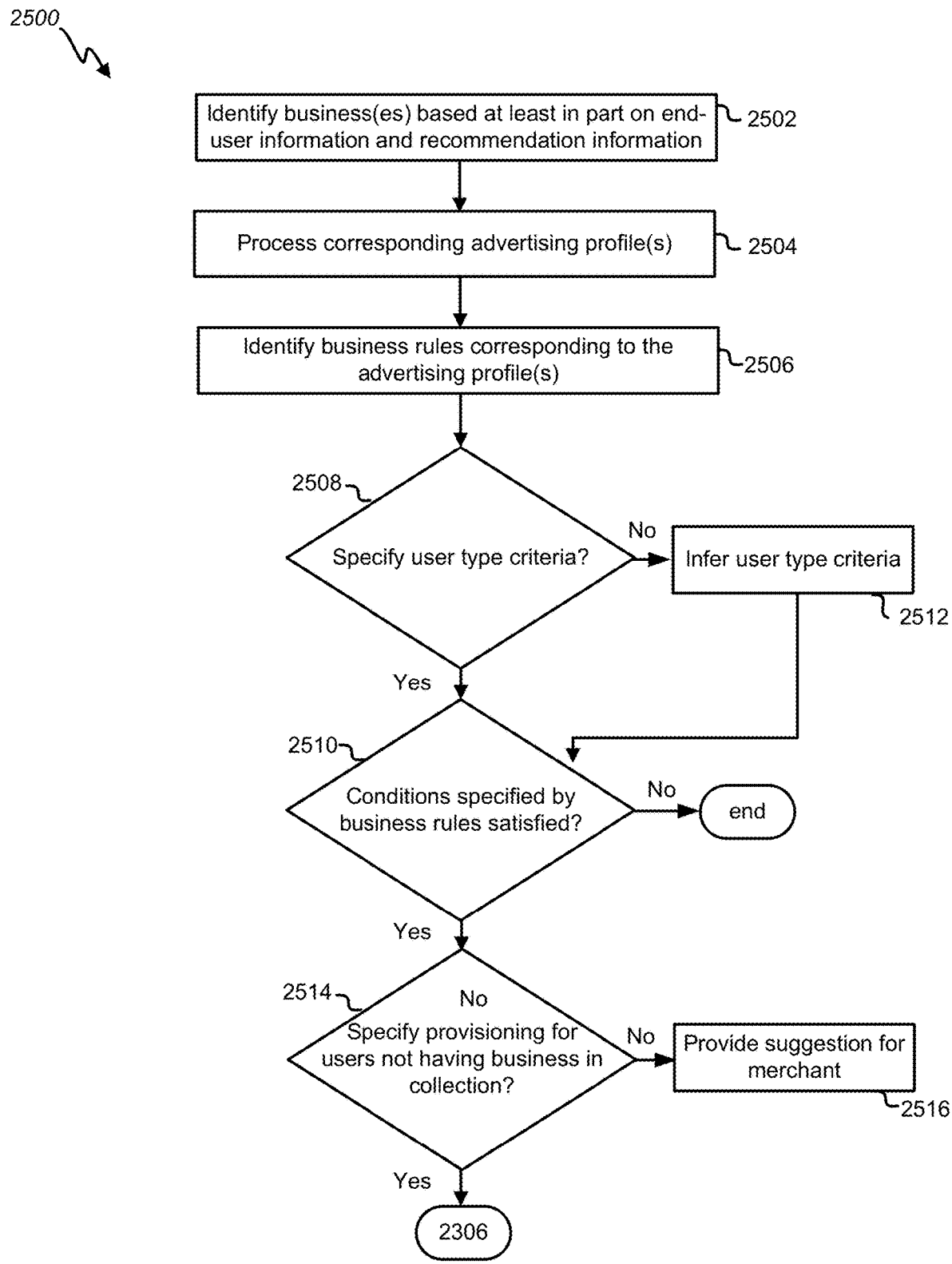
FIG. 25 is a block diagram that illustrates an example method of offer provisioning where recommendations include offers for particular end users, in accordance with certain embodiments of the present disclosure.

FIG. 25 is a block diagram that illustrates an example method 2500 of offer provisioning where recommendations include offers for particular end users, in accordance with certain embodiments of the present disclosure. The features of method 2500 may be facilitated by the recommendation engine 2402 with the recommendation generation described above.

As indicated by block 2502, one or more businesses may be identified based at least in part on the end-user information 2402 and the recommendation information 2406. As indicated by block 2504, one or more advertising profiles corresponding to the one or more businesses may be retrieved and processed. With an advertising profile, a merchant may have previously indicated specific offer information, such as coupons, for provisioning to end users of the orchestration platform based on one or more trigger events. Advertising profiles may be defined via the offer manager 2100 in some embodiments.

As indicated by block 2506, one or more business rules may be identified based at least in part on the one or more advertising profiles. As previously described, an advertising profile may include certain business rules 2106 for offer information provisioning. The business rules 2106 could specify trigger event(s) 2108 that could include, e.g., rules for handling provisioning in view of any one or combination of events associated with an end user's orchestration account. In some embodiments, one or more trigger events 2108 could include location parameters to allow for provisioning in view of a location identified for an end user. The business rules 2106 could specify location parameters could include, e.g., rules for handling provisioning in view of a location identified for an end user. The business rules 2106 could specify one or more temporal conditions, such that provisioning may depend on one or both of temporal condition(s) and trigger events.

In various embodiments, the business rules 2106 could specify any one or combination of user type aspects of the recommendation information 2406, such as demographic criteria and/or buying habit criteria. As indicated by block 2508, in some embodiments, it may be determined whether the business rules specify user type criteria. In the case that the business rules do specify such criteria, it may be determined whether the first end user satisfies the criteria, as indicated by block 2510.

However, in the case that the business rules do not specify such criteria, the criteria could be system-inferred in some embodiments, as indicated by block 2512. The criteria could be inferred based at least in part on the aggregated and classified recommendation information 2406. For example, recommendation information for a given advertiser may be determined to correspond to certain demographic and/or buying habit criteria, as previously described. Even though an advertiser did not specify user type criteria, the system may determine a high correlation between users recommending the business and certain user type characteristics. Thus, as the inferred criteria may be based on recommender that share similarities with the first end user, the system could assume that the inferred criteria are satisfied as to the first end user. Accordingly, an advertiser may target consumers based on specific user type criteria, or the platform may identify specific user type criteria for the advertiser as a potential target.

As indicated by block 2510, it may be determined whether the conditions specified by the business rules are satisfied. As indicated by block 2514, it may be determined whether the business rules specify conditions for provisioning offer information to users that have not already added the respective business to a collection. If the business rules do specify such conditions, the system 102 may automatically provide offer information to an end user based on the merchant-specific business rules 2106 on behalf of the particular merchant without further merchant intervention. The flow may transition to block 2306 of FIG. 23, where descriptive content that is selected for the recommendation may include the offer information that an advertiser has specified, and the descriptive content may be transmitted to the first end user in accordance with the business rules 2106 specifying a form of provisioning 2110.

However, if the business rules do not specify such conditions, the system 102 may be configured to present automatically identified offer information (i.e., identified based on the merchant-specific business rules 2106 and the recommendation analysis) for merchant selection so that the merchant may have the choice as to whether to dispatch the offer information, as indicated by block 2516. In addition to the identified offer information, any suitable descriptive information pertaining to the recommendation analysis may be provided. For example, the merchant may be notified that the first end user matches certain categories that correspond to the merchants offer, other users that have recommended the merchant, and/or the like. Accordingly, the platform may provide recommendations to merchants as to particular users to whom the merchants may wish to send offer information.

Figure 26:
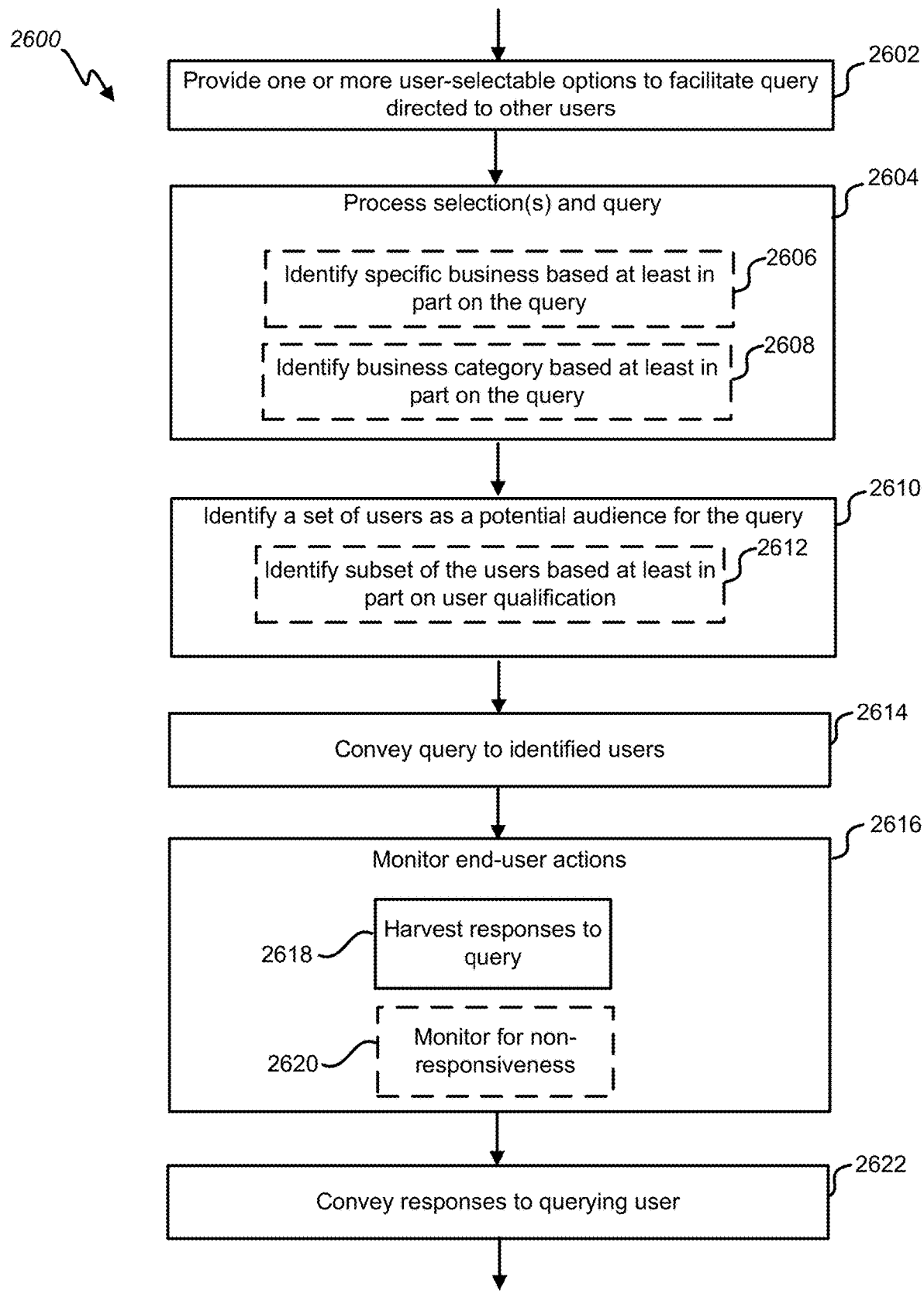
FIG. 26 is a block diagram that illustrates an example method of facilitating features to allow a user of the platform to direct queries to other users, in accordance with certain embodiments of the present disclosure.

FIG. 26 is a block diagram that illustrates an example method 2600 of facilitating features to allow a user of the platform to direct queries to other users, in accordance with certain embodiments of the present disclosure. The features of method 2600 may be facilitated by the one or more engines 122 in some embodiments, which may be configured to provide a query engine. As indicated by block 2602, one or more user selectable options may be provided to facilitate queries directed other users.

User-selectable options could be presented in any suitable manner. For example, user selectable options may be presented with any one or combination of the user interfaces and/or user interface features disclosed herein and the like. As indicated by block 2604, one or more user selections and a user query may be processed.

As indicated by block 2606, a specific business may be identified based at least in part on the query in some embodiments, where the query and/or selections explicitly indicate a particular business. Certain embodiments may provide features to allow a user of the platform to ask other users of the platform about a business that the other users have added to their collections. A user could identify a particular business via a search interface, a suggestion, a public collection, a shared window, and/or the like.

As indicated by block 2608, in some embodiments, one or more business categories may be identified based at least in part on the query. Certain embodiments may provide features to allow a user of the platform to ask other users of the platform about a business category and/or something related/relatable to a business category. For example, a user may enter question, and the platform may parse the words of the question and relate the keywords of the question to one or more business categories. Thus, embodiments disclosed herein with respect to processing interest data and correlating keywords of the interest data to business categories may also be applied to correlating user queries to one or more business categories.

As indicated by block 2610, a set of users may be identified as a potential audience for queries. In some embodiments, the set of users may be identified based at least in part on one or more user selections that may indicate a desired audience. The set of users could be restricted to users of the platform in some cases.

However, certain embodiments may provide features to allow for queries to be directed not only to other platform users, but also to users of one or more networking forms, such as a social and/or business network. A query could, for example, be directed to other users related to the querying user via a social graph. The querying user may be able to select one or more desired audiences with some embodiments.

As indicated by block 2612, in some embodiments, a subset of the users may be identified based at least in part on user qualification. Any suitable user qualification, such as any one or combination of the user qualification aspects disclosed herein, may be used in various embodiments. Users could be selected on the basis of interaction with the business and/or business category. For example, the subset of users may be selected based at least in part on the users having added the business and/or a business in the particular business category to collections.

In a set of embodiments, the platform may identify a set of users as a potential audience for queries based at least in part on an assessment of the likelihoods that the users will reply to queries. Users could be selected based at least in part on user interaction with the platform. Users could be selected based at least in part on whether the users have engaged the business and/or business in a particular business category.

Figure 27:
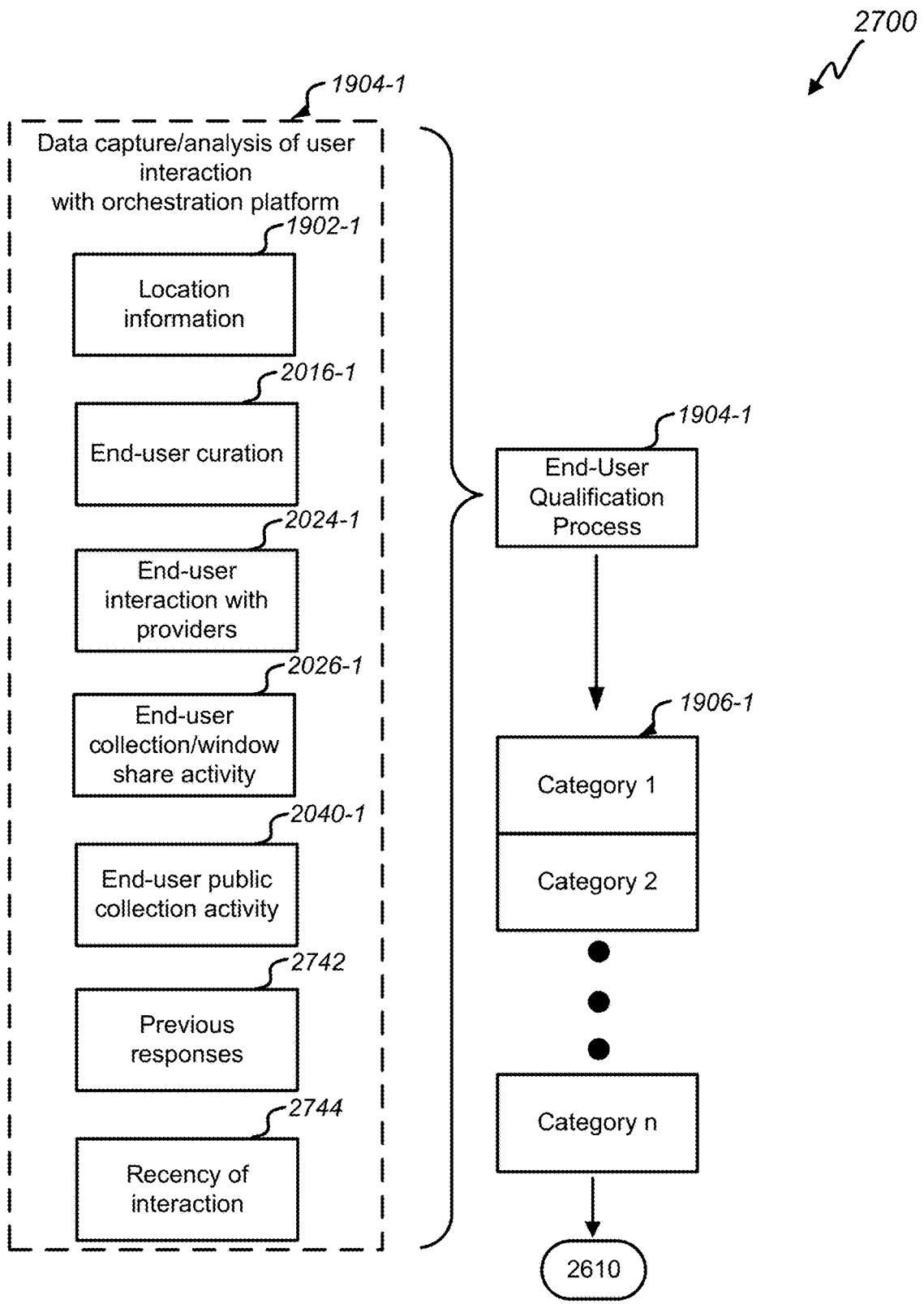
FIG. 27 depicts a functional block diagram of certain aspects of end-user qualification to facilitate querying, in accordance with certain embodiments of the present disclosure.

FIG. 27 depicts a functional block diagram of certain aspects of end-user qualification 2700 to facilitate querying, in accordance with certain embodiments of the present disclosure. Various embodiments may employ any one or combination of various methods of qualifying end users. End-user data may be captured, as disclosed herein, and used to qualify users to indicate, infer, and/or determine which end users are likely to respond to particular queries and/or have a good basis to respond. An end-user's interactions with the orchestration platform can be broken down and assessed based on any one or combination of various factors, such as, for example, duration of various directed interactions, locations of the end user relative to business locations, demographic information of the end user, collection/window development by the end user, content added by the end user, communications with merchants, keyword analysis user-generated content and/or communications, and/or the like. Based on such indicia, an end user can be qualified.

Having end-user data, the system 102-2 may implement an end-user qualification process 1904-1. Some embodiments may qualify an end-user according to a graduated scale. Any suitable scale may be used in various embodiments. In some embodiments, a scale could entail a categorization scheme 2706, with any suitable categories to characterize likelihood of responsiveness and/or response quality, and could correspond to very high, high, medium, and low likelihood segments. A scale could entail an end-user scoring system, as disclosed herein, with an end-user score corresponding to an assessment of an end-user's potential to respond to queries.

The criteria for qualifying consumers may take into account the extent of end-user interaction. A greater extent of interaction could increase a ranking assigned to a particular user. The user interaction considered may include one or more of interaction directed to the merchant, the business area of the merchant, and/or other merchants related to the merchant's business area. The criteria for qualifying consumers may take into account the extent of user interaction with a collection and/or information window associated with the merchant, the business area of the merchant, and/or other merchants related to the merchant's business area. The qualification of a particular consumer may also be weighted as a result of keywords being used in communication and/or commentary associated with a collection and/or window related to the merchant—e.g., the keywords may indicate a user ready to buy, engage services, and/or otherwise conduct business. The qualification of a particular consumer may be weighted more heavily as a result of indicia that the consumer made a purchase, engaged services, and or otherwise conducted business.

In various embodiments, any one or combination of: location information 1902-1; an end user's interaction on the orchestration platform 1904-1 (which could also include interaction with networks, such as business/social networks, through or otherwise associated with the platform); end-user curation (2016-1) may be taken into account as end-user data of interest (which may be assessed in terms of curation time, curation instances, user-added content, etc.); an end user's interaction with the business and/or businesses corresponding to the query (2024-1); an end user's collection/window share activity (2026-1) (which may be assessed in terms of numbers of occurrences, form of sharing, size of audience, feedback on shares, etc.); an end user's public collection share activity (2040-1); an end user's previous responses (2742) to queries (e.g., instances, response-query ratio, etc.); the recency of the end user's activities (2744) (which may be assessed in view of certain time period thresholds); and/or the like could be assessed and assigned points accordingly, with greater points being assigned with greater correspondence to the business and/or business category being queried about. One or more the top-ranked categories 1906-1 of users may be used to select users as query recipients, and flow may transition back to block 2610 of FIG. 26. The selection could be iteratively expanded if sufficient responses are not received with certain time thresholds.

With respect to block 2610, users could be selected based at least in part on explicit and/or implicit indicia of preference for the particular business and/or category via the platform and/or other networks. Users could be selected based at least in part on user type. For example, users having similarities with the querying user may be identified and selected. The user selection could include any one or combination of the features disclosed herein with respect to the recommendation generation 2400 as applied to facilitate identifying pertinent recipients for a particular end user's queries, with the end result being an audience selection rather than a recommended business.

Figure 28:
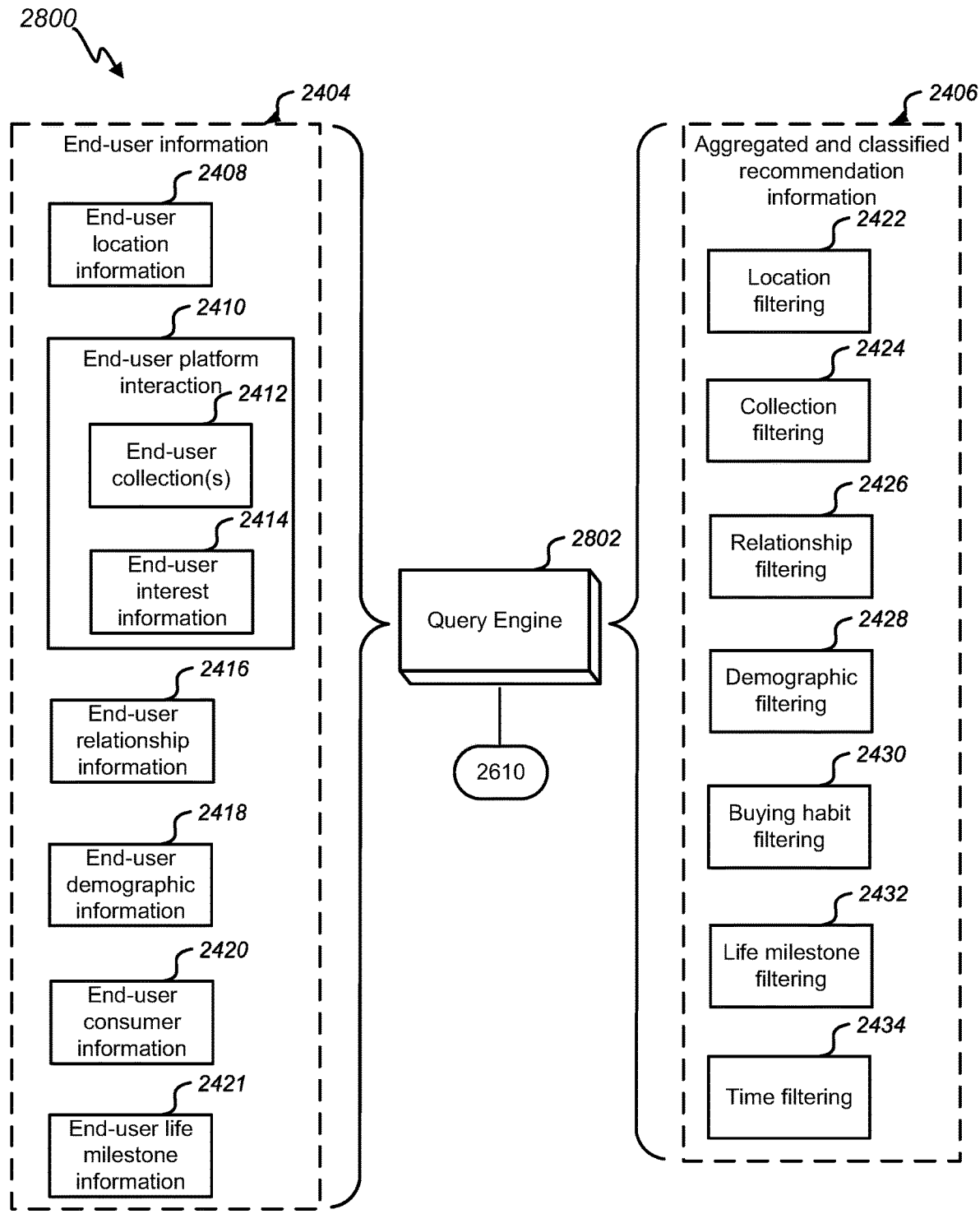
FIG. 28 depicts a functional block diagram of certain aspects of query recipient selection, in accordance with certain embodiments of the present disclosure.

FIG. 28 depicts a functional block diagram of certain aspects of query recipient selection 2800, in accordance with certain embodiments of the present disclosure. One or more engines 122 may be configured to provide a query engine 2802. The query engine 2802 may analyze end-user information 2404 for a first end user and aggregated, classified business information 2406 to identify a set of users. The query engine 2802 may be configured to provide features similar to the features disclosed with respect to the recommendation engine 2402, except that the query engine 2802 may first identity users that have indicated preference for the business and/or business category corresponding to the query and then may apply the filtering to identify a subset of users as query recipients.

Referring again to FIG. 26, as indicated by block 2614, the query may be conveyed to the identified users. In various embodiments, the query may be conveyed via any one or combination of notification means such as those disclosed herein. For example, social/business networking services account postings/messages, platform account notifications, pop-ups, and/or other alerts with the platform application, text messages, voice notifications, push notifications, e-mails, and/or other any suitable means could be employed to allow for the presentation of query information.

As indicated by block 2616, the end-user actions may be monitored. Responses to the query may be harvested, as indicated by block 2618. As indicated by block 2620, in some embodiments, non-responsiveness to the query may likewise be monitored. The harvesting responses could be provided by way of user selectable options provided via the platform account and/or the social business network services, API calls, crawling, pull and/or push user feedback in any suitable way, and/or the like.

As indicated by block 2622, responses to the query may be conveyed to the querying user in any suitable manner. For example, the responses may be conveyed via any suitable interface of a platform application, such as a dedicated query results page, an activity feed, pop-ups, or any other suitable notification means. In some embodiments, the responses may be quantified according to any user metrics, and such information may be presented to the querying user. For example, responses coming from platform users may be quantified, responses from social network users may be quantified, etc. Furthermore, descriptive information about the users, the selection criteria, and/or the like may be presented to the querying user.

Figure 29:
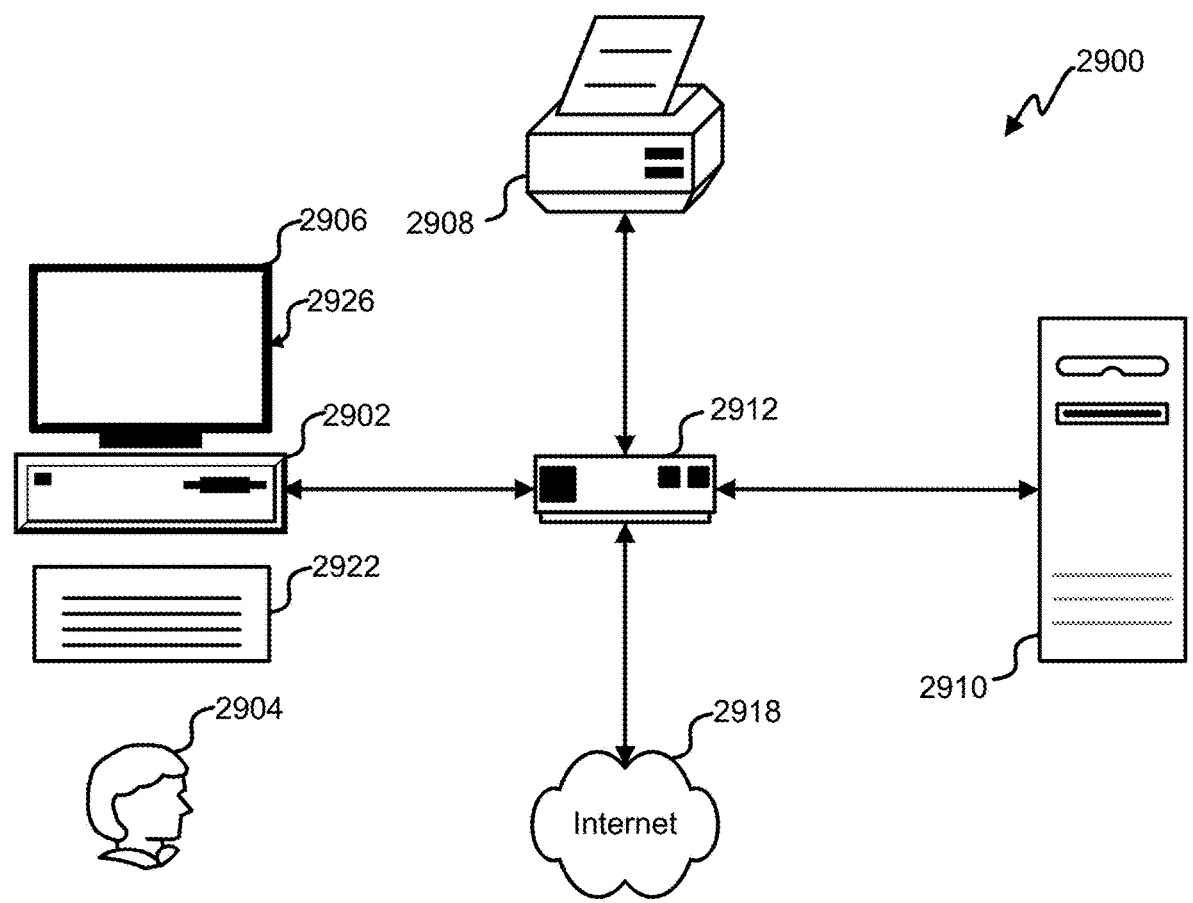
FIG. 29 is an exemplary environment with which embodiments may be implemented is shown with a computer system that can be used by a designer to design, for example, electronic designs, in accordance with certain embodiments of the present disclosure.

Referring next to FIG. 29, an exemplary environment with which embodiments may be implemented is shown with a computer system 2900 that can be used by a designer 2904 to design, for example, electronic designs. The computer system 2900 can include a computer 2902, keyboard 2922, a network router 2912, a printer 2908, and a monitor 2906. The monitor 2906, processor 2902 and keyboard 2922 are part of a computer system 2926, which can be a laptop computer, desktop computer, handheld computer, mainframe computer, etc. The monitor 2906 can be a CRT, flat screen, etc.

A designer 2904 can input commands into the computer 2902 using various input devices, such as a mouse, keyboard 2922, track ball, touch screen, etc. If the computer system 2900 comprises a mainframe, a designer 2904 can access the computer 2902 using, for example, a terminal or terminal interface. Additionally, the computer system 2926 may be connected to a printer 2908 and a server 2910 using a network router 2912, which may connect to the Internet 2918 or a WAN.

The server 2910 may, for example, be used to store additional software programs and data. In some embodiments, software implementing the systems and methods described herein can be stored on a storage medium in the server 2910. Thus, the software can be run from the storage medium in the server 2910. In another embodiment, software implementing the systems and methods described herein can be stored on a storage medium in the computer 2902. Thus, the software can be run from the storage medium in the computer system 2926. Therefore, in this embodiment, the software can be used whether or not computer 2902 is connected to network router 2912. Printer 2908 may be connected directly to computer 2902, in which case, the computer system 2926 can print whether or not it is connected to network router 2912.

Figure 30:
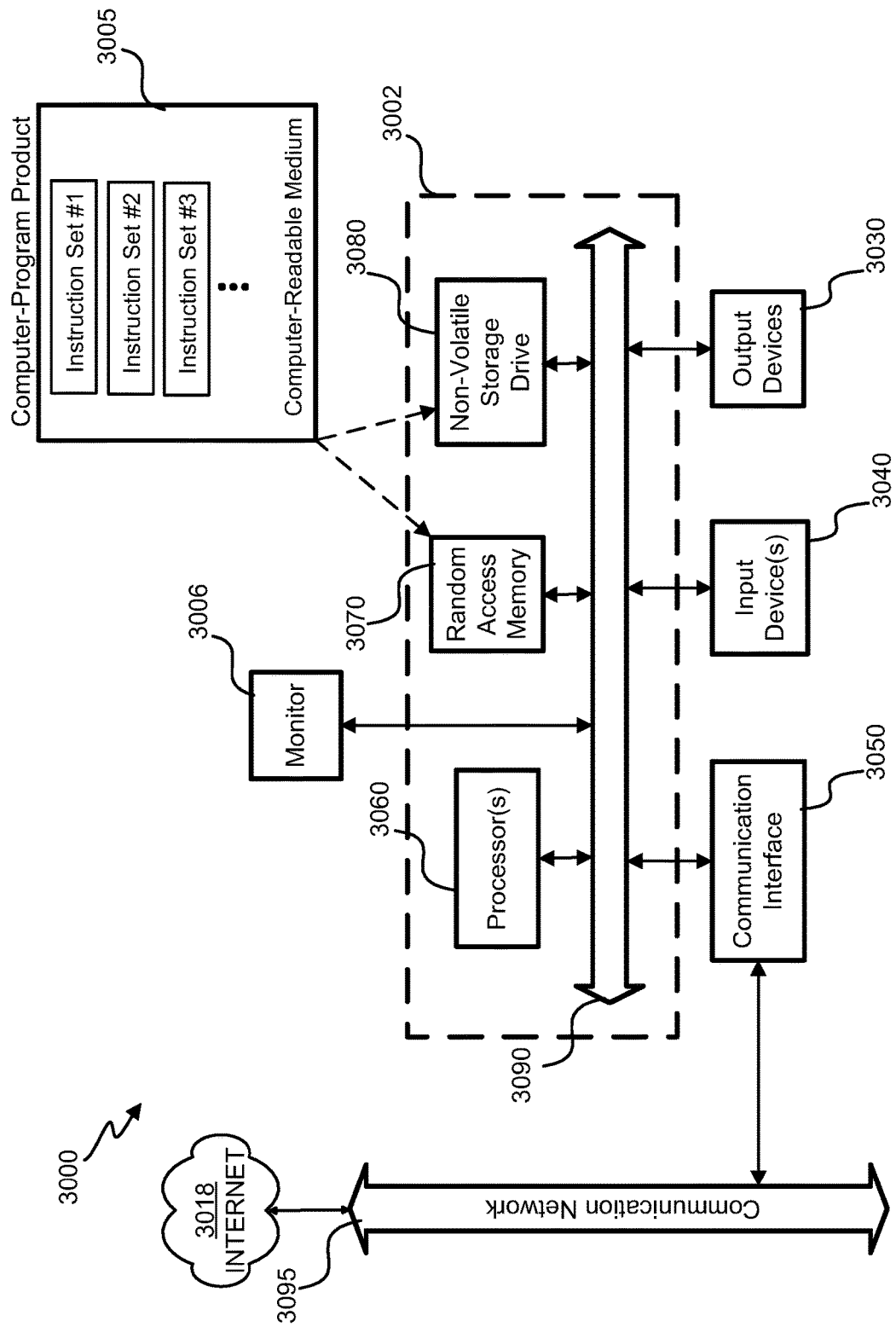
FIG. 30 is an embodiment of a special-purpose computer system, in accordance with certain embodiments of the present disclosure.

With reference to FIG. 30, an embodiment of a special-purpose computer system 3000 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system, it is transformed into the special-purpose computer system 3000.

Special-purpose computer system 3000 comprises a computer 3002, a monitor 3006 coupled to computer 3002, one or more additional user output devices 3030 (optional) coupled to computer 3002, one or more user input devices 3040 (e.g., keyboard, mouse, track ball, touch screen) coupled to computer 3002, an optional communications interface 3050 coupled to computer 3002, a computer-program product 3005 stored in a tangible computer-readable memory in computer 3002. Computer-program product 3005 directs system 3000 to perform the above-described methods. Computer 3002 may include one or more processors 3060 that communicate with a number of peripheral devices via a bus subsystem 3090. These peripheral devices may include user output device(s) 3030, user input device(s) 3040, communications interface 3050, and a storage subsystem, such as random access memory (RAM) 3070 and non-volatile storage drive 3080 (e.g., disk drive, optical drive, solid state drive), which are forms of tangible computer-readable memory.

Computer-program product 3005 may be stored in non-volatile storage drive 3080 or another computer-readable medium accessible to computer 3002 and loaded into memory 3070. Each processor 3060 may comprise a microprocessor, such as a microprocessor from Intel® or Advanced Micro Devices, Inc.®, or the like. To support computer-program product 3005, the computer 3002 runs an operating system that handles the communications of product 3005 with the above-noted components, as well as the communications between the above-noted components in support of the computer-program product 3005. Exemplary operating systems include Windows® or the like from Microsoft® Corporation, Solaris® from Oracle®, LINUX, UNIX, and the like.

User input devices 3040 include all possible types of devices and mechanisms to input information to computer system 3002. These may include a keyboard, a keypad, a mouse, a scanner, a digital drawing pad, a touch screen incorporated into the display, audio input devices such as voice recognition systems, microphones, and other types of input devices. In various embodiments, user input devices 3040 are typically embodied as a computer mouse, a trackball, a track pad, a joystick, wireless remote, a drawing tablet, a voice command system. User input devices 3040 typically allow a user to select objects, icons, text and the like that appear on the monitor 3006 via a command such as a click of a button or the like. User output devices 3030 include all possible types of devices and mechanisms to output information from computer 2302. These may include a display (e.g., monitor 3006), printers, non-visual displays such as audio output devices, etc.

Communications interface 3050 provides an interface to other communication networks 3095 and devices and may serve as an interface to receive data from and transmit data to other systems, WANs and/or the Internet 3018. Embodiments of communications interface 3050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 3050 may be coupled to a computer network, to a FireWire® bus, or the like. In other embodiments, communications interface 3050 may be physically integrated on the motherboard of computer 3002, and/or may be a software program, or the like.

RAM 3070 and non-volatile storage drive 3080 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 3070 and non-volatile storage drive 3080 may be configured to store the basic programming and data constructs that provide the functionality of various embodiments of the present invention, as described above.

Software instruction sets that provide the functionality of the present invention may be stored in RAM 3070 and non-volatile storage drive 3080. These instruction sets or code may be executed by the processor(s) 3060. RAM 3070 and non-volatile storage drive 3080 may also provide a repository to store data and data structures used in accordance with the present invention. RAM 3070 and non-volatile storage drive 3080 may have a number of memories including a main random access memory (RAM) to store of instructions and data during program execution and a read-only memory (ROM) in which fixed instructions are stored. RAM 3070 and non-volatile storage drive 3080 may include a file storage subsystem providing persistent (non-volatile) storage of program and/or data files. RAM 3070 and non-volatile storage drive 3080 may also include removable storage systems, such as removable flash memory.

Bus subsystem 3090 provides a mechanism to allow the various components and subsystems of computer 3002 communicate with each other as intended. Although bus subsystem 3090 is shown schematically as a single bus, alternative embodiments of the bus subsystem may utilize multiple busses or communication paths within the computer 3002.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method to assist a user to identify one or more businesses of interest, the method comprising:
    facilitating, by an orchestration engine processing at a computer system, individual selections entered at a user interface of a mobile computing device, by a plurality of end users, of one or more businesses to retain in a storage medium information corresponding to the one or more businesses by the computer system, where said user interface is displayed by a mobile application stored on and processing at the mobile computing device;
    processing, by the computer system, indicia of interest selections made by each end user of the plurality of end users, the indicia of interest selections being entered at the user interface of the mobile computing device and received by the computer system via a network;
    retaining in a storage medium at the computer system, by a personalized collection utility processing at the computer system, collections of business information in one or more repositories, each collection of the collections of business information:
    uniquely associated with a respective end user of the plurality of end users;
    comprising information corresponding to one or more selected businesses of the one or more businesses that were individually selected by the respective end user for retention in one or more of various collections as selected by the end user, via a personalized collection utility user interface for personal customized organization of the user's business information in association with the respective end user; and
    associated with a respective theme pertaining to the one or more selected businesses; classifying, by a classifying engine processing at the computer system, each end user of the plurality of end users into at least one category of a set of categories, the set of categories representing classifications of end users based at least in part on one or more sets of attributes defined for classifying various end users and by comparing the indicia of interest selections made by each end user;
    processing, by the computer system, first information enabling unique identification of a first end user;
    determining, by a location engine processing at the computer system, a location of a first end-user computing device of a first end user;
    processing, by a patterned based reasoning engine processing at the computer system, second information about the determined location corresponding to the first end user;
    matching, by the computer system, the first end user to a first category from the set of categories;
    identifying, by a patterned based reasoning engine processing at the computer system, a first set of collection information associated with a first set of end users that correspond to the first category and the determined location;
    determining, by a recommendation engine processing at the computer system, a recommendation for the first end user based at least in part on the first set of collection information, the first category, relationship information, relationship filtering, demographic filtering and the determined location, wherein the recommendation corresponds to a first business detected in a geographic area of the determined location of the first end-user computing device, based in part on detecting geocoordinates of a location of the first business, the first business was individually selected for retention in association with at least some of the first set of end users;

gathering indicia of interest based on the respective end user interactions and associating the indicia of interest with the respective end user;

gathering business specific indicia based on one or more of collection addition indicators and network specific indicators; and causing, by the mobile application processing at the mobile computing device, presentation on the user interface of the mobile computing device of visible indicia of the recommendation of the first business to user interface of the mobile device of the first end-user mobile computing device associated with the first end user, and facilitating selection by displaying user selectable options on the user interface, via the user interface, of the first business from the visible indicia to retain information corresponding to the first business in association with the first end user, and further causing indicia of interest information to be stored on the storage medium responsive to the selection of the recommendation.

2. The method to assist the user to identify one or more businesses of interest of claim 1, further comprising:

gathering data about the first end user from one or more data sources; and analyzing the data about the first end user to determine a first set of one or more attributes of the first end user;

wherein the matching the first end user to the first category is based at least in part on determining that the first set of one or more attributes of the first end user correspond to the first category; and wherein the first set of end users that correspond to the first category share the first set of one or more attributes in common with the first end user.

3. The method to assist the user to identify one or more businesses of interest of claim 2, wherein the one or more data sources comprise one or both of the first end user or a third party data source, and the data about the first end user comprises demographic data.

4. The method to assist the user to identify one or more businesses of interest of claim 2, wherein the first set of one or more attributes of the first end user comprises one or more of a demographic characterization of the first end user, a consumer characterization of the first end user, and/or a proximity to a life event.

5. The method to assist the user to identify one or more businesses of interest of claim 1, further comprising:

ranking a set of businesses associated with the first set of collection information based at least in part on a first metric;

wherein the determining the recommendation for the first end user comprises selecting the first business based at least in part on the ranking.

6. The method to assist the user to identify one or more businesses of interest of claim 1, wherein the determining the recommendation for the first end user comprises:

retrieving a second set of collection information that is associated with the first end user and that comprises information corresponding to one or more selected businesses of the one or more businesses that were individually selected by the first end user for retention; and comparing the second set of collection information with the first set of collection information associated with the first set of end users, and identifying one or more similarities.

7. The method to assist the user to identify one or more businesses of interest of claim 1, wherein the recommendation for the first end user comprises an offer from the first business.

8. A system to assist a user to identify one or more businesses of interest, the system comprising:

one or more network interfaces accessible from a network;

one or more processors coupled to at least one of the one or more network interfaces and to one or more repositories, the one or more processors to execute instructions to:

facilitate, by an orchestration engine processing at a computer system, individual selections entered at a user interface of a mobile computing device, by a plurality of end users, of one or more businesses to retain in a storage medium information corresponding to the one or more businesses, where said user interface is displayed by a mobile application stored on and processing at the mobile computing device;

process indicia of interest selections made by each end user of the plurality of end users, the indicia of interest selections being entered at the user interface of the mobile computing device and received via a network;

retain in a storage medium at the computer system, by a personalized collection utility processing at the computer system, collections of business information in at least one of the one or more repositories, each collection of the collections of business information:

uniquely associated with a respective end user of the plurality of end users;

comprising information corresponding to one or more selected businesses of the one or more businesses that were individually selected by the respective end user for retention in one or more of various collections as selected by the end user, via a personalized collection utility user interface for personal customized organization of the user's business information in association with the respective end user; and associated with a respective theme pertaining to the one or more selected businesses; classify, by a classifying engine processing at the computer system, each end user of the plurality of end users into at least one category of a set of categories, the set of categories representing classifications of end users based at least in part on one or more sets of attributes defined for classifying various end users and by comparing the indicia of interest selections made by each end user;

process first information enabling unique identification of a first end user;

determine, by a location engine processing at the computer system, a location of a first end-user computing device of the first end user;

process, by a patterned based reasoning engine processing at the computer system, second information about the determined location corresponding to the first end user;

match the first end user to a first category from the set of categories;

identify, by a patterned based reasoning engine processing at the computer system, a first set of collection information associated with a first set of end users that correspond to the first category and the determined location;

determine, by a recommendation engine processing at the computer system, a recommendation for the first end user based at least in part on the first set of collection information, the first category, relationship information, relationship filtering, demographic filtering and the determined location, wherein the recommendation corresponds to a first business detected in a geographic area of the determined location of the first end-user computing device, based in part on detecting geocoordinates of a location of the first business, the first business was individually selected for retention in association with at least some of the first set of end users;

gathering indicia of interest based on the respective end user interactions and associating the indicia of interest with the respective end user;

gathering business specific indicia based on one or more of collection addition indicators and network specific indicators; and cause, by the mobile application processing at the mobile computing device presentation on the user interface of the mobile computing device of visible indicia of the recommendation of the first business to the user interface of a first end-user mobile computing device associated with the first end user, and facilitating selection by displaying user selectable options on the user interface, via the user interface, of the first business from the visible indicia to retain information corresponding to the first business in association with the first end user, and further cause indicia of interest information to be stored on the storage medium responsive to the selection of the recommendation.

9. The system to assist the user to identify one or more businesses of interest of claim 8, the one or more processors to further execute instructions to:

gather data about the first end user from one or more data sources; and analyze the data about the first end user to determine a first set of one or more attributes of the first end user;

wherein the matching the first end user to the first category is based at least in part on determining that the first set of one or more attributes of the first end user correspond to the first category; and wherein the first set of end users that correspond to the first category share the first set of one or more attributes in common with the first end user.

10. The system to assist the user to identify one or more businesses of interest of claim 9, wherein the one or more data sources comprise one or both of the first end user or a third party data source, and the data about the first end user comprises demographic data.

11. The system to assist the user to identify one or more businesses of interest of claim 8, wherein the first set of one or more attributes of the first end user comprises a demographic characterization of the first end user, a consumer characterization of the first end user, and/or a proximity to a life event.

12. The system to assist the user to identify one or more businesses of interest of claim 8, the one or more processors to further execute instructions to:

rank a set of businesses associated with the first set of collection information based at least in part on a first metric;

wherein the determining the recommendation for the first end user comprises selecting the first business based at least in part on the ranking.

13. The system to assist the user to identify one or more businesses of interest of claim 8, wherein the determining the recommendation for the first end user comprises:

retrieving a second set of collection information that is associated with the first end user and that comprises information corresponding to one or more selected businesses of the one or more businesses that were individually selected by the first end user for retention; and comparing the second set of collection information with the first set of collection information associated with the first set of end users, and identifying one or more similarities.

14. The system to assist the user to identify one or more businesses of interest of claim 8, wherein the recommendation for the first end user comprises an offer from the first business.

15. One or more non-transitory, machine-readable media having machine-readable instructions thereon to assist a user to identify one or more businesses of interest, which instructions, when executed by one or more computers or other processing devices, cause the one or more computers or other processing devices to:

facilitate, by an orchestration engine processing at a computer system, individual selections entered at a user interface of a mobile computing device, by a plurality of end users, of one or more businesses to retain in a storage medium information corresponding to the one or more businesses, where said user interface is displayed by a mobile application stored on and processing at the mobile computing device;

process indicia of interest selections made by each end user of the plurality of end users, the indicia of interest selections being entered at the user interface of the mobile computing device and received by the computer system via a network;

retain in a storage medium at the computer system, by a personalized collection utility processing at the computer system, collections of business information in one or more repositories, each collection of the collections of business information:

uniquely associated with a respective end user of the plurality of end users;

comprising information corresponding to one or more selected businesses of the one or more businesses that were individually selected by the respective end user for retention in one or more of various collections as selected by the end user, via a personalized collection utility user interface for personal customized organization of the user's business information in association with the respective end user; and associated with a respective theme pertaining to the one or more selected businesses; classify, by a classifying engine processing at the computer system, each end user of the plurality of end users into at least one category of a set of categories, the set of categories representing classifications of end users based at least in part on one or more sets of attributes defined for classifying various end users and by comparing the indicia of interest selections made by each end user;

process first information enabling unique identification of a first end user;

determine, by a location engine processing at the computer system, a location of a first end-user computing device of the first end user;

process, by a patterned based reasoning engine processing at the computer system, second information about a first location corresponding to the first end user;

match the first end user to a first category from the set of categories;

identify, by a patterned based reasoning engine processing at the computer system, a first set of collection information associated with a first set of end users that correspond to the first category and the first location;

determine, by a recommendation engine processing at the computer system, a recommendation for the first end user based at least in part on the first set of collection information, the first category, relationship information, relationship filtering, demographic filtering, and the first location, wherein the recommendation corresponds to a first business detected in a geographic area of the determined location of the first end-user computing device, based in part on detecting geocoordinates of a location of the first business, the first business was individually selected for retention in association with at least some of the first set of end users;

gathering indicia of interest based on the respective end user interactions and associating the indicia of interest with the respective end user;

gathering business specific indicia based on one or more of collection addition indicators and network specific indicators; and cause, by the mobile application processing at the mobile computing device presentation on the user interface of the mobile computing device of visible indicia of the recommendation of the first business to the user interface of the mobile computing device of the first end-user mobile computing device associated with the first end user, and facilitating selection by displaying user selectable options on the user interface, via the user interface, of the first business from the visible indicia to retain information corresponding to the first business in association with the first end user, and further causing indicia of interest information to be store on the storage medium responsive to the selection of the recommendation.

16. The one or more non-transitory, machine-readable media of claim 15, the instructions to further cause the one or more computers or other processing devices to:

gather data about the first end user from one or more data sources; and analyze the data about the first end user to determine a first set of one or more attributes of the first end user;

wherein the matching the first end user to the first category is based at least in part on determining that the first set of one or more attributes of the first end user correspond to the first category; and wherein the first set of end users that correspond to the first category share the first set of one or more attributes in common with the first end user.

17. The one or more non-transitory, machine-readable media of claim 16, wherein the one or more data sources comprise one or both of the first end user or a third party data source, and the data about the first end user comprises demographic data.

18. The one or more non-transitory, machine-readable media of claim 15, wherein the first set of one or more attributes of the first end user comprises a demographic characterization of the first end user, a consumer characterization of the first end user, and/or a proximity to a life event.

19. The one or more non-transitory, machine-readable media of claim 15, the instructions to further cause the one or more computers or other processing devices to:

rank a set of businesses associated with the first set of collection information based at least in part on a first metric;

wherein the determining the recommendation for the first end user comprises selecting the first business based at least in part on the ranking.

20. The one or more non-transitory, machine-readable media of claim 15, wherein the determining the recommendation for the first end user comprises:

retrieving a second set of collection information that is associated with the first end user and that comprises information corresponding to one or more selected businesses of the one or more businesses that were individually selected by the first end user for retention; and comparing the second set of collection information with the first set of collection information associated with the first set of end users, and identifying one or more similarities.

* * * * *